(12) United States Patent
Bleyer et al.

(10) Patent No.: US 11,361,455 B2
(45) Date of Patent: Jun. 14, 2022

(54) SYSTEMS AND METHODS FOR FACILITATING THE IDENTIFYING OF CORRESPONDENCES BETWEEN IMAGES EXPERIENCING MOTION BLUR

(71) Applicant: Microsoft Technology Licensing, LLC, Redmond, WA (US)

(72) Inventors: Michael Bleyer, Seattle, WA (US); Christopher Douglas Edmonds, Carnation, WA (US); Raymond Kirk Price, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 89 days.

(21) Appl. No.: 16/936,365

(22) Filed: Jul. 22, 2020

(65) Prior Publication Data
US 2022/0028094 A1    Jan. 27, 2022

(51) Int. Cl.
| | | |
|---|---|---|
| *G06T 7/00* | (2017.01) | |
| *G06T 7/33* | (2017.01) | |
| *G02B 27/00* | (2006.01) | |
| *G02B 27/01* | (2006.01) | |
| *G06T 7/20* | (2017.01) | |

(52) U.S. Cl.
CPC .......... *G06T 7/337* (2017.01); *G02B 27/0093* (2013.01); *G02B 27/0189* (2013.01); *G06T 7/20* (2013.01); *G02B 2027/0198* (2013.01)

(58) Field of Classification Search
CPC ....... G06T 7/0036; G06T 5/003; G06T 7/002; G06T 7/2033; G06T 7/2086; G06T 7/0016; G06T 7/0022; G06T 7/20; G06T 7/204; A63B 2220/30; A63B 24/0021; A63B 2024/0034
See application file for complete search history.

(56) References Cited

U.S. PATENT DOCUMENTS

| | | | | |
|---|---|---|---|---|
| 2010/0128109 A1* | 5/2010 | Banks | ................... | G01S 7/484 |
| | | | | 348/46 |
| 2016/0350922 A1* | 12/2016 | Tofolo | ................... | G06T 7/248 |

OTHER PUBLICATIONS

Ben-Ezra, et al., "Motion-Based Motion Deblurring", In Journal of IEEE Transactions on Pattern Analysis and Machine Intelligence, vol. 26, Issue 6, Jun. 1, 2004, pp. 689-698.

(Continued)

*Primary Examiner* — Phuoc H Doan
(74) *Attorney, Agent, or Firm* — Workman Nydegger

(57) ABSTRACT

A system for facilitating the identifying of correspondences between images experiencing motion blur obtains a reference frame captured by a reference camera at a reference camera and obtains a match frame captured by a match camera at a match camera timepoint. The system identifies a motion attribute that includes (1) a reference camera motion attribute associated with the reference camera at the reference camera timepoint, and/or (2) a match camera motion attribute associated with the match camera at the match camera timepoint. The system determines a downsampling resolution using at least as inputs at least one of: the motion attribute, a camera exposure time, a camera field of view, or a camera angular resolution. The system generates a downsampled reference frame and a downsampled match frame based on the downsampling resolution. The system identifies correspondences between the downsampled reference frame and the downsampled match frame.

20 Claims, 44 Drawing Sheets

(56) References Cited

OTHER PUBLICATIONS

Hui, et al., "Motion Blur Identification from Image Gradients", In IEEE Conference on Computer Vision and Pattern Recognition, Jun. 23, 2008, 8 Pages.

Karpushin, Maxim, "Local Features for RGBD Image Matching Under Viewpoint Changes", Retrieved from: https://tel.archives-ouvertes.fr/tel-01483314/file/doc.pdf, Nov. 3, 2016, 151 Pages.

"International Search Report and Written Opinion Issued in PCT Application No. PCT/US2021/030984", dated Sep. 21, 2021, 16 Pages.

Sieberth, et al., "Influence of blur on feature matching and a geometric approach for photogrammetric deblurring", Journal of the International Archives of the Photogrammetry, Remote Sensing and Spatial Information Sciences, vol. XL-3, Aug. 11, 2014, pp. 321-326.

\* cited by examiner

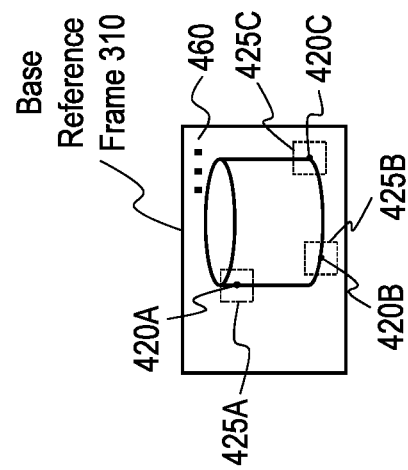
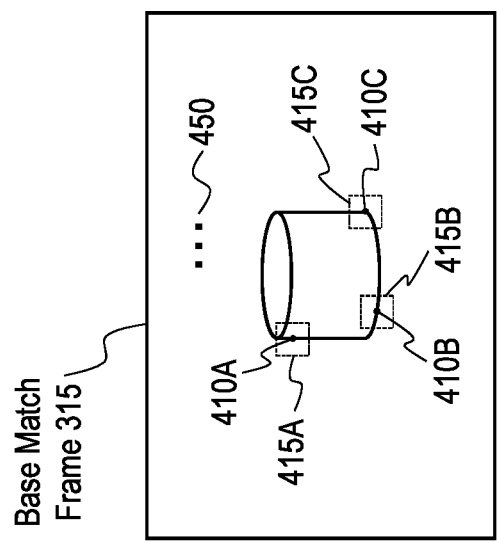
FIG. 4

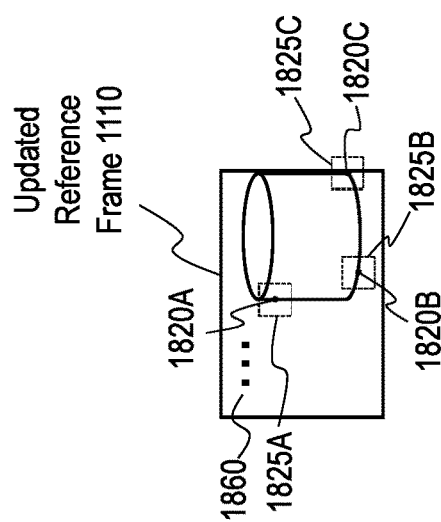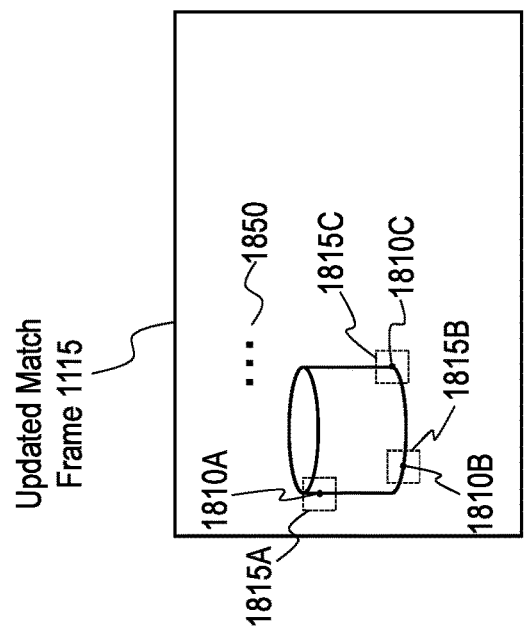
FIG. 18

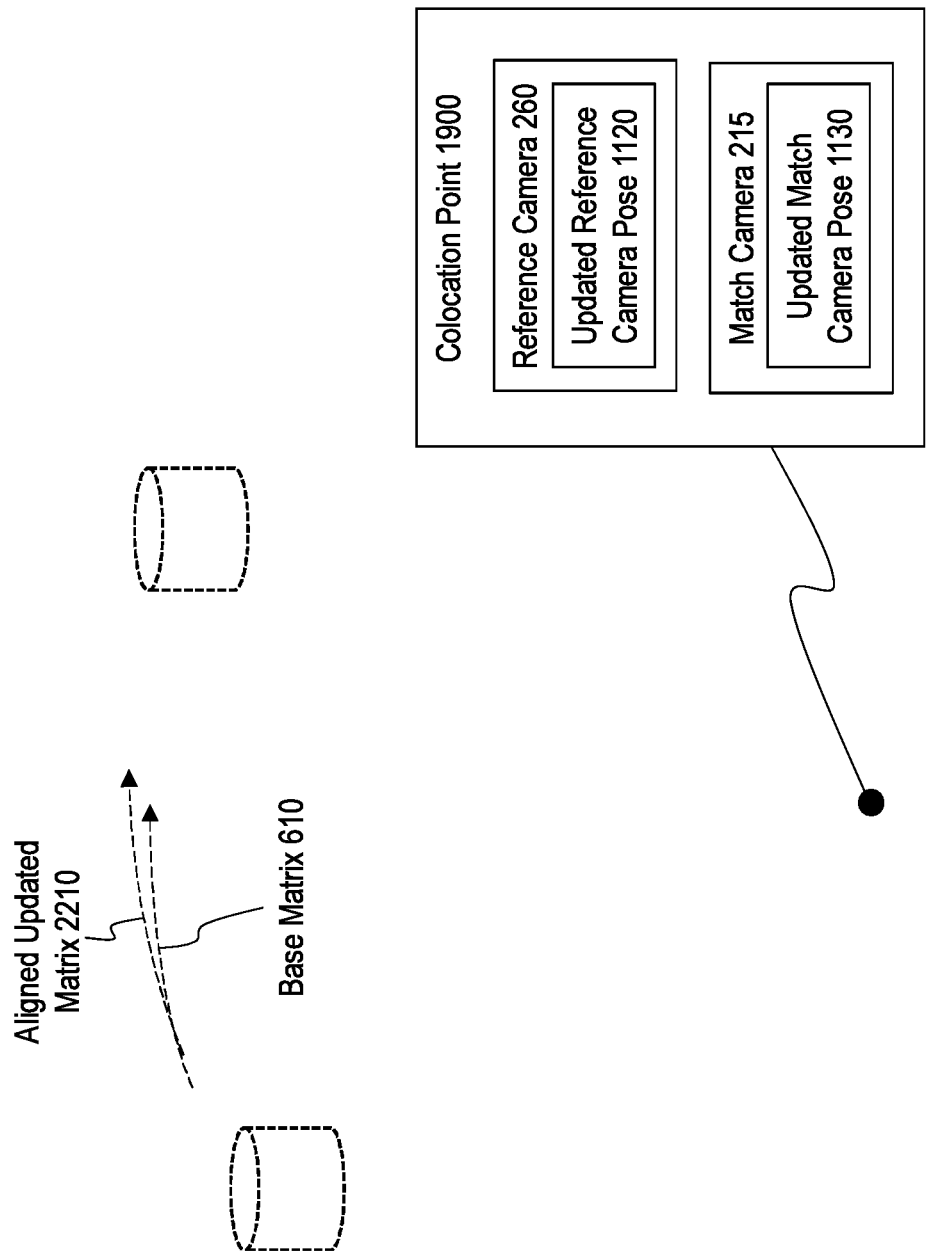

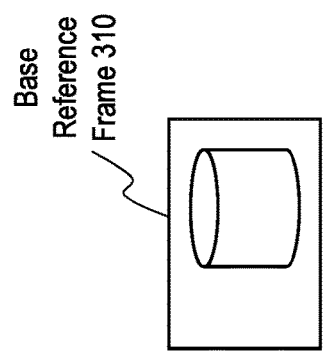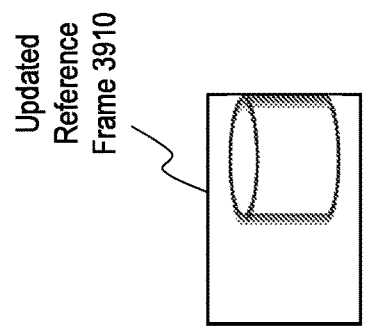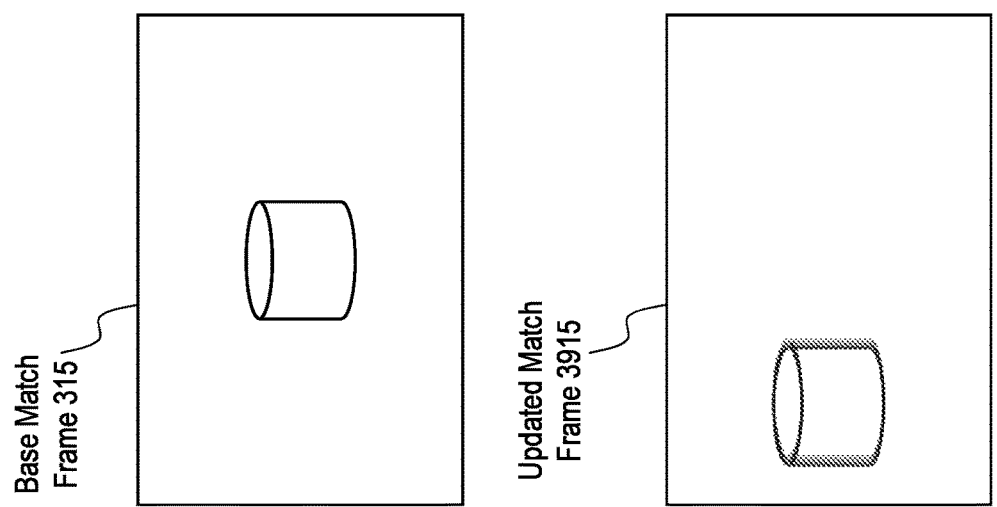
FIG. 39

SYSTEMS AND METHODS FOR FACILITATING THE IDENTIFYING OF CORRESPONDENCES BETWEEN IMAGES EXPERIENCING MOTION BLUR

BACKGROUND

Mixed-reality (MR) systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved, in VR systems, through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

Some MR systems include one or more cameras and utilize images and/or depth information obtained using the camera(s) to provide pass-through views of a user's environment. A pass-through view can aid users in avoiding disorientation and/or safety hazards when transitioning into and/or navigating within a mixed-reality environment. Pass-through views may also enhance user views in low visibility environments. For example, mixed-reality systems configured with long wavelength thermal imaging cameras may facilitate visibility in smoke, haze, fog, and/or dust. Likewise, mixed-reality systems configured with low light imaging cameras facilitate visibility in dark environments where the ambient light level is below the level required for human vision.

An MR system may provide pass-through views in various ways. For example, an MR system may present raw images captured by the camera(s) of the MR system to a user. In other instances, an MR system may modify and/or reproject captured image data to correspond to the perspective of a user's eye to generate pass-through views. An MR system may modify and/or reproject captured image data to generate a pass-through view using depth information for the captured environment obtained by the MR system (e.g., using a depth system of the MR system, such as a time of flight camera, a rangefinder, stereoscopic depth cameras, etc.). In some instances, an MR system utilizes one or more predefined depth values to generate pass-through views (e.g., by performing planar reprojection).

In some instances, pass-through views generated by modifying and/or reprojecting captured image data may at least partially correct for differences in perspective brought about by the physical separation between a user's eyes and the camera(s) of the MR system (known as the "parallax problem," "parallax error," or, simply "parallax"). Such pass-through views/images may be referred to as "parallax-corrected pass-through" views/images. By way of illustration, parallax-corrected pass-through images may appear to a user as though they were captured by cameras that are co-located with the user's eyes.

MR systems are often used in combination with other devices that are physically independent from and/or untethered to the MR system (e.g., controllers, instruments, etc.). For example, a user may operate an MR system while also operating a handheld/wearable device that includes a device camera. The device camera may be configured to be directed at and/or capture portions of the environment that are within the field of view of the MR system, such that both the device camera and cameras of the MR system concurrently capture portions of the environment.

User experiences may be enhanced by providing composite pass-through images on an MR system that implement camera imagery captured by a separate device camera aligned with and overlaid on camera imagery captured by the camera(s) of the MR system. However, because MR system cameras and separate device cameras move independently of one another, accurately aligning the camera imagery of the separate cameras to generate such composite pass-through images is associated with many challenges, particularly in real-time and/or near-real-time implementations.

A related problem associated with misalignment of images includes motion blur. Motion blur refers to blurring artifacts present in a frame captured by a camera when relative motion between the camera and the captured environment causes at least a portion of the captured environment to shift during the camera exposure time. Movement of objects in the captured environment and/or movement of the camera may cause motion blur. For example, relative motion between a camera and/or objects in the captured environment may cause multiple pixels of the image sensor of the camera to capture the same resolvable 3D point in the captured environment during the camera exposure time, which may cause blurring effects.

Motion blur is particularly problematic when attempting to align camera imagery because it can increase the difficulty for systems to identify visual correspondences between images and their identifiable features that have become blurred and unrecognizable.

For at least the foregoing reasons, there is an ongoing need and desire for improved techniques and systems that may facilitate continuous image alignment of separate cameras, and particularly for finding ways to address and/or mitigate motion blur during the image alignment processing by, for example, identifying correspondences between images experiencing motion blur.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems and methods for facilitating the identifying of correspondences between images experiencing motion blur.

Some embodiments include methods implemented by a computing system, such as a head-mounted display (HMD), in which the computing system performs various acts, including an act of obtaining a reference frame captured by a reference camera at a reference camera timepoint and an act of obtaining a match frame captured by a match camera at a match camera timepoint. The computing system also performs an act of identifying a motion attribute that includes (1) a reference camera motion attribute associated with the reference camera at the reference camera timepoint, and/or (2) a match camera motion attribute associated with the match camera at the match camera timepoint.

The computing system also performs an act of determining an image kernel using at least one of the following as inputs for determining the image kernel: the motion attribute, a camera exposure time, a camera field of view, or a camera angular resolution. The computing system also performs an act of generating a modified reference frame and a modified match frame based on the image kernel. Also, the computing system performs an act of identifying correspondences between the modified reference frame and the modified match frame.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 4 illustrates an example of feature matching between a reference frame and a match frame;

FIG. 18 illustrates an example of feature matching between the updated reference frame and the updated match frame;

FIGS. 21 and 22 illustrate an example of generating an aligned updated matrix by modifying the updated matrix from FIG. 20 using inertial tracking data associated with the reference camera and the match camera;

FIG. 39 illustrates an example of a reference frame and a match frame experiencing motion blur;

DETAILED DESCRIPTION

Figure 1:
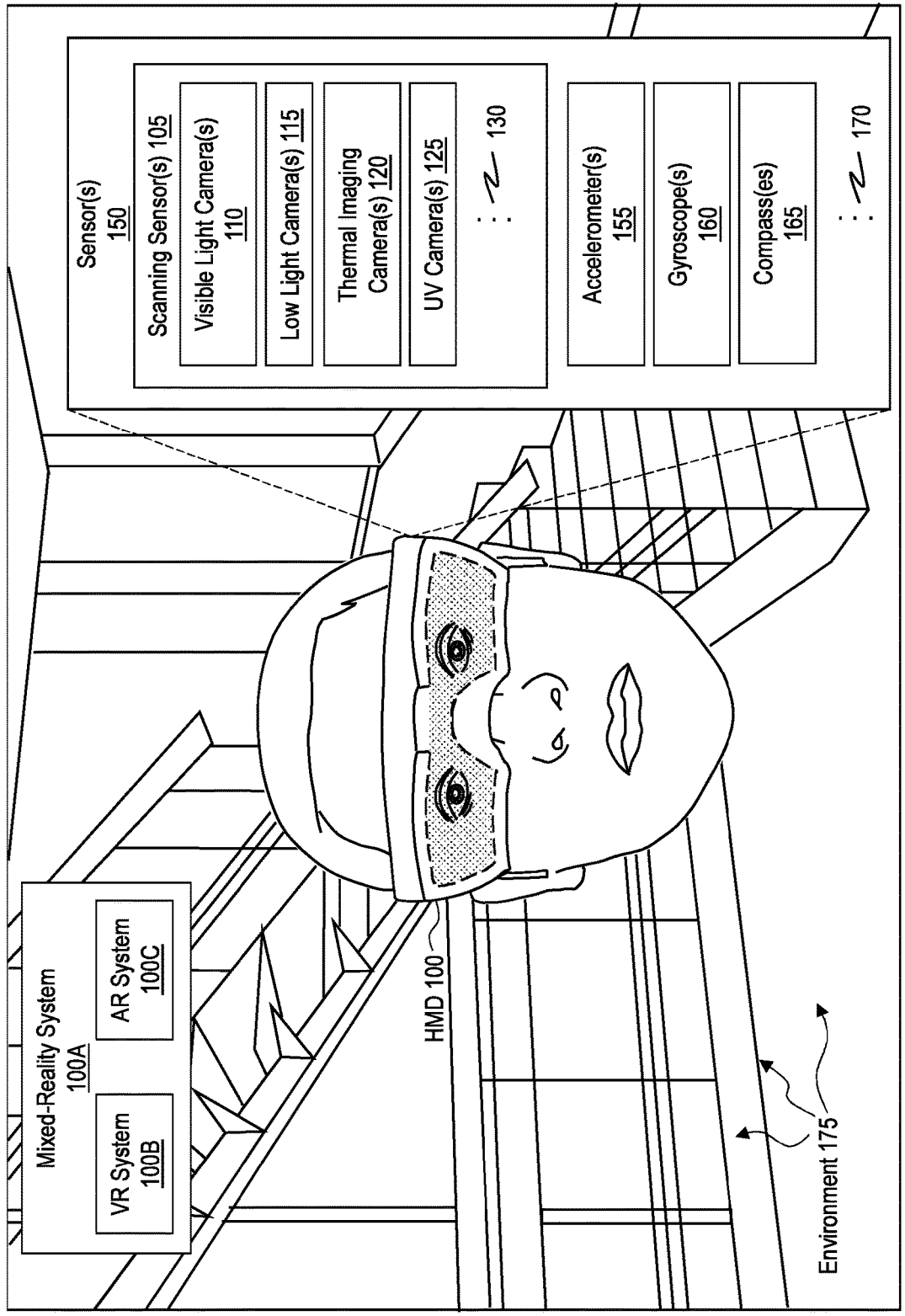
FIG. 1 illustrates an example mixed-reality system that may include or be used to implement disclosed embodiments.

Disclosed embodiments include systems and methods for facilitating the identifying of correspondences between images experiencing motion blur.

Some embodiments include methods implemented by a computing system, such as a head-mounted display (HMD), in which the computing system performs various acts, including an act of obtaining a reference frame captured by a reference camera at a reference camera timepoint and an act of obtaining a match frame captured by a match camera at a match camera timepoint. The computing system also performs an act of identifying a motion attribute that includes (1) a reference camera motion attribute associated with the reference camera at the reference camera timepoint, and/or (2) a match camera motion attribute associated with the match camera at the match camera timepoint.

The computing system also performs an act of determining an image kernel using at least one of the following as inputs for determining the image kernel: the motion attribute, a camera exposure time, a camera field of view, or a camera angular resolution. The computing system also performs an act of generating a modified reference frame and a modified match frame based on the image kernel. Also, the computing system performs an act of identifying correspondences between the modified reference frame and the modified match frame.

Examples of Technical Benefits, Improvements, and Practical Applications

Those skilled in the art will recognize, in view of the present disclosure, that at least some of the disclosed embodiments may address various shortcomings associated with conventional approaches for facilitating continuous image alignment of separate cameras. The following section outlines some example improvements and/or practical applications provided by the disclosed embodiments. It will be appreciated, however, that the following are examples only and that the embodiments described herein are in no way limited to the example improvements discussed herein.

In some implementations, providing a motion model based on reference camera and match camera transformation matrices (for poses) and an alignment matrix enables a system to map pixels of a reference frame to a match frame (and/or vice versa) as the positions of the reference camera and the match camera change relative to one another over time. For example, the reference camera and match camera transformation matrices may be updated/determined as the poses of the reference camera and the match camera change, which enables the motion model to account for updates in the positions of the cameras.

In some implementations, the alignment matrix is a 3D rotational matrix, which may correspond to reference camera and match camera transformation matrices based on inertial tracking data obtained by inertial measurement units (IMU) associated with the reference camera and the match camera, respectively. Accordingly, at least some implementations of the present disclosure facilitate simple concatenation of the alignment matrix with the camera transformation matrices based on IMU data to generate a motion model.

Furthermore, in some instances, the alignment matrix may be updated/determined based on visual correspondences between images captured by the reference camera and the match camera, which may enable the motion model to ameliorate the effects of IMU drift and/or parallax.

Also, in some instances, a system may intelligently reduce a search area for identifying visual correspondences between images captured by the reference camera and the match camera (e.g., based on IMU data and/or confidence measures). In some implementations, intelligently reducing the search area for identifying visual correspondences between the captured images reduces the computational burden associated with performing feature matching to facilitate continuous image alignment of separate cameras.

Furthermore, in some implementations, a system may intelligently modify images captured by the reference camera and the match camera to identify visual correspondences between the modified images, rather than the raw captured images (e.g., based on motion attributes and/or camera attributes). For example, in some instances, modified images may comprise downsampled images, and identifying visual correspondences between the downsampled images, rather than the raw captured images, ameliorates the effects of motion blur, which may otherwise cause systems to fail to identify visual correspondences between images (e.g., because identifiable features become blurred and unrecognizable).

In addition, an alignment matrix may be generated by fusing (e.g., blending) a base matrix (based on visual correspondences for a base frame pair) with an updated matrix (based on visual correspondences for an updated frame pair obtained subsequent to the base frame pair), which may address noise/imprecision that may be associated with using visual correspondences to determine an alignment matrix.

Still furthermore, a system may intelligently determine whether or how to blend a previous alignment matrix with an updated/current matrix to generate an updated alignment matrix based on difference values associated with the reference camera and/or the match camera relative to the timepoints at which a previous frame pair and an updated frame pair were obtained. Such implementations may enable systems to selectively ignore past alignment matrices upon indications that they have become unreliable (e.g., where sufficient motion has occurred or time has elapsed since the previous alignment matrix was computed).

A motion model of the present disclosure may enable a system to continuously map pixels of a reference frame captured by a reference camera to corresponding pixels of a match frame captured by a match camera. Thus, a motion model may enable a system to generate composite pass-through images that include imagery of the reference camera (e.g., a separate device camera) aligned with and overlaid on imagery of the match camera (e.g., one or more head-mounted display (HMD) camera). Providing such composite pass-through images may enable users to readily identify which portion of an environment a separate device (and/or device camera) is directed toward, which may enable users to direct input and/or actions toward portions of the environment in an accurate and/or rapid manner. Such composite pass-through images may be beneficial in various applications, such as, for example, gaming environments, medical/dental operations/training, first responder training/activities, and/or others.

Although the present disclosure focuses, in some respects, on facilitating continuous image alignment of a match camera of an HMD and a reference camera of a user instrument (e.g., separate user device) to provide composite pass-through views for display on the HMD, it will be appreciated, in view of the present disclosure, that the principles disclosed herein are applicable to any implementation that involves providing continuous image alignment between any number of separate cameras.

Furthermore, those skilled in the art will recognize, in view of the present disclosure, that at least some of the principles disclosed herein are applicable in other image matching implementations. For example, intelligently reducing a search range and/or generating modified images for identifying visual correspondences may be applied in drone systems, automotive systems, and/or other systems that experience high amounts of motion.

Having just described some of the various high-level features and benefits of the disclosed embodiments, attention will now be directed to FIGS. 1 through 43. These Figures illustrate various conceptual representations, architectures, methods, and supporting illustrations related to the disclosed embodiments. The disclosure will then turn to FIG. 44, which presents an example computer system that may include and/or be used to facilitate the disclosed principles.

Example Mixed-Reality Systems and HMDs

Attention will now be directed to FIG. 1, which illustrates an example of a head-mounted device (HMD) 100. HMD 100 can be any type of mixed-reality system 100A (MR system), including a VR system 100B or an AR system 100C. It should be noted that while a substantial portion of this disclosure is focused, in some respects, on the use of an HMD, the embodiments are not limited to being practiced using only an HMD. That is, any type of system can be used, even systems entirely removed or separate from an HMD. As such, the disclosed principles should be interpreted broadly to encompass any type of scanning scenario or device. Some embodiments may even refrain from actively using a scanning device themselves and may simply use the data generated by the scanning device. For instance, some embodiments may at least be partially practiced in a cloud computing environment.

FIG. 1 illustrates HMD 100 as including sensor(s) 150, including scanning sensor(s) 105 and other sensors, such as accelerometer(s) 155, gyroscope(s) 160, compass(es) 165. The ellipsis 170 conveys that the sensor(s) 150 depicted in FIG. 1 are illustrative only and non-limiting. For instance, in some implementations, an HMD 100 includes other interoceptive and/or exteroceptive sensors not explicitly illustrated in FIG. 1, such as eye tracking systems, radio-based navigation systems, microphones, and/or other sensing apparatuses. In some implementations, an HMD 100 includes fewer sensors than those depicted in FIG. 1.

The accelerometer(s) 155, gyroscope(s) 160, and compass(es) 165 are configured to measure inertial tracking data. Specifically, the accelerometer(s) 155 is/are configured to measure acceleration, the gyroscope(s) 160 is/are configured to measure angular velocity data, and the compass(es) 165 is/are configured to measure heading data. In some instances, an HMD 100 utilizes the inertial tracking components thereof to obtain three degree of freedom (3DOF) pose data associated with the HMD (e.g., where visual tracking data, described below, is unavailable, unreliable, and/or undesired). As used herein, 3DOF refers to position (e.g., rotation) information associated with rotational axes about three perpendicular directional axes (e.g., pitch, yaw, and roll).

The inertial tracking components/system of the HMD 100 (i.e., the accelerometer(s) 155, gyroscope(s) 160, and compass(es) 165) may operate in concert with a visual tracking system to form a head tracking system that generates pose data for the HMD 100. In some instances, a visual tracking system includes one or more cameras (e.g., head tracking cameras) that capture image data of an environment (e.g., environment 175). In some instances, the HMD 100 obtains visual tracking data based on the images captured by the visual tracking system, such as objects within the environment that may provide an anchor for determining movement of the HMD 100 relative to the environment.

For example, visual-inertial Simultaneous Location and Mapping (SLAM) in an HMD 100 fuses (e.g., with a pose filter) visual tracking data obtained by one or more cameras (e.g., head tracking cameras) with inertial tracking data obtained by the accelerometer(s) 155, gyroscope(s) 160, and compass(es) 165 to estimate six degree of freedom (6DOF) positioning (i.e., pose) of the HMD 100 in space and in real time. 6DOF refers to positioning/velocity information associated with three perpendicular directional axes and the three rotational axes (often referred to as pitch, yaw, and roll) about each of the three perpendicular directional axes (often referred to as x, y, and z).

Unless otherwise specified, any reference herein to a "pose" or a related term describing positioning and/or orientation may refer to 3DOF or 6DOF pose.

The visual tracking system of an HMD 100, in some instances, includes a stereo pair of head tracking images that is configured to obtain depth maps of the user's environment (e.g., environment 175) to provide visual mapping of the user's environment (e.g., by maintaining a surface mesh of the environment, or any other 3D representation of the environment). The HMD 100 may utilize the visual mapping data of the environment to accurately display virtual content with respect to the user's environment. Visual mapping data may also enable location sharing between users in a shared mixed-reality environment.

In some instances, the visual tracking system(s) of an HMD 100 (e.g., head tracking cameras) is/are implemented as one or more dedicated cameras. In other instances, the visual tracking system(s) is/are implemented as part of a camera system that performs other functions (e.g., as part of one or more cameras of the scanning sensor(s) 105, described hereinbelow).

The scanning sensor(s) 105 comprise any type of scanning or camera system, and the HMD 100 can employ the scanning sensor(s) 105 to scan environments, map environments, capture environmental data, and/or generate any kind of images of the environment. For example, in some instances, the HMD 100 is configured to generate a 3D representation of the real-world environment or generate a "pass-through" visualization. Scanning sensor(s) 105 may comprise any number or any type of scanning devices, without limit.

In accordance with the disclosed embodiments, the HMD 100 may be used to generate a parallax-corrected passthrough visualization of the user's environment. A "passthrough" visualization refers to a visualization that presents one or more images captured by cameras to a user, regardless of whether the HMD 100 is included as a part of an AR system or a VR system. To generate this passthrough visualization, the HMD 100 may use its scanning sensor(s) 105 to scan, map, or otherwise record its surrounding environment, including any objects in the environment, and to pass that data on to the user to view. In many cases, the passedthrough data is modified to reflect or to correspond to a perspective of the user's pupils. The perspective may be determined by any type of eye tracking technique. In some instances, as the camera modules are not telecentric with the user's eyes, the perspective difference between the user's eyes and the camera modules may be corrected to provide parallax-corrected pass-through visualizations.

To generate a parallax-corrected passthrough image, the scanning sensor(s) 105 may rely on its cameras (e.g., visible light camera(s) 110, low light camera(s) 115, thermal imaging camera(s) 120, UV camera(s) 125, or any other type of camera) to obtain one or more raw images of the environment (e.g., environment 175). In some instances, these raw images may also be used to determine depth data detailing the distance from the sensor to any objects captured by the raw images (e.g., a z-axis range or measurement). Once these raw images are obtained, then a depth map can be computed from the depth data embedded or included within the raw images, and passthrough images can be generated (e.g., one for each pupil) using the depth map for any reprojections.

As used herein, a "depth map" details the positional relationship and depths relative to objects in the environment. Consequently, the positional arrangement, location, geometries, contours, and depths of objects relative to one another can be determined. From the depth maps (and possibly the raw images), a 3D representation of the environment can be generated. Unless otherwise specified, the terms "depth map" and "disparity map" are used interchangeably herein.

Relatedly, from the passthrough visualizations, a user will be able to perceive what is currently in the user's environment without having to remove or reposition the HMD 100. Furthermore, the disclosed passthrough visualizations may also enhance the user's ability to view objects within his/her environment (e.g., by displaying additional environmental conditions that may not have been detectable by a human eye).

It should be noted that while a portion of this disclosure focuses on generating "a" passthrough image, the implementations described herein may generate a separate passthrough image for each one of the user's eyes. That is, two passthrough images may be generated concurrently with one another. Therefore, while frequent reference is made to generating what seems to be a single passthrough image, the implementations described herein are actually able to simultaneously generate multiple passthrough images.

In some embodiments, scanning sensor(s) 105 include cameras of various modalities, such as visible light camera(s) 110, low light camera(s) 115, thermal imaging camera(s) 120, Near Infrared (NIR) Cameras (in the 800 nm to 2 um range), and/or potentially (though not necessarily) ultraviolet (UV) cameras 125. The ellipsis 130 demonstrates how any other type of camera or camera system (e.g., depth cameras, time of flight cameras, etc.) may be included among the scanning sensor(s) 105. As an example, a camera structured to detect mid-infrared wavelengths may be included within the scanning sensor(s) 105.

Generally, a human eye is able to perceive light within the so-called "visible spectrum," which includes light (or rather, electromagnetic radiation) having wavelengths ranging from about 380 nanometers (nm) up to about 740 nm. In some instances, the visible light camera(s) 110 include monochrome cameras structured to capture light photons within the visible spectrum (and/or, in some instances, the infrared spectrum). In some instances, the visible light camera(s) 110 include red, green, blue (RGB) cameras structured to capture light photons within the visible spectrum (and/or, in some instances, the infrared spectrum). In some implementations, visible light camera(s) 110 are complementary metal-oxide-semiconductor (CMOS) type cameras, though other camera types may be used as well (e.g., charge coupled devices, CCD).

Visible light camera(s) 110 may be implemented as stereoscopic cameras, meaning that the fields of view of two or more visible light cameras 110 at least partially overlap with one another. With this overlapping region, images generated by the visible light camera(s) 110 can be used to identify disparities between certain pixels that commonly represent an object captured by both images. Disparities are typically measured after applying rectification to the stereo pair of images such that corresponding pixels in the images that commonly represent an object in the environment are aligned along scanlines. After rectification, corresponding pixels in the different images that commonly represent an object in the environment only differ in one dimension (e.g., the direction of the scanlines, such as the horizontal direction). The one-dimensional difference between the coordinates of corresponding pixels in their respective images of the stereo pair of images represents the disparity value for the object represented by the corresponding pixels.

Based on these pixel disparities, the embodiments are able to determine depths for objects located within the overlapping region (i.e. "stereoscopic depth matching," "stereo depth matching," or simply "stereo matching"). The depths for the objects/3D points of the environment located within the overlapping region may be represented as pixels of a depth map. As such, the visible light camera(s) 110 can be used to not only generate passthrough visualizations, but they can also be used to determine object depth. depth information about the real-world environment surrounding the mixed-reality system may enable the system to accurately present mixed-reality content (e.g., holograms) with respect to real-world objects. As an illustrative example, a depth system may obtain depth information for a real-world table positioned within a real-world environment. The mixed-reality system is then able to render and display a virtual figurine accurately positioned on the real-world table such that the user perceives the virtual figurine as though it were part of the user's real-world environment.

Those skilled in the art will recognize, in view of the present disclosure, that stereo matching may be performed on a stereo pair of images obtained by any type and/or combination of cameras. For example, an HMD 100 or other system may comprise any combination of visible light camera(s) 110, low light camera(s) 115, thermal imaging camera(s) 120, UV camera(s) 125, Near Infrared Red, and/or other cameras to capture a stereo pair of images upon which to perform stereo matching (e.g., for the overlapping region of the stereo pair of images).

In some instances, the low light camera(s) 115 are structured to capture visible light and IR light. IR light is often segmented into three different classifications, including near-IR, mid-IR, and far-IR (e.g., thermal-IR). The classifications are determined based on the energy of the IR light. By way of example, near-IR has relatively higher energy as a result of having relatively shorter wavelengths (e.g., between about 750 nm and about 1,000 nm). In contrast, far-IR has relatively less energy as a result of having relatively longer wavelengths (e.g., up to about 30,000 nm). Mid-IR has energy values in between or in the middle of the near-IR and far-IR ranges. In some instances, the low light camera(s) 115 are structured to detect or be sensitive to IR light in at least the near-IR range.

In some embodiments, the visible light camera(s) 110 and the low light camera(s) 115 operate in approximately the same overlapping wavelength range. In some cases, this overlapping wavelength range is between about 400 nanometers and about 1,000 nanometers. Additionally, in some embodiments these two types of cameras are both silicon detectors.

In some instances, one distinguishing feature between these two types of cameras is related to the illuminance conditions or illuminance range(s) in which they actively operate. In some cases, the visible light camera(s) 110 are low power cameras and operate in environments where the illuminance is between about 10 lux and about 100,000 lux (e.g., for an example commercial visible light camera), or rather, the illuminance range begins at about 10 lux and increases beyond 10 lux. In contrast, the low light camera(s) 115 consume more power and operate in environments where the illuminance range is between overcast starlight and dusk lighting levels. In some instances, the device operates in environments between starlight conditions (e.g., about 1 milli-lux, for a typical commercial low light camera) and dusk conditions (e.g., about 10 lux, for a typical commercial low light camera).

The thermal imaging camera(s) 120, in some instances, are structured to detect electromagnetic radiation or IR light in the far-IR (i.e. thermal-IR) range, though some implementations also enable the thermal imaging camera(s) 120 to detect radiation in the mid-IR range. To clarify, the thermal imaging camera(s) 120 may be a long wave infrared imaging camera structured to detect electromagnetic radiation by measuring long wave infrared wavelengths. Often, the thermal imaging camera(s) 120 detect IR radiation having wavelengths between about 8 microns and 14 microns. Because the thermal imaging camera(s) 120 detect far-IR radiation, the thermal imaging camera(s) 120 can operate, in some instances, in any illuminance condition.

In some cases (though not necessarily all), the thermal imaging camera(s) 120 include an uncooled thermal imaging sensor. An uncooled thermal imaging sensor uses a specific type of detector design that is based on a bolometer, which is a device that measures the magnitude or power of an incident electromagnetic wave/radiation. To measure the radiation, the bolometer uses a thin layer of absorptive material (e.g., metal) connected to a thermal reservoir through a thermal link. The incident wave strikes and heats the material. In response to the material being heated, the bolometer detects a temperature-dependent electrical resistance. Changes to environmental temperature cause changes to the bolometer's temperature, and these changes can be converted into an electrical signal to thereby produce a thermal image of the environment. In accordance with at least some of the disclosed embodiments, the uncooled thermal imaging sensor is used to generate any number of thermal images. The bolometer of the uncooled thermal imaging sensor can detect electromagnetic radiation across a wide spectrum, spanning the mid-IR spectrum, the far-IR spectrum, and even up to millimeter-sized waves.

The UV camera(s) 125 are structured to capture light in the UV range. The UV range includes electromagnetic radiation having wavelengths between about 10 nm and about 400 nm. The disclosed UV camera(s) 125 should be interpreted broadly and may be operated in a manner that includes both reflected UV photography and UV induced fluorescence photography.

In some instances, visible light cameras are cameras that are used for computer vision to perform head tracking (e.g., as described hereinabove). These cameras can detect visible light, or even a combination of visible and IR light (e.g., a range of IR light). In some cases, these cameras are global shutter devices with pixels being about 3 μm in size.

Low light cameras, in some instances, are cameras that are sensitive to visible light and near-IR. These cameras are larger and may have pixels that are about 5 μm in size or larger. These cameras are also sensitive to wavelengths that silicon sensors are sensitive to, which wavelengths are between about 350 nm to 1100 nm.

In some implementations, thermal/long wavelength IR devices (i.e. thermal imaging cameras) have pixel sizes that are about 10 μm or larger and detect heat radiated from the environment. These cameras may be sensitive to wavelengths in the 8 μm to 14 μm range. Some embodiments also include mid-IR cameras configured to detect at least mid-IR light. These cameras often comprise non-silicon materials (e.g., InP-based InGaAs cameras) that detect light in the 800 nm to 2 μm wavelength range.

Generally, the low light camera(s) 115, the thermal imaging camera(s) 120, and the UV camera(s) 125 (if present) consume relatively more power than the visible light camera(s) 110. Therefore, when not in use, the low light camera(s) 115, the thermal imaging camera(s) 120, and/or the UV camera(s) 125 are typically in the powered-down state in which those cameras are either turned off (and thus consuming no power) or in a reduced operability mode (and thus consuming substantially less power than if those cameras were fully operational). In contrast, the visible light camera(s) 110 are typically in the powered-up state in which those cameras are by default fully operational.

It should be noted that any number of cameras may be provided on the HMD 100 for each of the different camera types. That is, the visible light camera(s) 110 may include 1, 2, 3, 4, 5, 6, 7, 8, 9, 10, or more than 10 cameras. Often, however, the number of cameras is at least 2 so the HMD 100 can perform stereoscopic depth matching, as described earlier. Similarly, the low light camera(s) 115, the thermal imaging camera(s) 120, and the UV camera(s) 125 may each respectively include 1, 2, 3, 4, 5, 6, 7, 8, 9, 10, or more than 10 corresponding cameras.

Continuous Image Alignment of Separate Cameras

Figure 2:
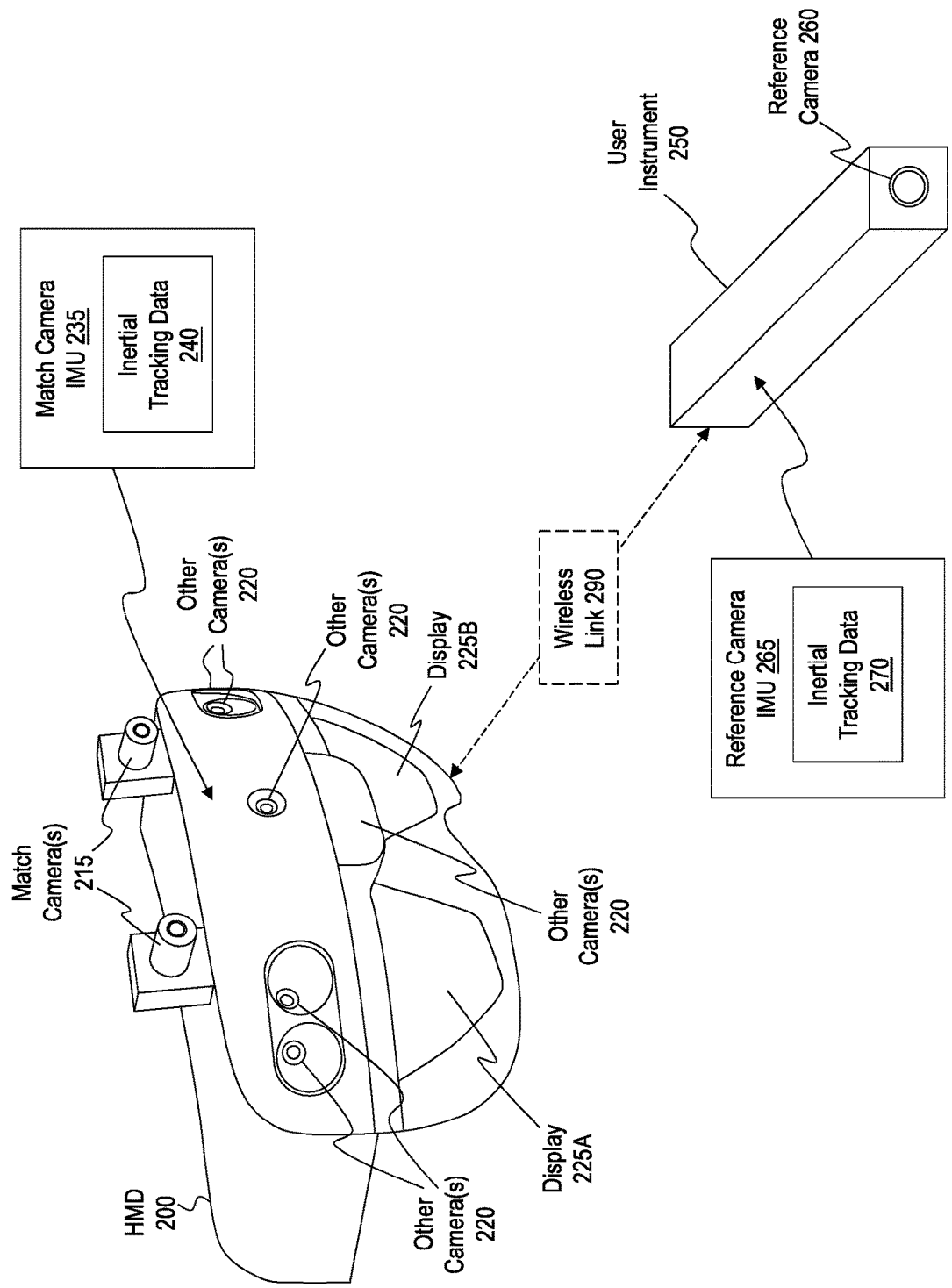
FIG. 2 illustrates an example head-mounted display (HMD) and a user instrument that include various cameras that may facilitate the disclosed embodiments, including a reference camera and a match camera.

Attention is now directed to FIG. 2, which illustrates an example head-mounted display (HMD) 200 and a user instrument 250 that include various cameras that may facilitate the disclosed embodiments. The HMD 200 may correspond, in at least some respects, to the HMD 100 described hereinabove with reference to FIG. 1. The user instrument 250 may comprise any type of handheld and/or wearable device that is usable in conjunction with the HMD 200 (or another system associated with match camera(s) 215). For example, in some instances, a user instrument 250 is a controller, a medical/dental instrument, a first responder tool, etc.

The HMD 200 includes match camera(s) 215, and the user instrument 250 includes a reference camera 260. The match camera(s) 215 and/or the reference camera 260 may be implemented as cameras of any modality (e.g., any combination of visible light camera(s) 110, low light camera(s) 115, thermal imaging camera(s) 120, UV camera(s) 125, Near Infrared Red, and/or other cameras). In some implementations, the match camera(s) 215 and the reference camera 260 share the same camera modality, whereas in other implementations, the match camera(s) 215 and the reference camera 260 have different camera modalities.

FIG. 2 depicts the HMD 200 with two match cameras 215. In some implementations, the two match cameras 215 are substantially vertically aligned the eyes of a user operating the HMD 200. In some instances, an HMD 200 with two match cameras 215 may enable the HMD 200 to provide per-eye parallax-corrected images (e.g., based on composite images, as described hereinafter with reference to at least FIGS. 10 and 17). However, those skilled in the art will recognize, in view of the present disclosure, that the particular configuration of the HMD 200 and/or the user instrument 250 depicted in FIG. 2 is illustrative only and non-limiting. For example, in some instances, an HMD 200 includes one or more than two match cameras 215, and/or a user instrument 250 includes more than one reference camera 260.

FIG. 2 also illustrates that, in some instances, the HMD 200 includes other cameras 220 that may serve various functions, such as head tracking, hand/object tracking, video capture, etc. The HMD 200 also includes displays 225A and 225B for displaying virtual content (e.g., holograms, composite images, etc.) to a user wearing the HMD 200.

The HMD 200 of FIG. 2 includes a match camera inertial measurement unit (IMU) 235, and the user instrument 250 of FIG. 2 includes a reference camera IMU 265. The match camera IMU 235 includes any combination of accelerometer(s) 155, gyroscope(s) 160, and/or compass(es) for generating inertial tracking data 240 (as described hereinabove). In some instances, the match camera IMU 235 is mounted to the HMD 200 at a fixed position relative to the match camera(s) 215, such that the inertial tracking data 240 may be associated with the match camera(s) 215.

Similarly, the reference camera IMU 265 includes any combination of accelerometer(s), gyroscope(s), and/or compass(es) for generating inertial tracking data 270 that may be associated with the reference camera 260 (e.g., where the reference camera IMU 265 is mounted to the user instrument 250 at a fixed position relative to the reference camera 260).

FIG. 2 also illustrates that, in some implementations, the HMD 200 and the user instrument 250 are configured to share data through a wireless link 290. In one example, the user instrument 250 may transmit image data for image frames captured by the reference camera 260 to the HMD 200 through a wireless channel. It should be noted that the wireless link 290 may implement various wireless communication technologies, such as ultra-wideband, WLAN, infrared communication, Bluetooth, and/or others.

Figure 3:
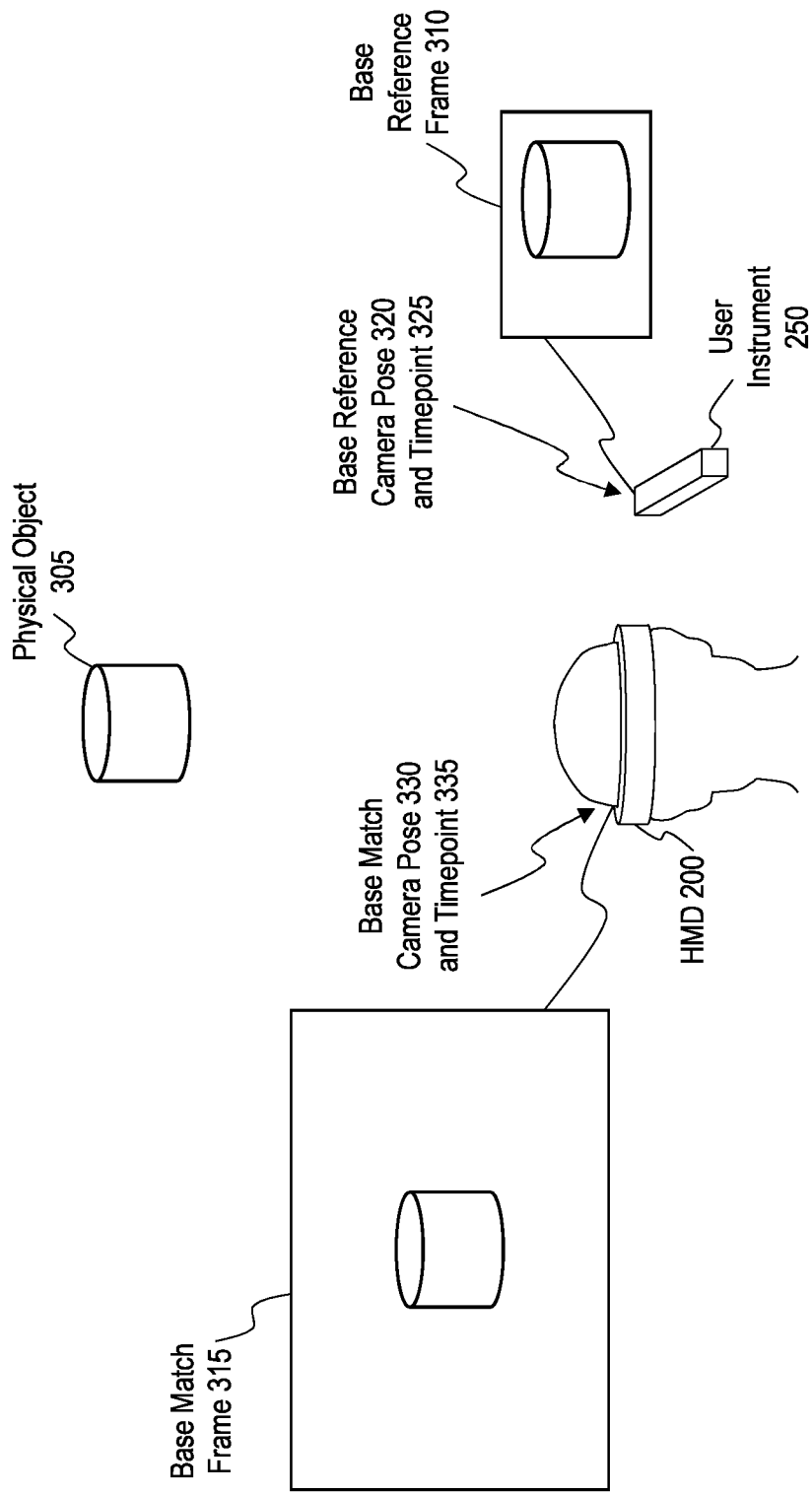
FIG. 3 illustrates an example of capturing an environment with a reference camera and a match camera.

FIG. 3 illustrates an example of capturing an environment that includes a physical object 305 with a reference camera 260 and a match camera 215. In particular, FIG. 3 illustrates the reference camera 260 of the user instrument 250 capturing a base reference frame 310 at a base reference camera pose 320 and base reference camera timepoint 325. As illustrated in FIG. 3, the base reference frame 310 includes a representation of the physical object 305. Similarly, FIG. 3 illustrates the match camera 215 of the HMD 200 capturing a base match frame 315 at a base match camera pose 330 and base match camera timepoint 335. The base match frame 315 also includes a representation of the physical object 305.

As will be described hereinbelow, the base reference frame 310 and the base match frame 315 may provide a basis for generating a motion model for facilitating mapping of imagery captured by the reference camera onto imagery captured by the match camera (or vice versa).

FIG. 4 illustrates an example of performing feature matching between the base reference frame 310 and the base match frame 315. In some implementations, performing feature matching involves identifying feature points and feature descriptors within the base reference frame 310 and the base match frame 315. In some instances, a feature point (sometimes referred to as "keypoints," "points of interest," or simply "features") refers to a pixel within an image that comprises rich texture information, such as edges, corners, and/or other readily identifiable structures. In some instances, a feature descriptor (also referred to as a "feature vector") results from extracting image data/statistics from a local image/pixel patch around an identified feature point. A feature descriptor may operate as an identifier for the feature point about which the feature descriptor is centered. Various approaches exist for extracting feature descriptors, such as local histogram approaches, N-jets approaches, and/or others. For example, a feature descriptor may be identified based on a histogram of gradient magnitudes (e.g., changes in intensity and/or color) and/or orientations (e.g., edge orientations) for pixels within an image patch centered on a feature point.

A system may employ various techniques for identifying feature points and/or feature descriptors, such as, by way of non-limiting example, scale-invariant feature transform (SIFT), speeded up robust features (SURF), Canny operator, Kayyali operator, Moravec algorithm, Harris & Stephens/Shi-Tomasi algorithms, Förstner detector, smallest univalue segment assimilating nucleus (SUSAN) detector, level curve curvature approach, DAISY algorithms, and/or others.

FIG. 4 illustrates various feature points associated with the physical object 305 as represented in the base reference frame 310 and the base match frame 315. For example, FIG. 4 illustrates feature points 410A, 410B, and 410C on the edges of the depiction of the physical object 305 within the base match frame 315. FIG. 4 also depicts feature descriptors 415A, 415B, and 415C that are associated, respectively, with feature points 410A, 410B, and 410C.

FIG. 4 also illustrates various feature points associated with the depiction of the physical object 305 within the base reference frame 310. For example, FIG. 4 illustrates feature points 420A, 420B, and 420C on the edges of the depiction of the physical object 305 within the base reference frame 310. FIG. 4 also depicts feature descriptors 425A, 425B, and 425C that are associated, respectively, with feature points 420A, 420B, and 420C.

As illustrated in FIG. 4, the feature points 410A, 410B, and 410C within the base match frame 315 correspond to the feature points 420A, 420B, and 420C within the base reference frame 310. As used herein, feature points "correspond" to one another when they represent the same 3D point within a captured environment. For example, feature point 410A within the base match frame 315 and feature point 420A within the base reference frame 310 both represent the same 3D point along the left edge of the physical object 305.

As used herein, a "feature match" comprises a feature point in one image (e.g., the base reference frame 310) and a corresponding feature point in another image (e.g., the base match frame 315). In some instances, a system identifies feature matches by comparing feature descriptors of the features identified in the images. A system may employ various techniques to identify feature matches between the features of the base match frame 315 and the base reference frame 310, such as a brute-force matcher, a fast library for approximate nearest neighbors (FLANN) matcher, and/or others. FIG. 4 illustrates three feature matches (e.g., feature points 410A and 420A, feature points 410B and 420B, and feature points 410C and 420C), and the ellipses 450 and 460 indicate that a system may identify any number of feature matches within the base reference frame 310 and the base match frame 315 (e.g., in some instances, on the order of 100 matches).

Figure 5:
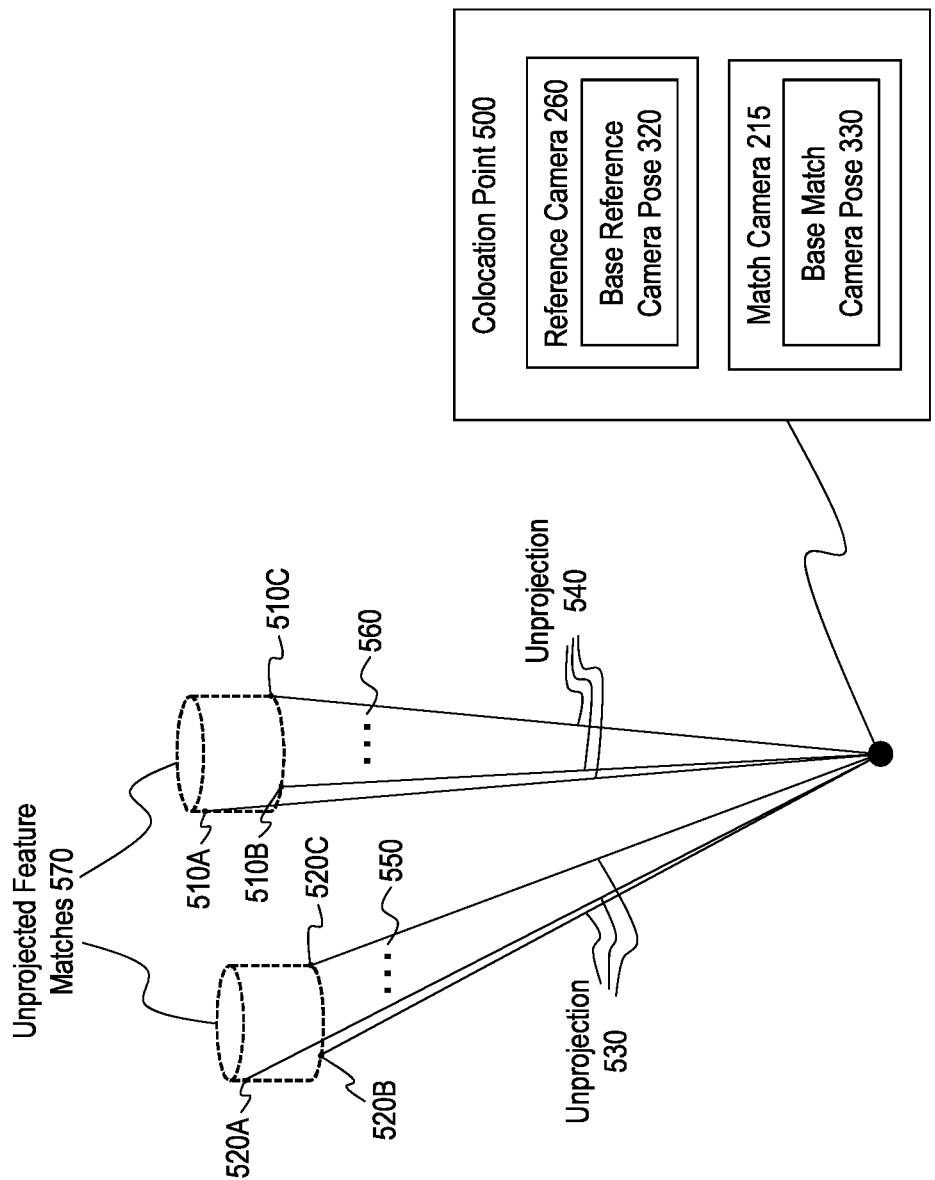
FIG. 5 illustrates an example of unprojecting the feature matches identified according to FIG. 4.

In some instances, a system utilizes feature matches identified within the base match frame 315 and the base reference frame 310 to determine a motion model for facilitating mapping of imagery captured by the reference camera onto imagery captured by the match camera (or vice versa). FIG. 5 illustrates an example of unprojecting the feature matches identified within the base match frame 315 and the base reference frame 310.

Initially, FIG. 5 illustrates a colocation point 500, which illustrates an assumption that the reference camera 260 and the match camera 215 were at a same location while capturing the base match frame 315 and the base reference frame 310 (e.g., the separation distance between the reference camera 260 and the match camera 215 is set to zero). However, while the colocation point 500 illustrates an assumption that the reference camera 260 and the match camera 215 shared a same location while capturing images, the colocation point 500 does not constrain the orientation of the reference camera 260 and the match camera 215. For example, FIG. 5 depicts the reference camera 260 at the colocation point 500 with its orientation determined by the base reference camera pose 320, and FIG. 5 also depicts the match camera 215 at the colocation point 500 with its orientation determined by the base match camera pose 330.

FIG. 5 illustrates generating unprojected feature points 520A, 520B, and 520C by performing unprojection 530 on the feature points 420A, 420B, and 420C of the base reference frame 310. FIG. 5 also illustrates generating unprojected feature points 510A, 510B, and 510C by performing unprojection 540 on the feature points 410A, 410B, and 410C of the base match frame 315. The unprojected feature points are 3D points that are generated based on the 2D feature points.

In some instances, generating 3D unprojected feature point (e.g., 510A-510C, 520A-520C) by performing unprojection (e.g., unprojection 540, 530) on a 2D feature point (e.g., feature points 410A-410C, 420A-420C) may be conceptualized as extending a ray from a camera center or optical center using a pixel location of the feature point to be unprojected. In one example for generating unprojected feature point 520A, using pinhole camera terminology for illustrative purposes, a system may define the colocation point 500 as an optical center or camera center of the reference camera 260 while the reference camera captured the base reference frame 310 at the base reference camera pose 320. Continuing with the example, the system may then cast a ray from the colocation point 500 using the 2D pixel coordinates of feature point 420A as feature point 420A lies on a front image plane positioned about the colocation point 500. The front image plane may be positioned about the colocation point 500 according to the base reference camera pose 320 (e.g., wherein the base reference camera pose 320 provides the orientation of the front image plane with respect to the colocation point 500). The system may extend the ray to a particular depth value to provide the 3D unprojected feature point 520A. A system may use any depth value for the unprojection 530, such as a uniform depth value for generating all unprojected feature points.

The ellipses 550 and 560 of FIG. 5 indicate that a system may perform unprojection 530, 540 to generate any number of 3D unprojected feature points based on the 2D feature points of the base reference frame 310 and the base match frame 315. As noted hereinabove, at least some of the feature points of the base reference frame 310 (e.g., feature points 420A-420C) may correspond to feature points of the base match frame 315 (e.g., feature points 410A-410C), providing feature matches between the base reference frame 310 and the base match frame 315. Therefore, FIG. 5 illustrates an instance in which performing unprojection 530, 540 on the feature points of the base reference frame 310 and the base match frame 315 provides unprojected feature matches 570 of corresponding unprojected feature points. For example, unprojected feature points 510A and 520A may correspond to one another, being generated by un projecting feature points 410A and 420A, respectively.

Figure 6:
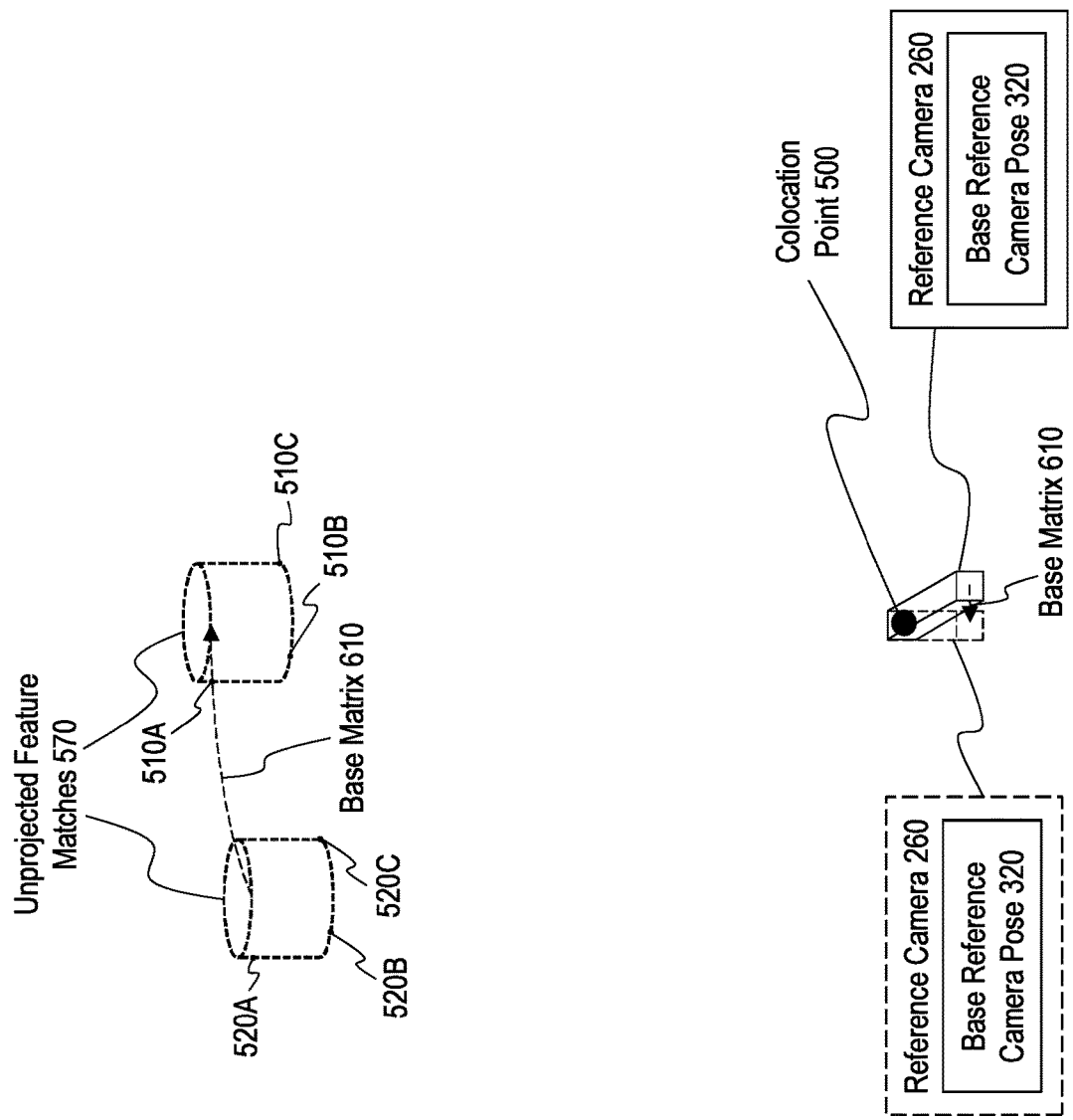
FIG. 6 illustrates an example of identifying a base matrix using the unprojected feature matches of FIG. 5.

FIG. 6 illustrates an example of identifying a base matrix 610 using the unprojected feature matches 570. In some implementations, a base matrix 610 represents a 3D rotation matrix, or a 3×3 matrix that describes rotation about 3 perpendicular axes to rotate a set of points from one coordinate system into a different coordinate system. In some instances, as indicated by FIG. 6, the base matrix 610 is a 3D rotation matrix that facilitates rotation of the unprojected feature points 520A-520C into the coordinate system of the corresponding unprojected feature points 510A-510C (the corresponding unprojected feature points 510A-510C having been unprojected using the base match camera pose 330). Put differently, the base matrix 610 is a 3D rotation matrix that rotates a set of unprojected feature points (e.g., 520A-520C) onto a set of corresponding unprojected feature points (e.g., 510A-510C).

By way of illustration, FIG. 6 depicts the reference camera 260 positioned at the colocation point 500 with an orientation that corresponds to the base reference camera pose 320. It should be noted that the base reference camera pose 320 is the pose from which the reference camera 260 captured the base reference frame 310 that provided the 2D feature points 420A-420C for generating unprojected feature points 520A-520C. FIG. 6 illustrates that the base matrix 610 may be described as a 3D rotation matrix that facilitates rotation of the reference camera 260 to correspond to the base match camera pose 330, which is the pose from which the match camera 215 captured the base match frame 315 that provided the 2D feature points 410A-410C for generating unprojected feature points 510A-510C.

A system may identify a base matrix 610 using unprojected feature matches 570 in a variety of ways, such as by minimizing a cost function (e.g., according to the Wahba method), utilizing machine learning techniques, and/or other approaches.

Figure 7:
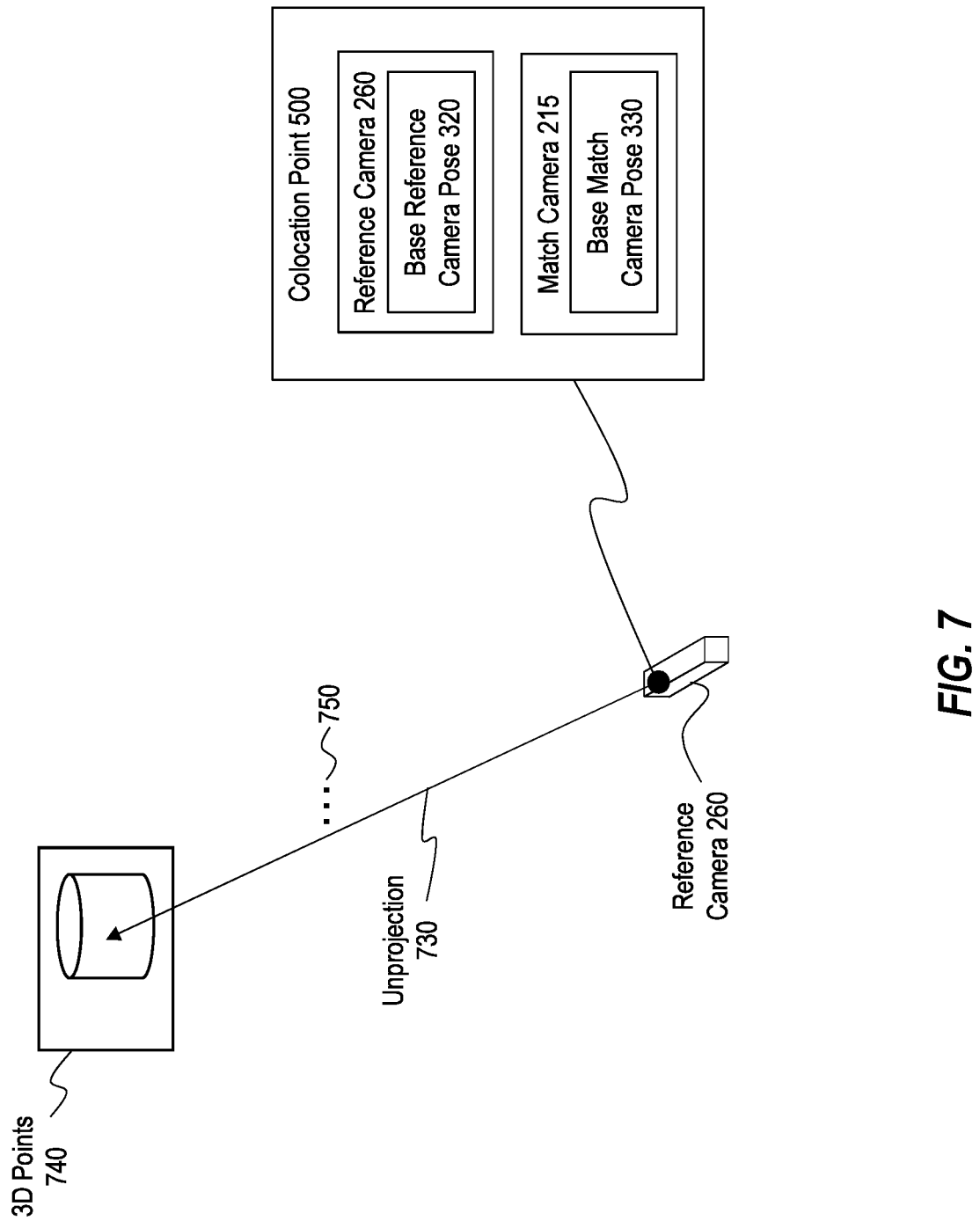
FIG. 7 illustrates an example of unprojecting a set of pixels of a reference frame to generated 3D points.

Using a base matrix 610, a system may map pixels from the base reference frame 310 onto corresponding pixels of the base match frame 315, as discussed in more detail with reference to FIGS. 7-10. FIG. 7 illustrates generating 3D points 740 by performing unprojection 730 on a set of pixels of the base reference frame 310 captured by the reference camera 260 at the base reference camera pose 320. Unprojection 730 corresponds to unprojection 530, 540 described hereinabove with reference to FIG. 5. In some instances, a system performs unprojection 730 on pixels of the base reference frame 310 using the intrinsic matrix (e.g., intrinsic calibration) of the reference camera 260 and a uniform depth value. Ellipsis 750 indicates that a system may perform unprojection 730 on any number of pixels of the base reference frame 310 to generate the 3D points 740.

Figure 8:
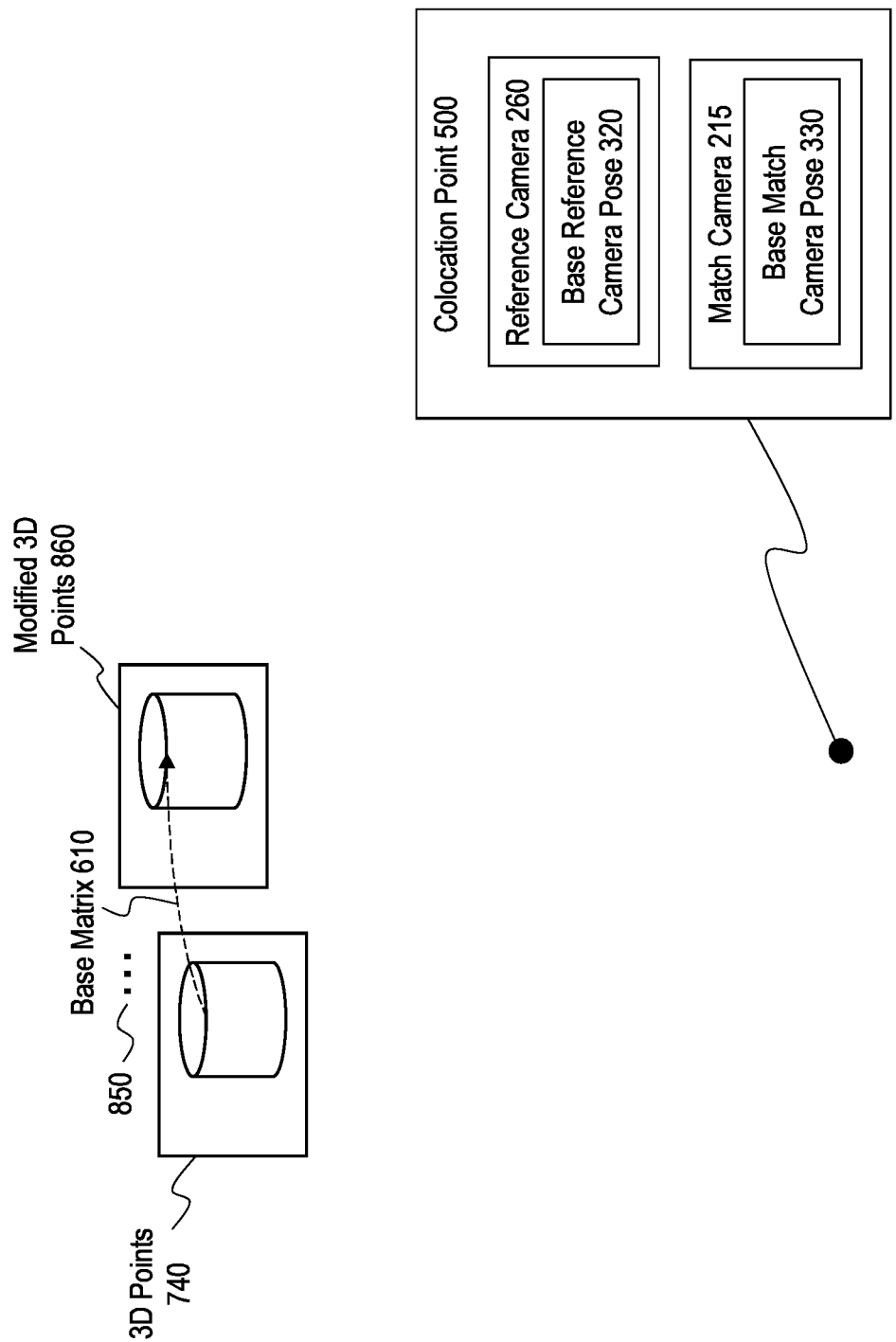
FIG. 8 illustrates an example of generating modified 3D points by applying the base matrix of FIG. 6 to the 3D points of FIG. 7.

FIG. 8 illustrates an example of generating modified 3D points 860 by applying the base matrix 610 to the 3D points 740. In some instances, applying the base matrix 610 to the 3D points 740 rotates the 3D points 740 into a different coordinate system, thereby providing modified 3D points 860. By way of illustration, applying the base matrix 610 to the 3D points 740 may be thought of as rotating the 3D points 740 into a coordinate system that would exist for 3D points unprojected using the base match frame 315 and the base match camera pose 330. Ellipsis 850 indicates that a system may apply the base matrix 610 to any number of the 3D points 740 to generate the modified 3D points 860.

Figure 9:
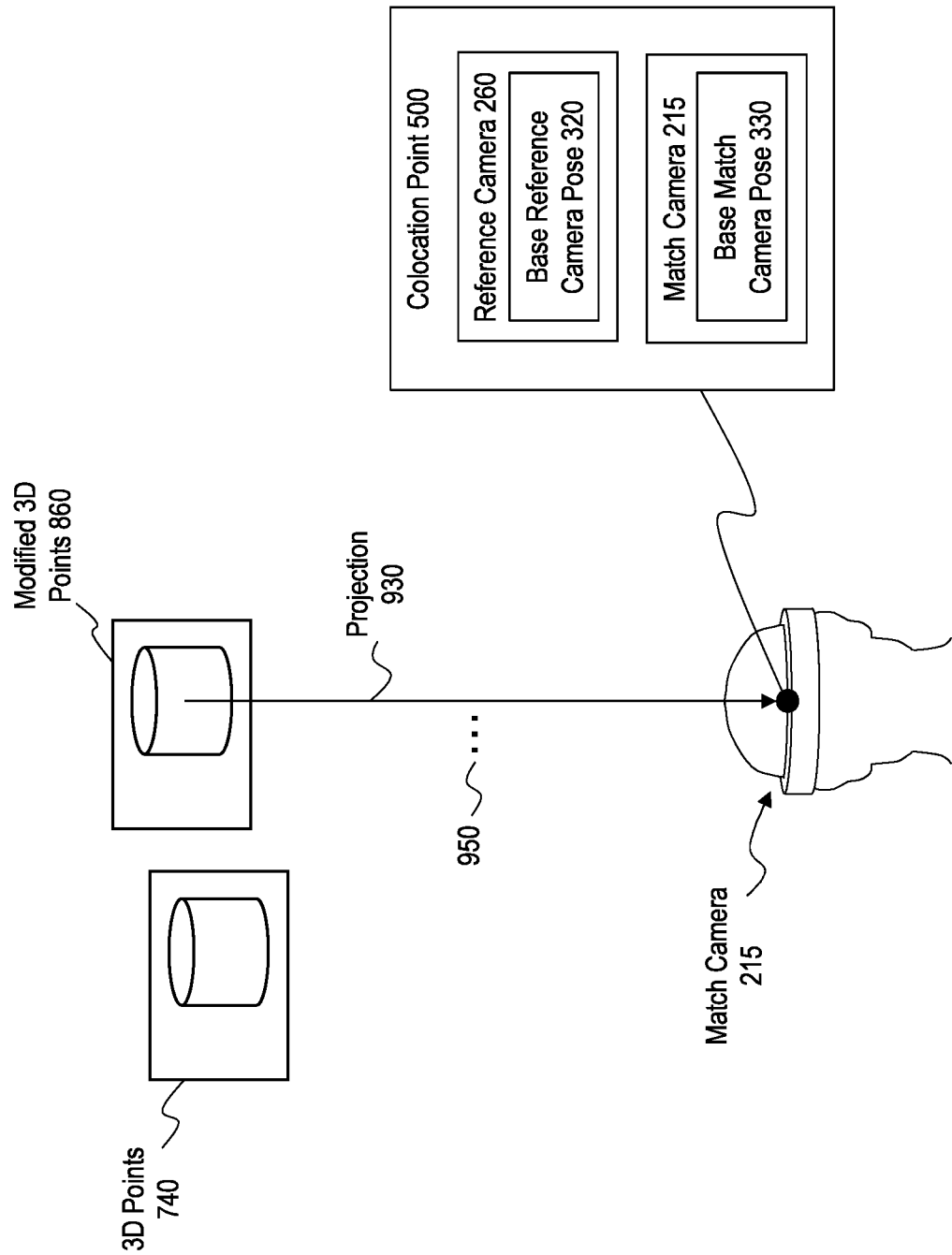
FIG. 9 illustrates an example of projecting the modified 3D points of FIG. 8.

FIG. 9 illustrates an example of performing projection 930 on the modified 3D points 860. In some instances, projection 930 is an operation that is inverse to the unprojection operations described herein (e.g., unprojection 530, 540, 730). Projection 930 may be conceptualized as extending a ray from a 3D point (e.g., one of the modified 3D points 860) toward a camera center or optical center. For instance, again using pinhole camera terminology for illustrative purposes, a system may define the colocation point 500 as an optical center or camera center of the match camera 215 while the match camera captured the base match frame 315 at the base match camera pose 330. A system may then cast a ray from a 3D point (e.g., one of the modified 3D points 860) toward the colocation point 500, and the ray may identify a 2D pixel as the pixel lies on a front image plane positioned about the colocation point. The front image plane may be positioned about the colocation point according to an intrinsic matrix (e.g., intrinsic calibration) of the match camera 215 and according to the base match camera pose 330 (e.g., wherein the base match camera pose 330 provides the orientation of the front image plane with respect to the colocation point 500). The system may then associate the projected 3D point with the 2D pixel coordinates identified according to the projection 930 (and thereby associate 2D pixel coordinates with the pixels of the base reference frame 310 that were originally unprojected according to unprojection 730). The ellipsis 950 indicates that a system may perform projection 930 on any number of the modified 3D points 860 to associate the modified 3D points with 2D pixel coordinates. The 2D pixel coordinates may identify a set of corresponding pixels in the base match frame 315 to which a system may map of pixels from the base reference frame 310.

Figure 10:
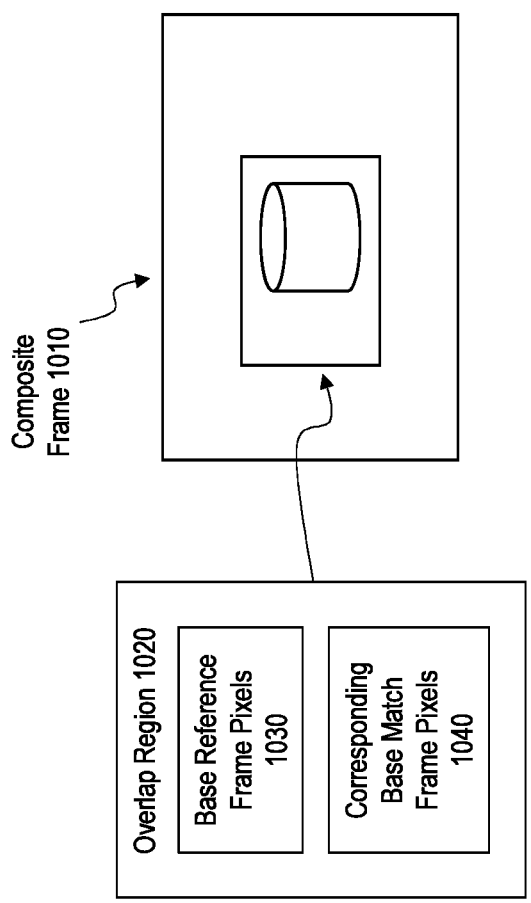
FIG. 10 illustrates an example of a composite image that includes reference frame pixels mapped to corresponding match frame pixels in an overlap region.

In some instances, a system uses the 2D pixel coordinates associated with the modified 3D points 860 to identify a set of corresponding pixels in the base match frame 315 to which the system may map the set of pixels of the base reference frame 310 that were originally unprojected according to unprojection 730. FIG. 10 illustrates an example of a composite frame 1010 that includes base reference frame pixels 1030 mapped to corresponding base match frame pixels 1040 in an overlap region 1020 of the composite frame 1010. For example, in some instances, the system applies texture information from the base reference frame pixels 1030 to the corresponding base match frame pixels 1040 that were identified according to the projections 930 of the modified 3D points 860.

Accordingly, FIGS. 7-9 illustrate facilitating image alignment of a base reference frame and a base match frame using a 3D rotational matrix (i.e., base matrix 610), which is a simplification made possible by the colocation assumption described hereinabove and exemplified by colocation point 500 from FIGS. 5-9. The colocation assumption may reduce the computation burden associated with continuously mapping imagery from one camera onto imagery of another camera. The colocation assumption ignores real-world parallax that may exist between the perspective of the match camera and the perspective of the reference camera. However, in some implementations, the effects of parallax are only observable when the cameras capture objects that are relatively close to the cameras, and/or when the separation distance between the cameras is relatively large.

Although the foregoing description focuses, in some respects, on implementations that use the colocation assumption, those skilled in the art will recognize, in view of the present disclosure, that at least some of the principles described herein are applicable in implementations that omit the colocation assumption.

In some instances, the operations of generating a set of 3D points 740 by unprojecting a set of pixels of the base reference frame 310, generating modified 3D points 860 by applying the base matrix 610 to the 3D points 740, and projecting the modified 3D points 860 as described hereinabove with reference to FIGS. 7-9 map the set of pixels of the base reference frame 310 onto a set of corresponding pixels in the base match frame 315. These operations may be thought of as a model that captures the relative positioning of the reference camera 260 and the match camera 215 to enable mapping of pixels from a base reference frame to a base match frame. The model may be represented by the following equation:

$$f(p) = K_{match} * R_{ref \to match} * K_{ref}^{-1} \quad (1)$$

Where $f(p)$ is a function that maps pixels p of the reference frame to pixels p' of the match frame. $K_{ref}$ represents the intrinsic matrix of the reference camera, and $K_{match}$ represents the intrinsic matrix of the match camera. $R_{ref \to match}$ represents an alignment matrix, which may be implemented as the base matrix described hereinabove (or other transformations, such as homography, similarity transforms, affine motion models, etc.). In some instances, Equation 1 represents unprojection of a pixel p of the reference frame using the intrinsic matrix of the reference camera, $K_{ref}$, rotating the unprojected point using the base matrix, $R_{ref \to match}$, and projecting the rotated point onto the match frame using the intrinsic matrix of the match camera, $K_{match}$.

Figure 11:
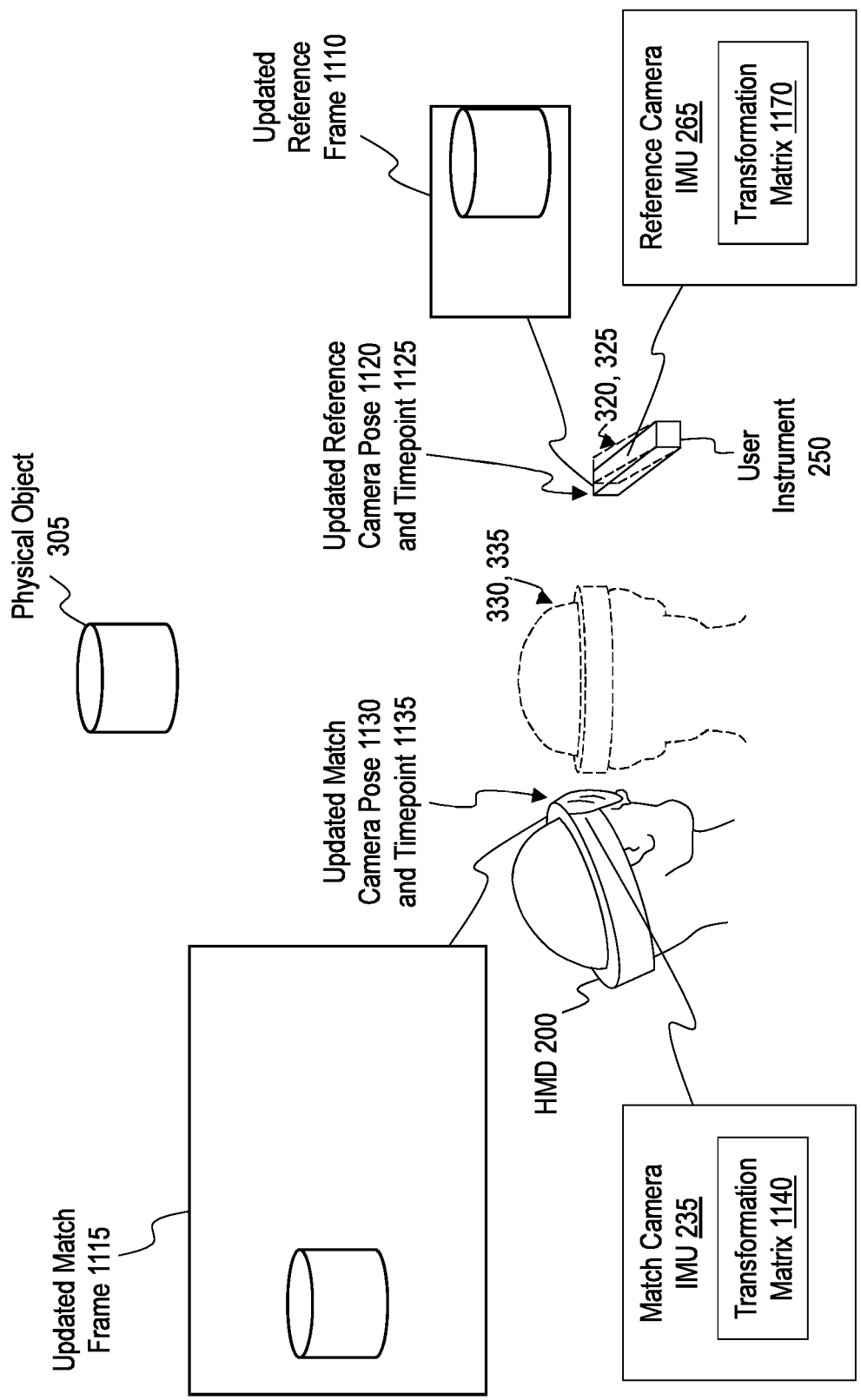
FIG. 11 illustrates an example of capturing the environment from FIG. 3 with the reference camera and the match camera at subsequent timepoints.

Attention is now directed to FIG. 11, which illustrates an example of the reference camera 260 of the user instrument 250 and the match camera of the HMD 200 continuously capturing the environment that includes the physical object 305 as the poses of the user instrument 250 and the HMD 200 change over time. Specifically, FIG. 11 illustrates the reference camera 260 of the user instrument 250 capturing an updated reference frame 1110 at an updated reference camera pose 1120 and at an updated reference camera timepoint 1125. The updated reference camera pose 1120 is different than the base reference camera pose 320, and the updated reference camera timepoint 1125 is subsequent to the base reference camera timepoint 325. Similarly, FIG. 11 illustrates the match camera 215 of the HMD 200 capturing an updated match frame 1115 at an updated match camera pose 1130 and at an updated match camera timepoint 1135. The updated match camera pose 1130 is different than the base match camera pose 330, and the updated match camera timepoint 1135 is subsequent to the base match camera timepoint 335.

In some instances, the difference between the base reference camera pose 320 and the updated reference camera pose 1120 is captured by the reference camera IMU 265 in the form of a reference camera transformation matrix 1170. In some implementations, the reference camera transformation matrix 1170 is a 3D rotational matrix identified based on inertial tracking data 270 obtained by the reference camera IMU 265. Similarly, the difference between the base match camera pose 330 and the updated match camera pose 1130 is captured by the match camera IMU 235 in the form of a match camera transformation matrix 1140. In some implementations, the match camera transformation matrix 1140 is also a 3D rotational matrix identified based on inertial tracking data 240 obtained by the match camera IMU 235.

As is evident in FIG. 11, because of the pose change of the reference camera 260, the position of the depiction of the physical object 305 within the updated reference frame 1110 is different when compared with the position of the depiction of the physical object 305 within the base reference frame 310. Similarly, because of the pose change of the match camera 215, the position of the depiction of the physical object 305 within the updated match frame 1115 is different when compared with the position of the depiction of the physical object 305 within the base match frame 315. Thus, the base matrix 610, if used alone, may fail to accurately map a set of pixels of the updated reference frame 1110 to a set of corresponding pixels of the updated match frame 1115 because of the pose differences of the cameras between the base timepoint(s) (e.g., the base reference camera timepoint 325 and the base match camera timepoint 335) and the updated timepoint(s) (e.g., the updated reference camera timepoint 1125 and the updated match camera timepoint 1135).

However, in some instances, utilizing the reference camera transformation matrix 1170 and/or the match camera transformation matrix 1140 in combination with the base matrix 610 may enable the system to map a set of pixels of the updated reference frame 1110 to a set of corresponding pixels of the updated match frame 1115.

Figure 12:
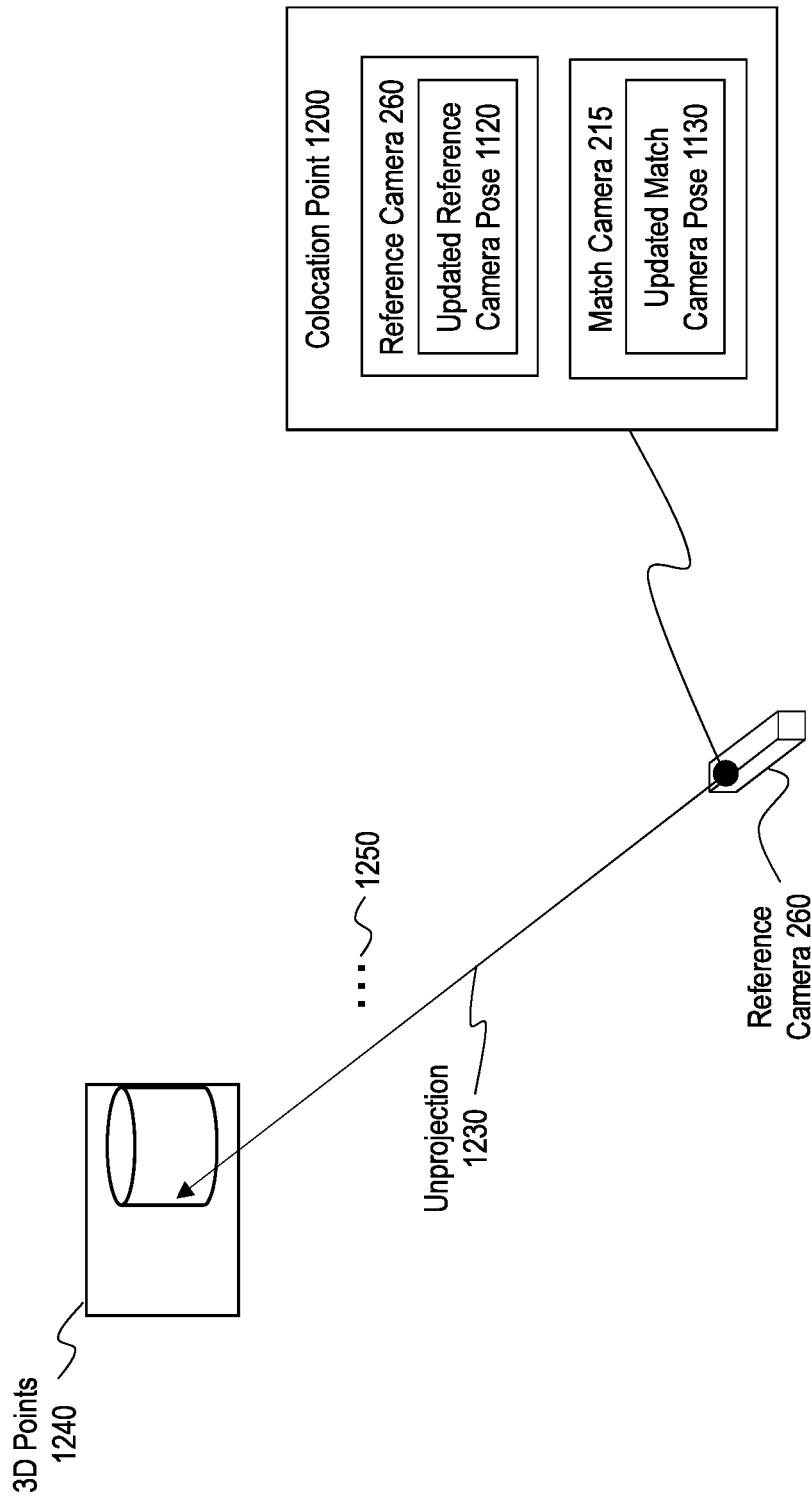
FIG. 12 illustrates an example of unprojecting a set of pixels of an updated reference frame to generate 3D points.

For example, FIG. 12 illustrates an example of generating 3D points 1240 by performing unprojection 1230 on a set of pixels of the updated reference frame 1110 captured by the reference camera 260 at the updated reference camera pose 1120. In some instances, unprojection 1230 corresponds to unprojection 730 described hereinabove with reference to FIG. 7. For example, in some instances, a system performs unprojection on the set of pixels of the updated reference frame 1110 from the colocation point 1200 using the updated reference camera pose 1120 of the reference camera 260. The ellipsis 1250 indicates that a system may perform unprojection 1230 on any number of pixels of the updated reference frame 1110 to generate the 3D points 1240.

Figure 13:
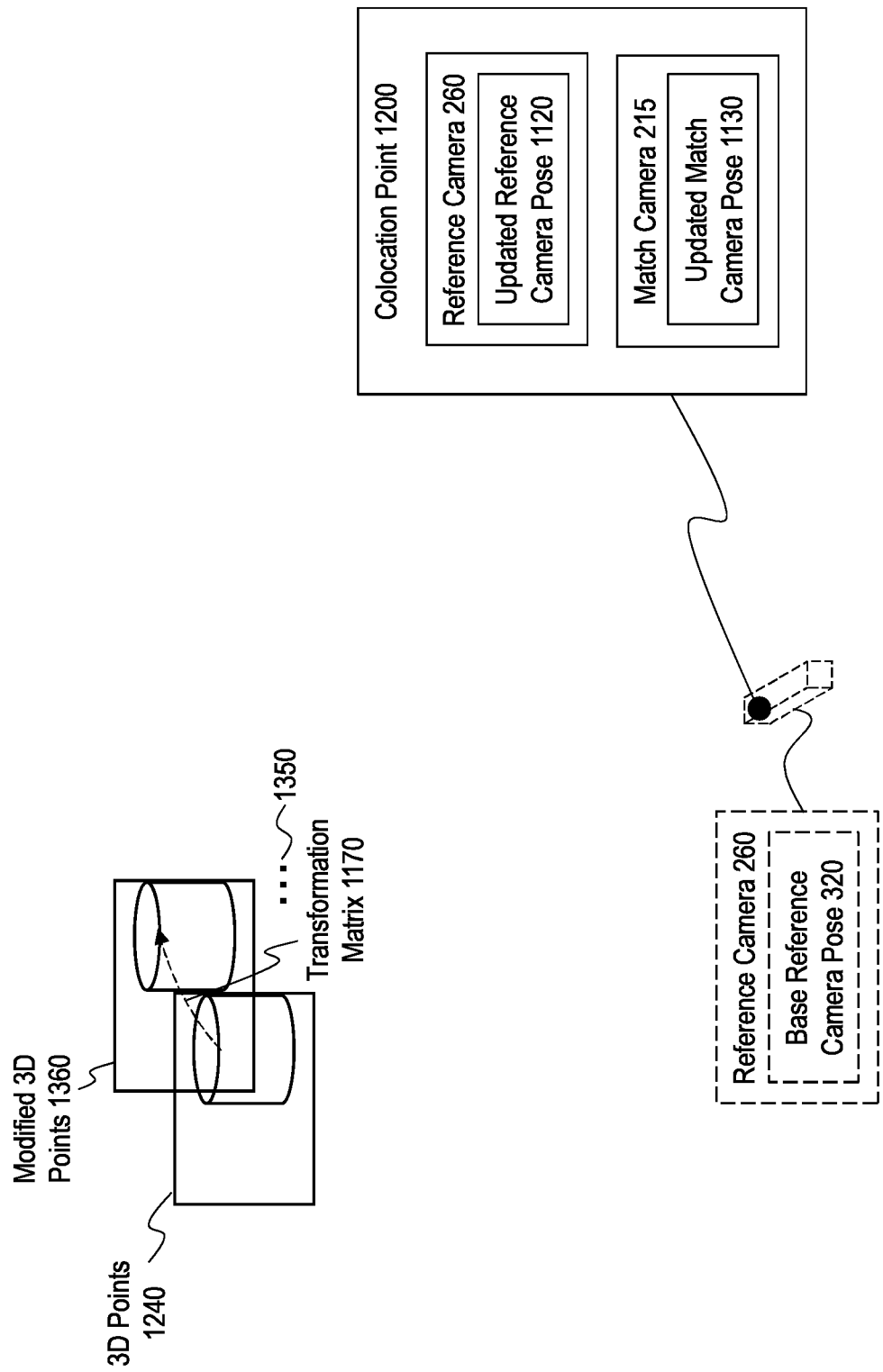
FIG. 13 illustrates an example of generating modified 3D points by applying a reference camera transformation matrix to the 3D points of FIG. 12.

FIG. 13 illustrates an example of generating modified 3D points 1360 by applying the reference camera transformation matrix 1170 to the 3D points 1240. In some instances, applying the reference camera transformation matrix 1170 rotates the 3D points 1240 into the coordinate system that existed for the 3D points 740 generated by performing unprojection 730 using the base reference frame 310 and the base reference camera pose 320. For illustrative purposes, FIG. 13 depicts the reference camera 260 positioned at the colocation point 1200 according to the base reference camera pose 320. Accordingly, applying the reference camera transformation matrix 1170 to the 3D points 1240 to generate the modified 3D points 1360 may be thought of as restoring the pose of the reference camera 260 that existed while the reference camera 260 captured the base reference frame 310 (e.g., base reference camera pose 320). The ellipsis 1350 indicates that a system may apply the reference camera transformation matrix 1170 to any number of 3D points 1240 to generate the modified 3D points 1360.

Figure 14:
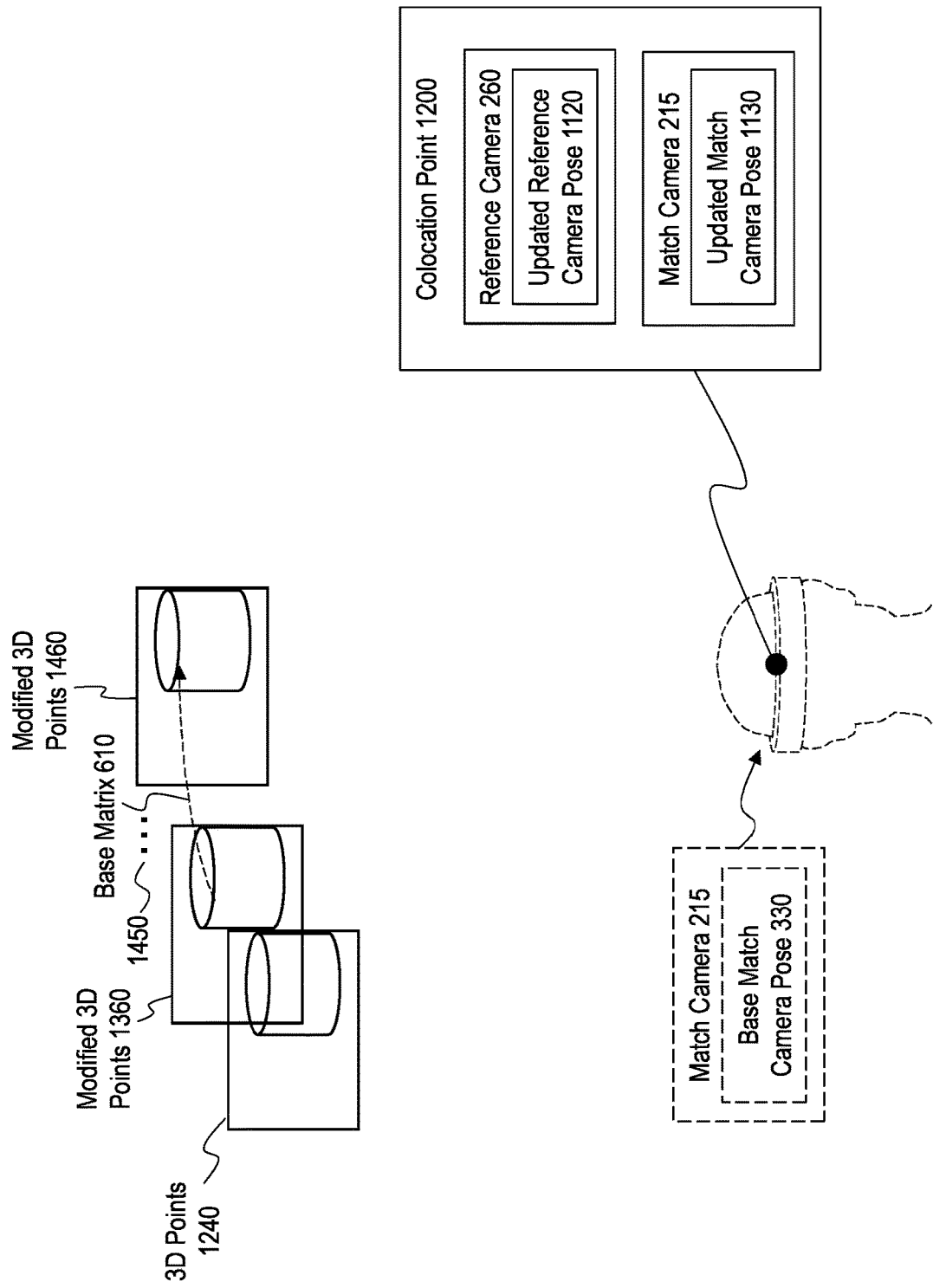
FIG. 14 illustrates an example of generating modified 3D points by applying the base matrix to the modified 3D points of FIG. 13.

FIG. 14 illustrates an example of generating modified 3D points 1460 by applying the base matrix 610 to the modified 3D points 1360. In some instances, related to applying the base matrix 610 to the 3D points 740 described hereinabove with reference to FIG. 7, applying the base matrix 610 to the modified 3D points 1360 rotates the modified 3D points into a coordinate system that would exist for 3D points unprojected using the base match frame 315 and the base match camera pose 330 (which may be the same coordinate system that existed for the modified 3D points 860 described hereinabove with reference to FIG. 8). For illustrative purposes, FIG. 14 depicts the match camera 260 positioned at the colocation point 1200 according to the base match camera pose 330. The ellipsis 1450 indicates that a system may apply the base matrix 610 to any number of modified 3D points 1360 to generate the modified 3D points 1460.

Figure 15:
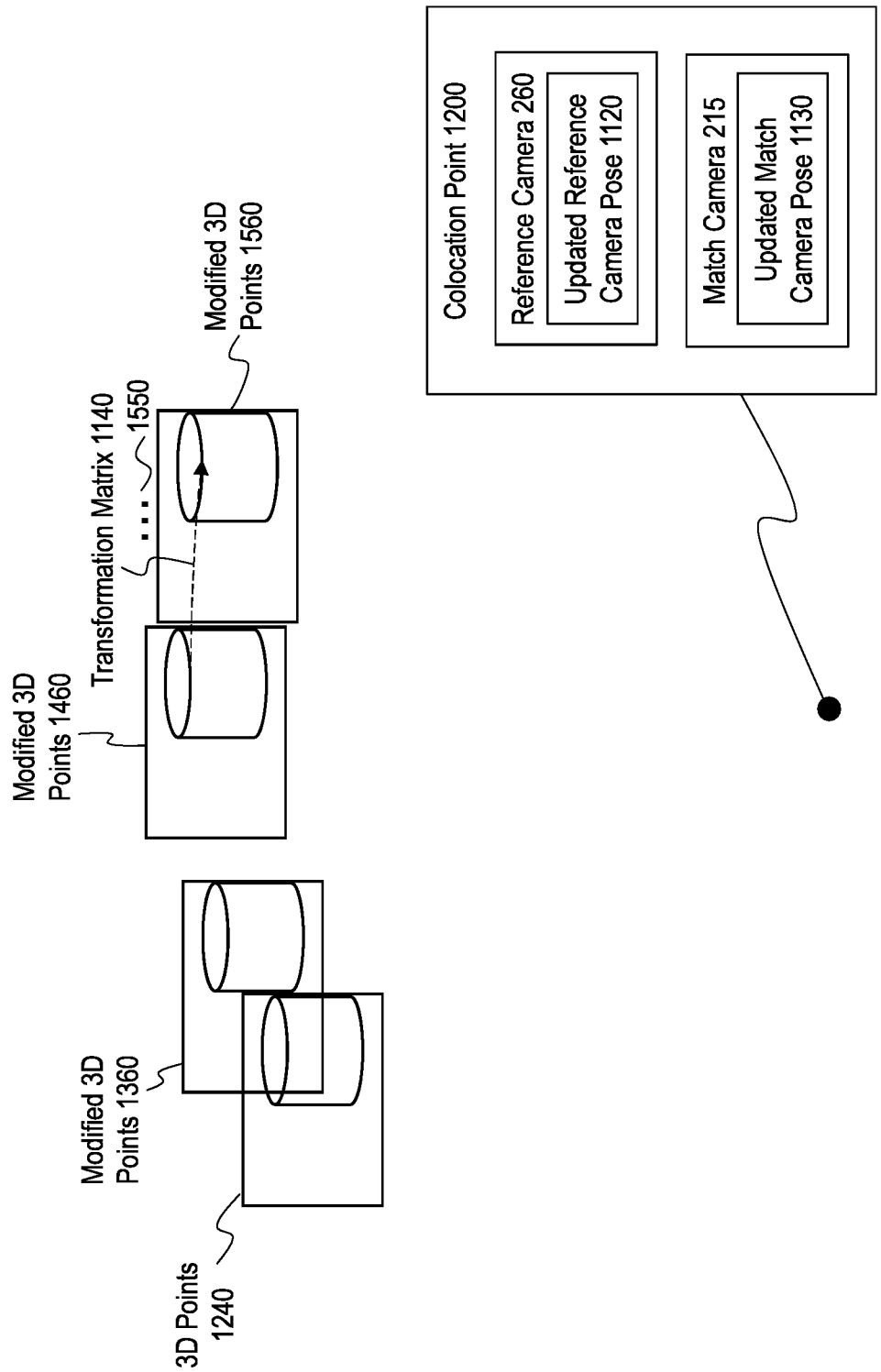
FIG. 15 illustrates an example of generating modified 3D points by applying a match camera transformation matrix to the 3D points of FIG. 14.

FIG. 15 illustrates an example of generating modified 3D points 1560 by applying the match camera transformation matrix 1140 to the modified 3D points 1460. In some instances, applying the match camera transformation matrix 1140 rotates the modified 3D points 1460 into a coordinate system that would exist for 3D points unprojected using the updated match frame 1115 and the updated match camera pose 1130. The ellipsis 1550 indicates that a system may apply the match camera transformation matrix 1140 to any number of modified 3D points 1460 to generate the modified 3D points 1560.

Figure 16:
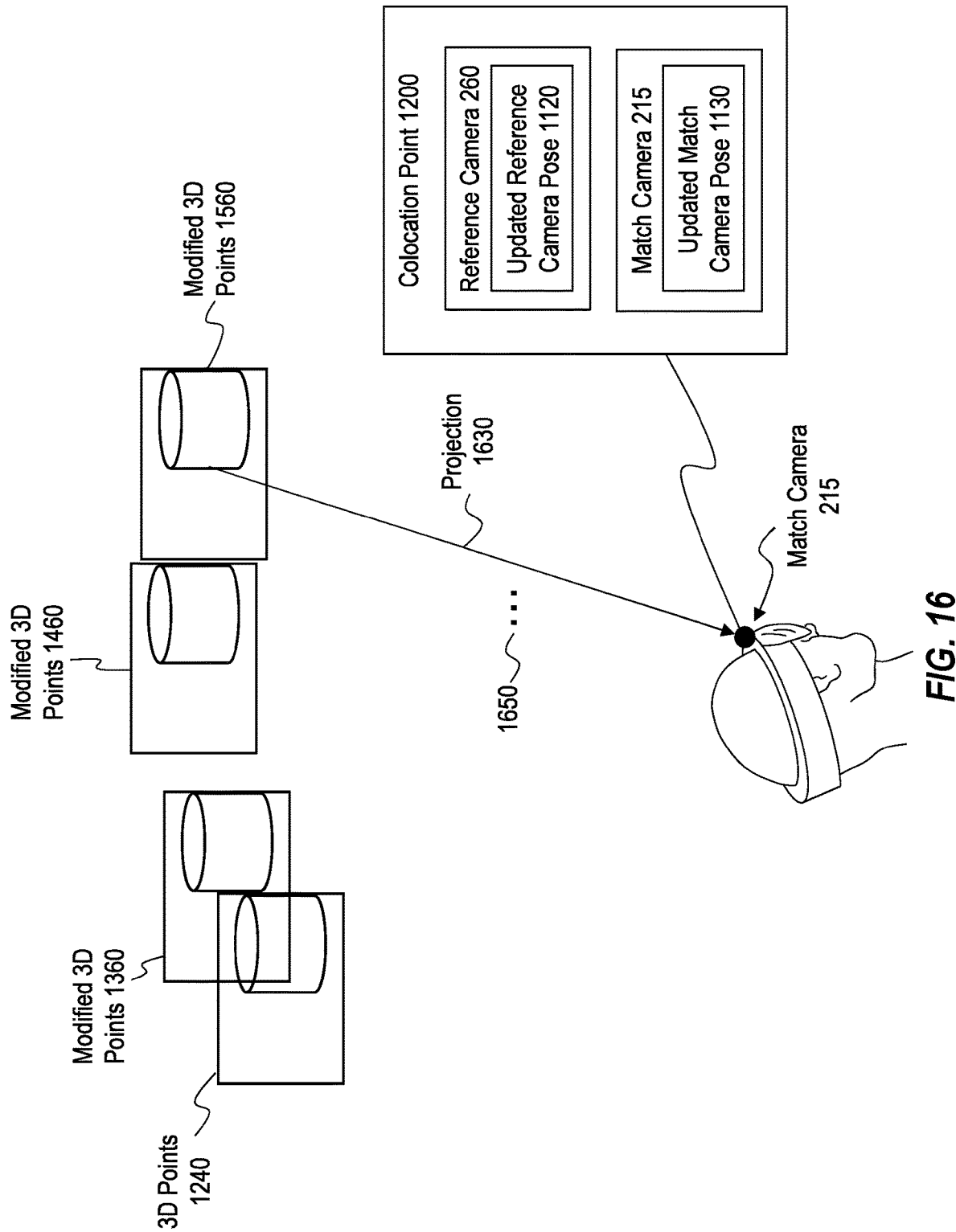
FIG. 16 illustrates an example of projecting the modified 3D points of FIG. 15.

FIG. 16 illustrates an example of performing projection 1630 on the modified 3D points 1560. In some instances, projection 1630 corresponds to projection 930 described hereinabove with reference to FIG. 8. For example, in some instances, a system performs projection 1630 on the modified 3D points 1560 toward the colocation point 1200 using the updated match camera pose 1130 of the match camera 215 to associate 2D pixel coordinates with the projected modified 3D points 1560 (and thereby associated 2D pixel coordinates with the pixels of the updated reference frame 1110 that were originally unprojected according to unprojection 1230).

Figure 17:
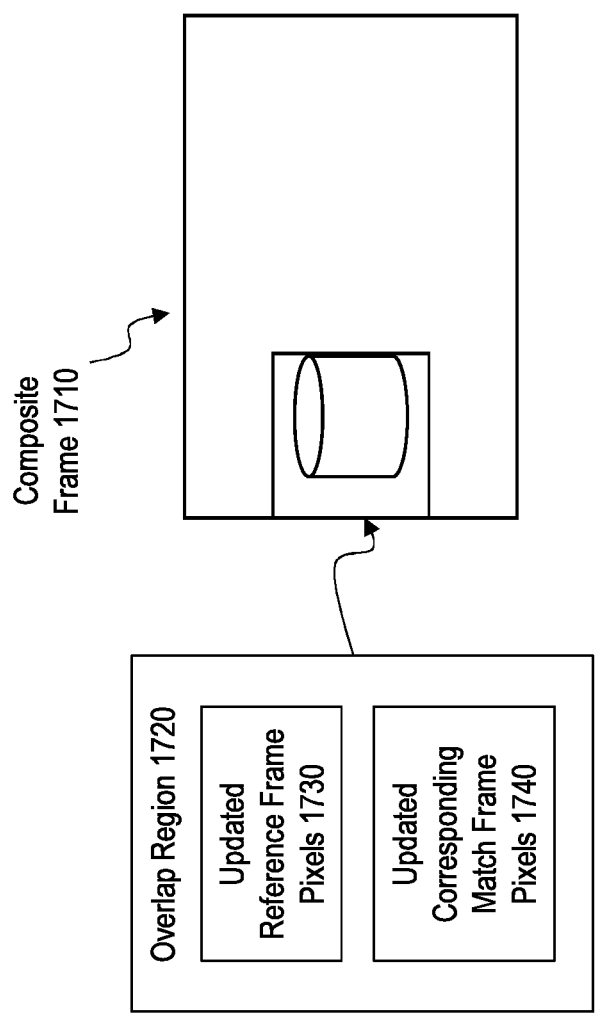
FIG. 17 illustrates an example of a composite image that includes updated reference frame pixels mapped to updated corresponding match frame pixels in an overlap region.

As before, in some implementations, a system uses the 2D pixel coordinates associated with the modified 3D points 1560 to identify a set of corresponding pixels in the updated match frame 1115 to which the system may map the set of pixels of the updated reference frame 1110 that was originally unprojected according to unprojection 1230. FIG. 17 illustrates an example of a composite frame 1710 that includes updated reference frame pixels 1730 mapped to updated corresponding match frame pixels 1740 in an overlap region 1720 of the composite frame 1710. For example, in some instances, the system applies texture information from the updated reference frame pixels 1730 to the updated corresponding match frame pixels 1740 that were identified according to the projections 1630 of the modified 3D points 1560.

Accordingly, FIGS. 12-16 illustrate facilitating image alignment of an updated reference frame and an updated match frame using a combination of 3D rotational matrices (in particular, the base matrix 610, the reference camera transformation matrix 1170, and the match camera transformation matrix 1140). The operations described hereinabove with reference to FIGS. 12-16 may be thought of as a motion model that maps the relative positioning of the reference camera 260 and the match camera 215 over time to enable continuous mapping of pixels from updated reference frames to updated match frames. The motion model may be represented by the following equation:

$$f(p) = K_{match} * P_{match\_cur} \\ * P_{match\_base}^{-1} * R_{ref \to match} * P_{ref\_base} \\ * P_{ref\_cur}^{-1} * K_{ref}^{-1} \quad (2)$$

Where f(p) is a function that maps pixels p of the reference frame to pixels p' of the match frame. As before, $K_{ref}$ represents the intrinsic matrix of the reference camera, and $K_{match}$ represents the intrinsic matrix of the match camera. $R_{ref \to match}$ represents an alignment matrix, which may be implemented as the base matrix described hereinabove. $P_{ref\_base}$ and $P_{match\_base}$ refer to the base reference camera pose 320 and the base match camera pose 330, respectively, $P_{ref\_cur}$ and $P_{match\_cur}$ refer to the updated reference camera pose 1120 and the updated match camera pose 1130, respectively. Accordingly, in some implementations, the combination of $P_{ref\_base} * P_{ref\_cur}^{-1}$ refers to the reference camera transformation matrix 1170 described hereinabove. Furthermore, in some instances, the combination of $P_{match\_cur} * P_{match\_base}^{-1}$ refers to the match camera transformation matrix 1140 described hereinabove. Accordingly, in some implementations, Equation 2 may be thought of as a motion model configured to facilitate continuous mapping of sets of pixels of updated reference frames captured by the reference camera to corresponding sets of pixels of updated match frames captured by the match camera, with the motion model being based on the base matrix, the reference camera transformation matrix, and the match camera transformation matrix.

However, inertial tracking data obtained by IMUs (e.g., inertial tracking data 240 obtained by the match camera IMU 235 and/or inertial tracking data 270 obtained by the reference camera IMU 265) may be prone to drift, which refers to accumulated errors brought about by continually integrating acceleration with respect to time. Accordingly, the accuracy of the motion model represented by Equation 2 and described hereinabove with reference to FIGS. 12-16 may degrade as poses continue to update from the time that the original base matrix 610 was computed.

Accordingly, in some implementations, a motion model utilizes an alignment matrix that is generated based on a previously computed base matrix and/or a current updated matrix (e.g., by fusing the two together). Similar to the base matrix 610 described hereinabove, in some instances, an updated matrix is also generated/identified using visual correspondences between frames captured by the reference camera 260 and the match camera 215. In addition to combatting drift, generating a motion model using matrices generated from visual correspondences of frame pairs captured at different timepoints may also ameliorate the effects that changes in the relative positioning of the cameras may have on composite images generated using the motion model.

FIG. 18 illustrates an example of performing feature matching between the updated reference frame 1110 (captured by the reference camera 260 at updated reference camera pose 1120 and timepoint 1125, see FIG. 11) and the updated match frame 1115 (captured by the match camera 215 at updated match camera pose 1130 and timepoint 1135, see FIG. 11). Similar to FIG. 4 described hereinabove, FIG. 18 illustrates various feature points associated with the physical object 305 as represented in the updated reference frame 1110 and the updated match frame 1115. For example, FIG. 18 illustrates feature points 1810A, 1810B, and 1810C on the edges of the depiction of the physical object 305 within the updated match frame 1115. FIG. 18 also depicts feature descriptors 1815A, 1815B, and 1815C that are associated, respectively, with feature points 1810A, 1810B, and 1810C.

FIG. 18 also illustrates various feature points associated with the depiction of the physical object 305 within the updated reference frame 1110. For example, FIG. 18 illustrates feature points 1820A, 1820B, and 1820C on the edges of the depiction of the physical object 305 within the updated reference frame 1110. FIG. 18 also depicts feature descriptors 1825A, 1825B, and 1825C that are associated, respectively, with feature points 1820A, 1820B, and 1820C.

As illustrated in FIG. 18, the feature points 1810A, 1810B, and 1810C within the updated match frame 1115 correspond to the feature points 1820A, 1820B, and 1820C within the updated reference frame 1110. For example, feature point 1810A within the updated match frame 1115 and feature point 1820A within the updated reference frame 1110 both represent the same 3D point along the left edge of the physical object 305. Each pair of feature points that correspond to one another form feature matches. The ellipses 1850 and 1860 indicate that a system may identify any number of feature matches within the updated reference frame 1110 and the updated match frame 1115.

Figure 19:
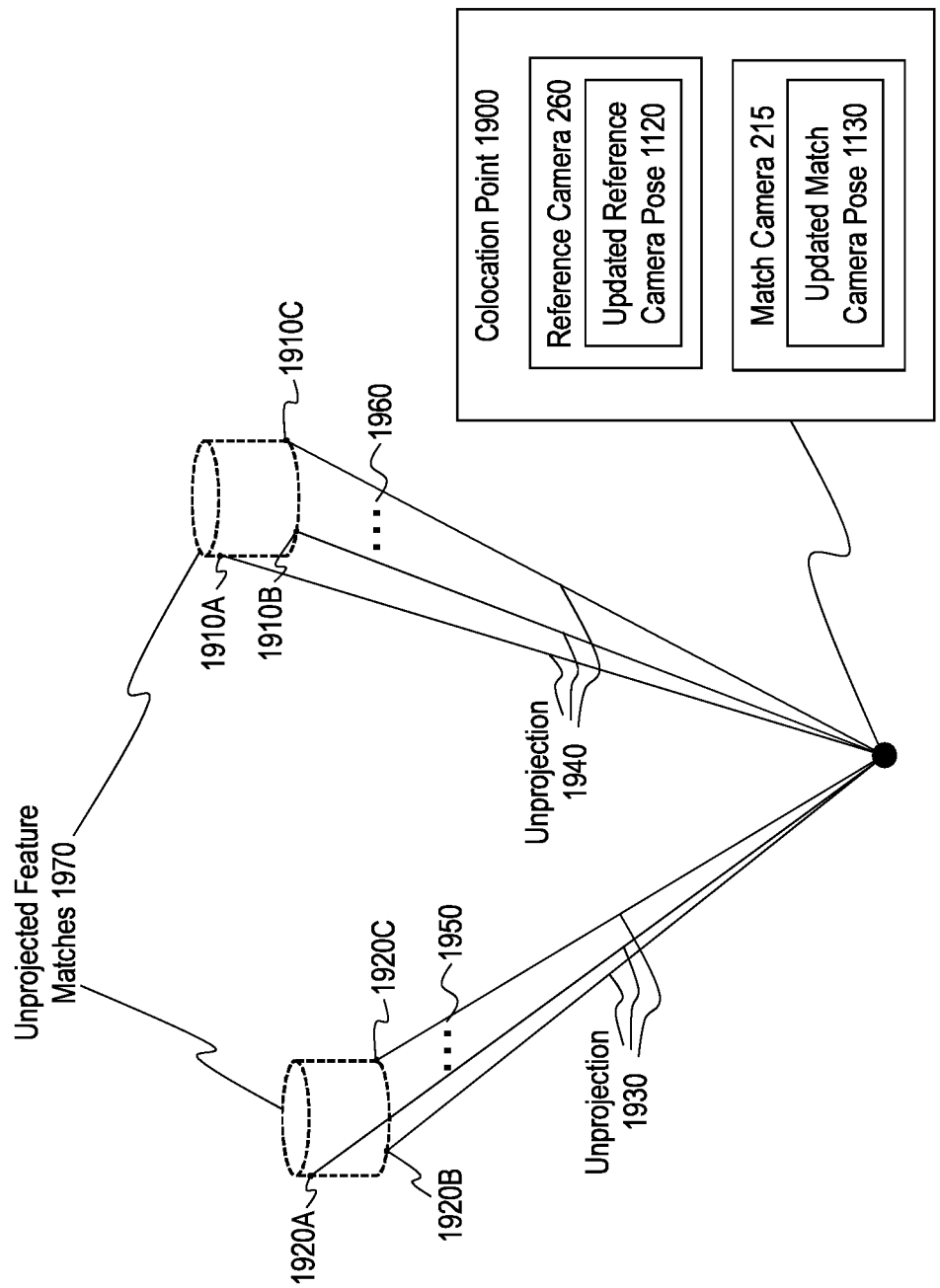
FIG. 19 illustrates an example of unprojecting the feature matches identified according to FIG. 18.

FIG. 19 illustrates an example of unprojecting the feature matches identified within the updated reference frame 1110 and the updated match frame 1115. In some instances, using the colocation point 1900 and the updated reference camera pose 1120 of the reference camera 260, a system performs unprojection 1930 on the various 2D feature points identified in the updated reference frame 1110 (e.g., feature points 1820A-1820C) to generate 3D unprojected feature points (e.g., unprojected feature points 1920A-1920C). Similarly, in some instances, using the colocation point 1900 and the updated match camera pose 1130 of the match camera 215, a system performs unprojection 1940 on the various 2D feature points identified in the updated match frame 1115 (e.g., feature points 1810A-1810C) to generate 3D unprojected feature points (e.g., unprojected feature points 1910A-1910C). The unprojections 1930, 1940 may correspond, in at least some respects, to the unprojections 530, 540 described hereinabove with reference to FIG. 5, and performing the unprojections 1930, 1940 may provide 3D unprojected feature matches 1970. The ellipses 1950 and 1960 indicate that a system may perform any number of unprojections 1930, 1940 to generate any number of 3D unprojected feature matches 1970.

Figure 20:
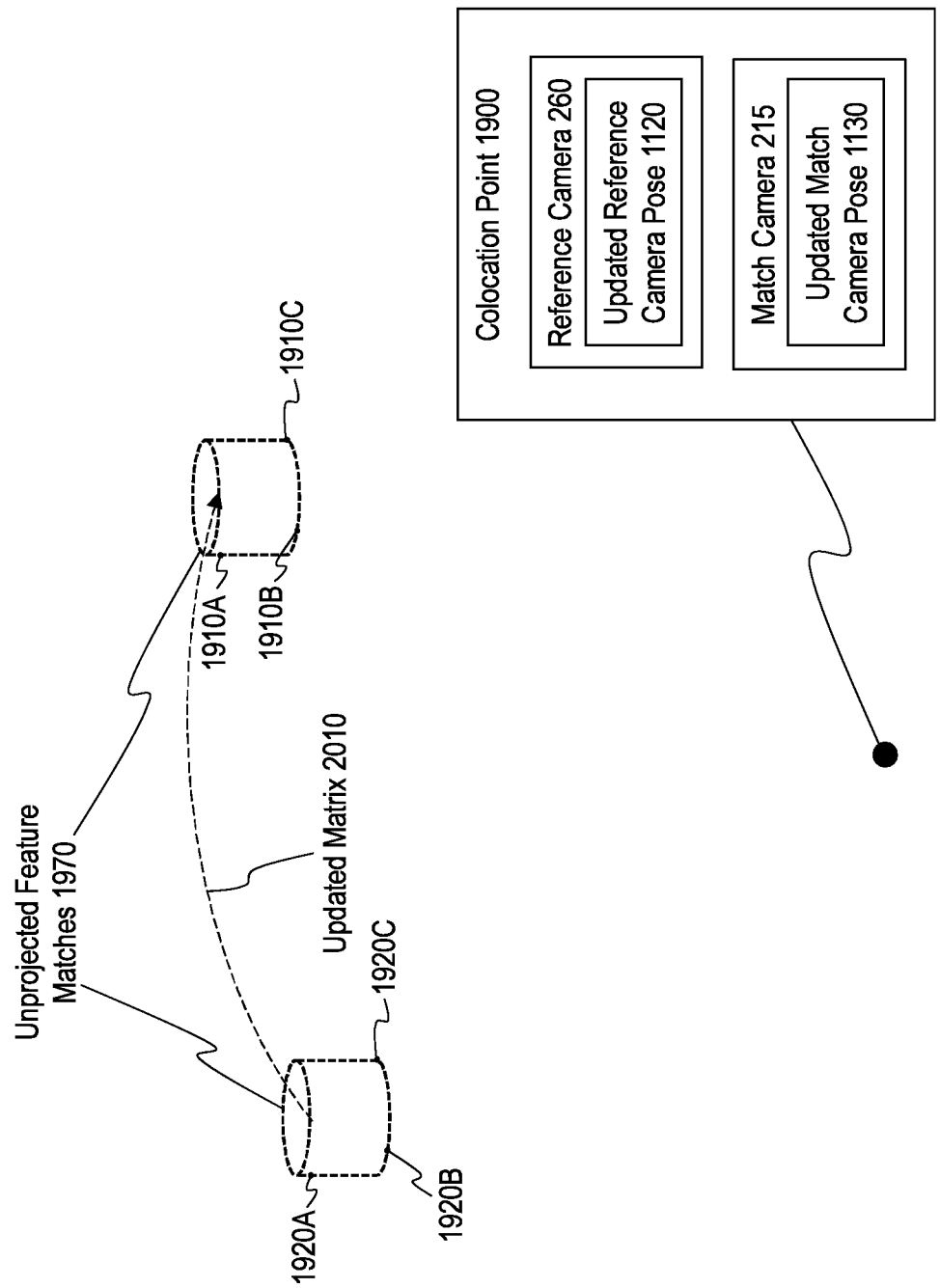
FIG. 20 illustrates an example of identifying an updated matrix using the unprojected feature matches of FIG. 19.

FIG. 20 illustrates an example of identifying an updated matrix 2010 using the unprojected feature matches 1970. As with the base matrix 610 described hereinabove, in some instances, an updated matrix 2010 represents a 3D rotation matrix that facilitates rotation of the unprojected feature points 1920A-1920C into the coordinate system of the corresponding unprojected feature points 1910A-1910C (the corresponding unprojected feature points 1910A-1910C having been unprojected using the updated match camera pose 1130). Furthermore, as with the base matrix 610, a system may identify an updated matrix 2010 using unprojected feature matches 1970 in a variety of ways, such as by minimizing a cost function (e.g., according to the Wahba method), utilizing machine learning techniques, and/or other approaches.

Although, in some implementations, a system may utilize the updated matrix 2010 to facilitate mapping of pixels of the updated reference frame 1110 to pixels of the updated match frame 1115 (e.g., by utilizing the updated matrix 2010 as $R_{ref \rightarrow match}$ in Equation 1), it should be noted that feature point identification is a noisy process. For example, the pixel coordinates of features points that describe 3D points of a captured environment may shift from expected positions across consecutively captured frames. Such occurrences may cause observable spatial flickers in overlap regions of composite frames. Furthermore, in some instances, at least some feature points that are present/identifiable in one image may not be present/identifiable in another image, even where the different images are captured using the same camera modality (e.g., because of occlusions).

Accordingly, in some implementations, a system aligns the updated matrix 2010 with a previously computed matrix (e.g., base matrix 610) to generate an alignment matrix by fusion. Utilizing such an alignment matrix in a motion model for mapping pixels from reference frames to match frames may have the effect of smoothing out noise that may otherwise affect composite frames generated using the motion model.

Figure 21:
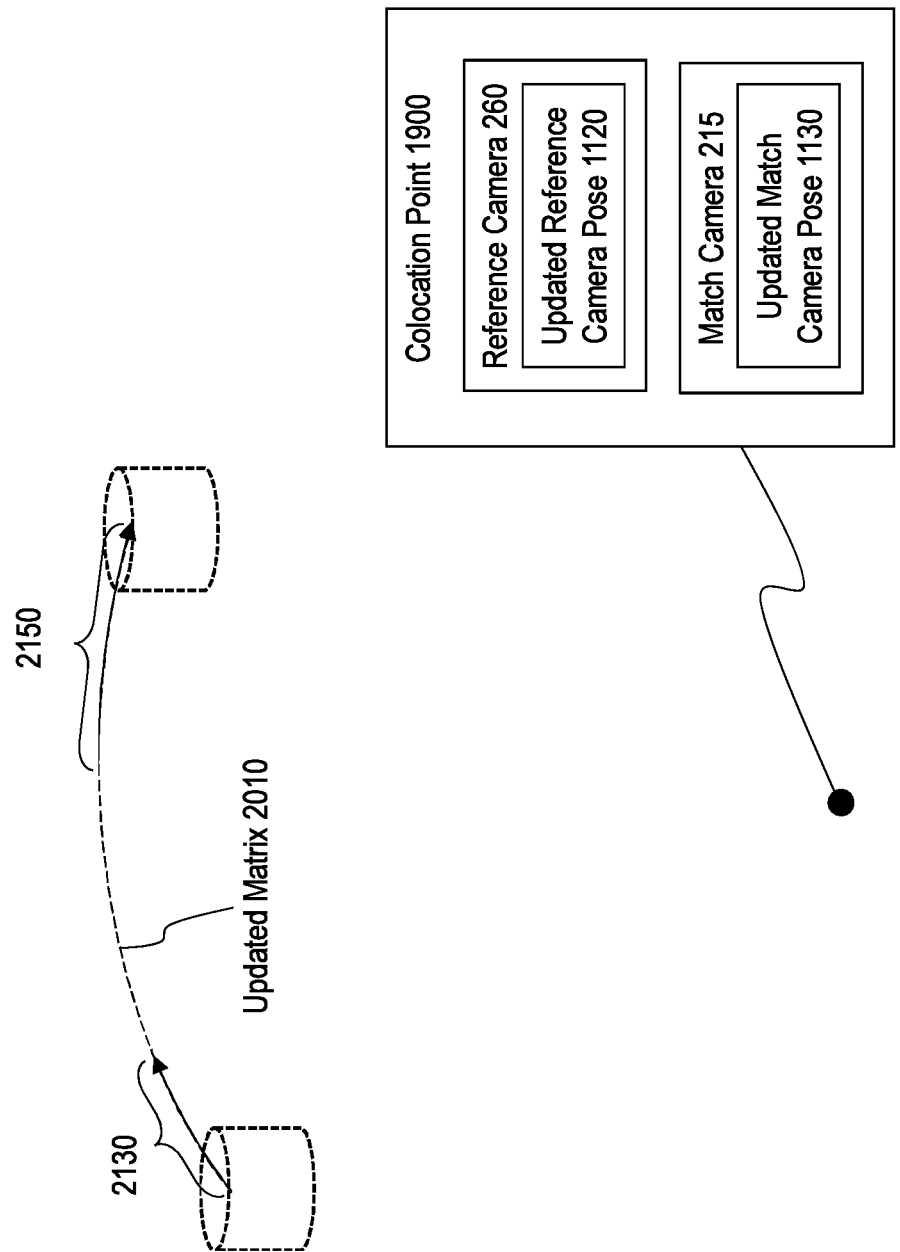

FIGS. 21 and 22 illustrate an example of generating an aligned updated matrix 2210 by modifying the updated matrix 2010 using inertial tracking data associated with the reference camera 260 and the match camera 215. As noted hereinabove, in some instances, the inertial tracking data 270 obtained by the reference camera IMU 265 tracks the pose changes of the reference camera 260 from the base reference camera timepoint 325 to the updated reference camera timepoint 1125 (e.g., by identifying the base reference camera pose 320 and the updated reference camera pose 1120). Similarly, the inertial tracking data 240 obtained by the match camera IMU 235 tracks the pose changes of the match camera 215 from the base match camera timepoint 335 to the updated match camera timepoint 1135 (e.g., by identifying the base match camera pose 330 and the updated match camera pose 1130).

In some instances, a system utilizes the inertial tracking data described above to modify the updated matrix 2010 to bring the updated matrix 2010 into the same reference/coordinate system that exists for the base matrix 610. FIG. 21 illustrates a conceptual representation of a system modifying the 3D rotation described by the updated matrix 2010 by identifying a reference camera rotational matrix 2130 and a match camera rotational matrix 2150 based on the inertial tracking data that describes the motion of the reference camera 260 and the match camera 215 between capturing the base frames (e.g., the base reference frame 310 and the base match frame 315) and the updated frames (e.g., the updated reference frame 1110 and the updated match frame 1115). The system modifies the updated matrix 2010 with the reference camera rotational matrix 2130 and the match camera rotational matrix 2150 to generate the aligned updated matrix 2210, as shown in FIG. 22. Generating the aligned updated matrix 2210 by using the reference camera rotational matrix 2130 and the match camera rotational matrix 2150 may be conceptualized as undoing the motion that occurred between when the base fames were captured (e.g., the base reference frame 310 and the base match frame 315) and when the updated frames were captured (e.g., the updated reference frame 1110 and the updated match frame 1115). Generating an aligned updated matrix 2210 may be represented by the following equation:

$$R'_{ref \rightarrow match} = P_{match\_base} * P_{match\_cur}^{-1} * R'_{ref\_cur \rightarrow match\_cur} * P_{ref\_cur} * P_{ref\_base}^{-1} \quad (3)$$

Where $R'_{ref \rightarrow match}$ may represent the aligned updated matrix 2210. As before, $R_{ref \rightarrow match}$ may represent the base matrix 610 described hereinabove. Furthermore, as before, $P_{ref\_base}$ and $P_{match\_base}$ refer to the base reference camera pose 320 and the base match camera pose 330, respectively, $P_{ref\_cur}$ and $P_{match\_cur}$ refer to the updated reference camera pose 1120 and the updated match camera pose 1130, respectively. In some implementations, the combination of $P_{ref\_cur} * P_{ref\_base}^{-1}$ refers to the reference camera rotational matrix 2130 described hereinabove. Furthermore, in some instances, the combination of $P_{match\_base} * P_{match\_cur}^{-1}$ refers to the match camera rotational matrix 2150 described hereinabove.

FIG. 22 also depicts the base matrix 610 and illustrates that, in some instances, although the aligned updated matrix 2210 and the base matrix 610 are computed to share the same reference/coordinate system, differences exist between the base matrix 610 and the aligned updated matrix 2210 (e.g., because of IMU drift, noise in performing feature matching, changes in relative positioning of the reference camera 260 and the match camera 215, etc.). Accordingly, in some implementations, a system fuses the base matrix 610 with the aligned updated matrix 2210 to generate an alignment matrix for a motion model to facilitate continuous image alignment of separate camera imagery.

Figure 23A:
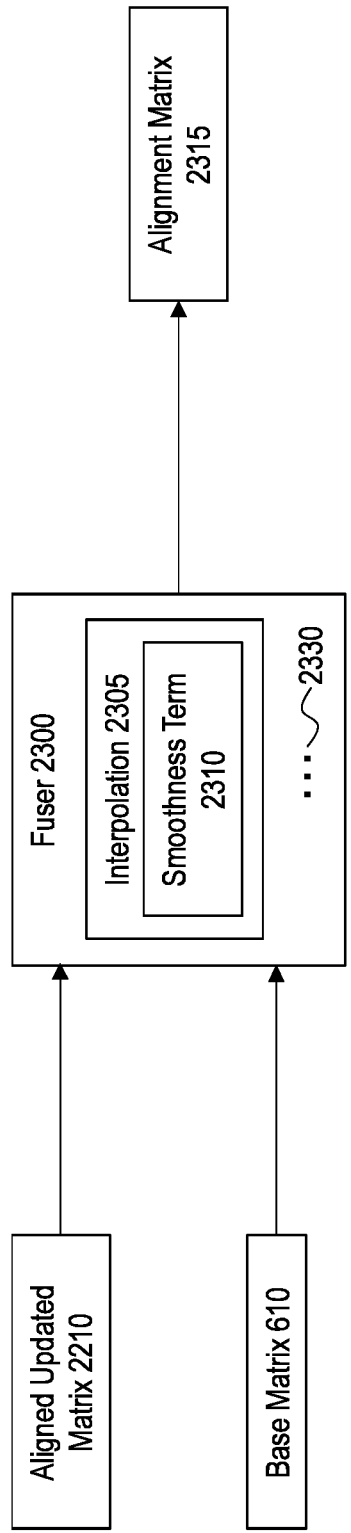
FIG. 23A illustrates an example of generating an alignment matrix using a base matrix and the aligned updated matrix from FIGS. 21 and 22.

FIG. 23A illustrates an example of generating an alignment matrix 2315 using the base matrix 610 and the aligned updated matrix 2210. FIG. 23A illustrates that, in some instances, a system uses the alignment updated matrix 2210 and the base matrix 610 as inputs for a fuser 2300. In the implementation depicted in FIG. 23A, the fuser 2300 implements an interpolation function 2305, which, in essence, blends or combines the aligned updated matrix 2210 with the base matrix 610 to generate the alignment matrix 2315. The alignment matrix 2315 is, in some instances, also a 3D rotation matrix.

FIG. 23A also illustrates that, in some instances, the interpolation function 2305 utilizes a smoothness term 2310 (or smoothness function). In some implementations, the smoothness term determines how to weight the aligned updated matrix 2210 and the base matrix 610 for generating the alignment matrix 2315. By way of example, in some implementations, when the smoothness term 2310 has a value that approaches a maximum value (e.g., a value of 1), the interpolation function 2305 increasingly ignores the aligned updated matrix 2210, giving more weight to the base matrix 610 for generating the alignment matrix 2315, which may be beneficial when the expected accuracy of the base matrix 610 is high. Furthermore, in some implementations, when the smoothness term 2310 has a value that approaches a minimum value (e.g., a value of 0), the interpolation function 2305 increasingly ignores the base matrix 610, giving more weight to the aligned updated matrix 2210 for generating the alignment matrix 2315, which may be beneficial when the expected accuracy of the base matrix 610 is low.

In some instances, the smoothness term 2310 is set to a constant value between (e.g., a value between 0 and 1, such as a value of 0.7), whereas in other instances, the smoothness term 2310 is intelligently determined/updated based on various factors (e.g., an expected accuracy of the base matrix). Additional details concerning intelligently determining a smoothness term 2310 will be provided hereinafter.

The ellipsis 2330 indicates that, in some instances, a fuser 2300 incorporates additional and/or alternative components.

Figure 23B:
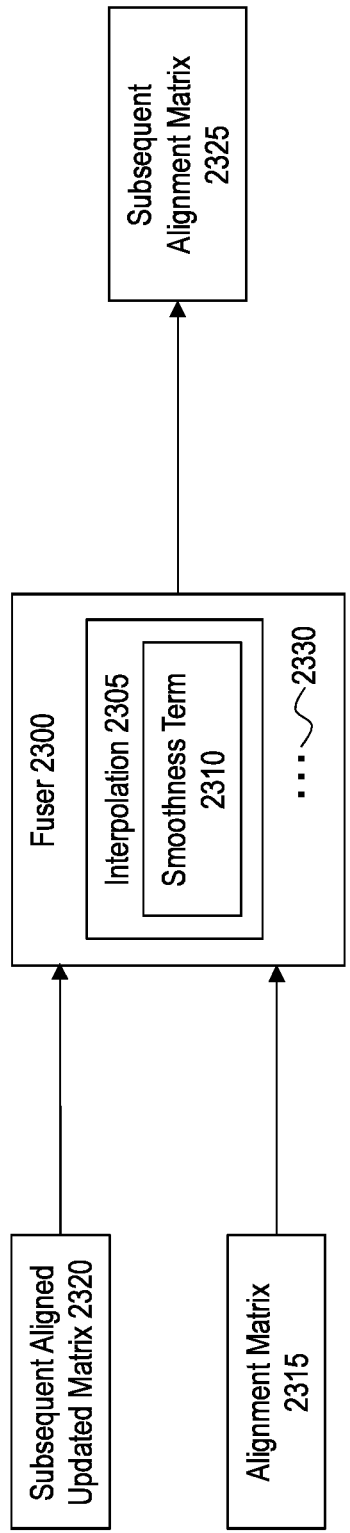
FIG. 23B illustrates an example of generating a subsequent alignment matrix using the alignment matrix from FIG. 23A and a subsequent aligned updated matrix.

Generating an alignment matrix 2315 using an aligned updated matrix 2210 and a base matrix 610 (or a previous alignment matrix) may be represented by the following equation:

$$R_{ref \to match} = \text{interpolate}(R'_{ref \to match}, R_{ref \to match}, \text{smoothness}( )) \quad (4)$$

Where $R_{ref \to match}$ on the left side of Equation 4 may represent the alignment matrix 2315 described hereinabove. The function interpolate( ) may represent the interpolation function 2305 of the fuser 2300 described hereinabove, and the function smoothness( ) may represent the smoothness term 2310 described hereinabove. $R_{ref \to match}'$ may refer to the aligned updated matrix 2210, and $R_{ref \to match}$ on the right side of the equation may refer to the base matrix 610, or, in some instances, may refer to a previously computed alignment matrix. For example, FIG. 23B illustrates a fuser 2300 receiving the alignment matrix 2315 generated according to FIG. 23A and a subsequent aligned updated matrix 2320 (e.g., an aligned updated matrix generated subsequent to generating the alignment matrix 2315 from FIG. 23A) as inputs for generating a subsequent alignment matrix 2325. Thus, in some instances, a system utilizes an identified alignment matrix in conjunction with a subsequent updated matrix in order to identify a subsequent alignment matrix. Accordingly, generating alignment matrices may be thought of as a running average that incorporates past alignment matrices to generate new alignment matrices.

Figure 24:
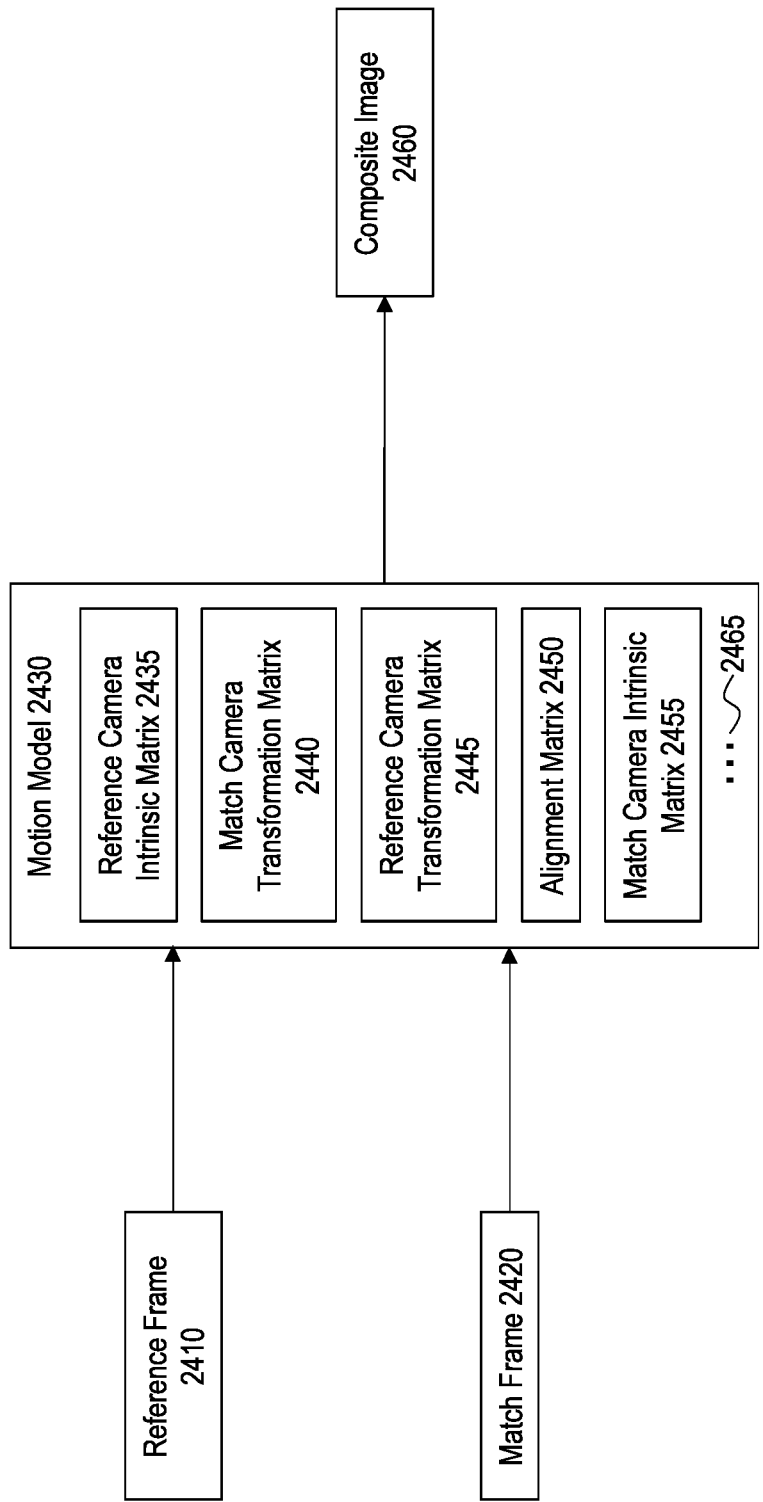
FIG. 24 illustrates an example of generating a composite image using a reference frame, a match frame, and a motion model.

In some instances, a system utilizes the alignment matrix 2315 as part of the motion model for mapping a set of pixels from a reference frame to a corresponding set of pixels of a match frame (e.g., by utilizing $R_{ref \to match}$ on the left side of Equation 4 as $R_{ref \to match}$ in Equation 2). For example, FIG. 24 illustrates an example of a motion model 2430 configured to map a reference frame 2410 onto a match frame 2420. The motion model 2430 of FIG. 24 includes a reference camera intrinsic matrix 2435 and a match camera intrinsic matrix 2455 (e.g., to facilitate the unprojection and/or projection operations described hereinabove, such as those referred to with reference to FIGS. 5, 7, 9, 12, 16, and 19 and/or with reference to Equations 1 and 2). The motion model 2430 of FIG. 24 also includes a match camera transformation matrix 2440 and a reference camera transformation matrix 2445 (e.g., for application to 3D points and/or to modify/align updated matrices, as depicted in FIGS. 13, 15, and 21 and/or in Equations 2 and 3). The motion model 2430 also includes an alignment matrix 2450, which may correspond to a base matrix 610, an aligned updated matrix 2210, an alignment matrix 2315, and/or a subsequent alignment matrix 2325 described hereinabove. The ellipsis 2465 indicates that a motion model 2430 may comprise any number of components, including or different than those depicted in FIG. 24.

In some instances, a system utilizes the motion model 2430 to map pixels of a reference frame 2410 to pixels of a match frame 2420 in order to generate a composite image 2460. For example, in some implementations, a system generates 3D points by unprojecting pixels of the reference frame 2410 using the reference camera intrinsic matrix 2435; generates modified 3D points by applying the reference camera transformation matrix 2445, the alignment matrix 2450, and the match camera transformation matrix 2440 to the 3D points; and projects the modified 3D points to generate a composite image 2460 that overlays the pixels of the reference frame 2410 onto corresponding pixels of the match frame 2420.

Example Method(s) for Continuous Image Alignment of Separate Cameras

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 25:
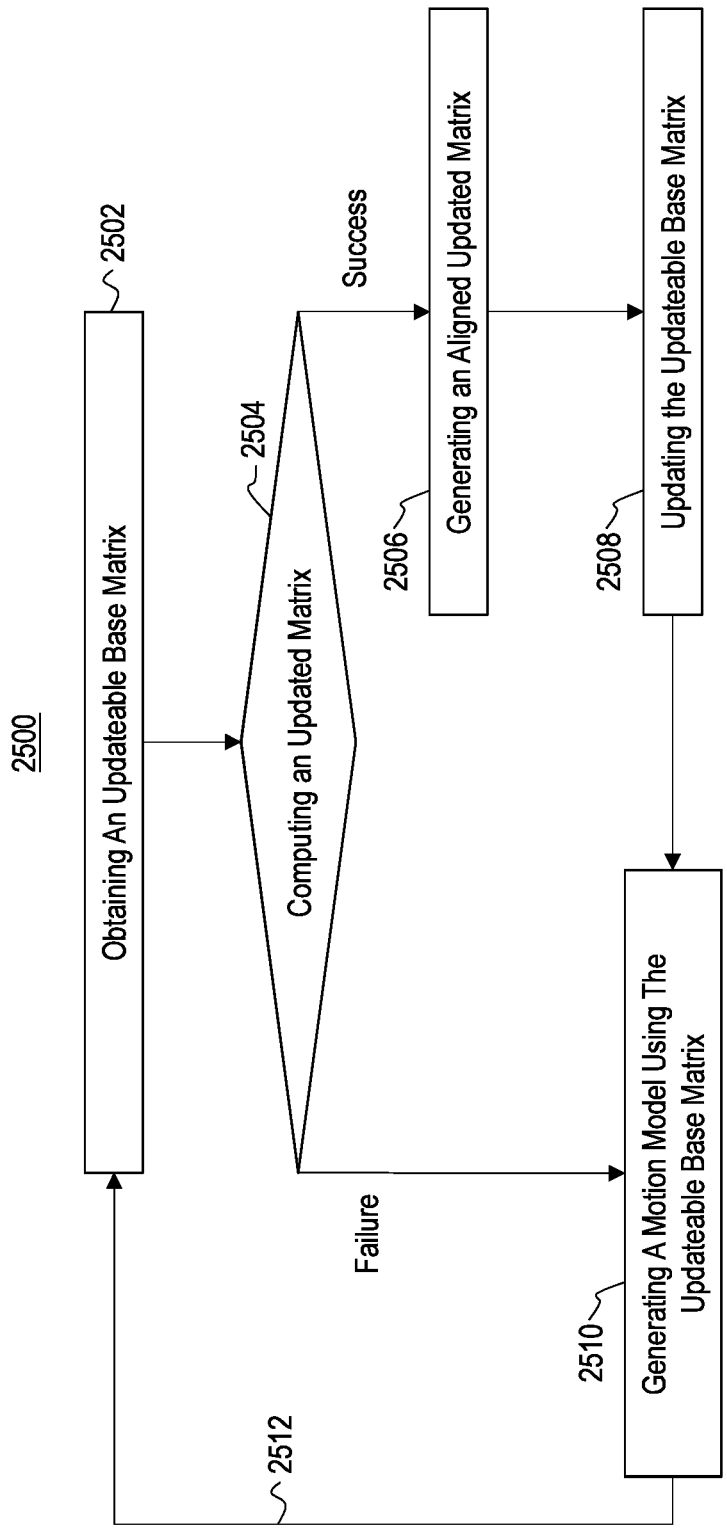
FIG. 25 illustrates an example flow diagram depicting acts associated with generating a motion model configured to facilitate mapping of a set of pixels of a reference frame captured by a reference camera to a corresponding set of pixels of a match frame captured by a match camera.

FIG. 25 illustrates an example flow diagram 2500 depicting acts associated with generating a motion model configured to facilitate mapping of a set of pixels of a reference frame captured by a reference camera to a corresponding set of pixels of a match frame captured by a match camera. The discussion of the various acts represented in flow diagram 2500 includes references to various hardware components described in more detail with reference to FIGS. 1, 2, and 44.

Act 2502 of flow diagram 2500 includes obtaining an updateable base matrix. Act 2502 is performed, in some instances, using one or more processors 4405 of a computer system 4400 (e.g., an HMD 200 and/or a user instrument 250) and using images captured by a reference camera 260 and a match camera 215. For example, in some instances, the updateable base matrix is a 3D rotation matrix obtained using based on visual correspondences between a base reference frame captured by the reference camera at a base reference camera pose and a base match frame captured by the match camera at a base match camera pose.

In some implementations, a computer system obtains an updateable base matrix by identifying a set of base feature matches by performing feature matching between the base reference frame and the base match frame. The computer system then generates a set of unprojected base feature matches by unprojecting the base feature matches into 3D space. The computer system then computes the updateable base matrix based on the set of unprojected base feature matches by minimizing a cost function (e.g., according to the Wahba method).

Act 2504 of flow diagram 2500 includes computing an updated matrix. Act 2504 is performed, in some instances, using one or more processors 4405 of a computer system 4400 (e.g., an HMD 200 and/or a user instrument 250) and using images captured by a reference camera 260 and a match camera 215. In some instances, a computer system computes an updated matrix using visual correspondences between an updated reference frame captured by the reference camera at an updated reference camera pose and an updated match frame captured by the match camera at an updated match camera pose for generating an updated matrix.

In some implementations, a computer system computes an updated matrix by identifying a set of updated feature matches by performing feature matching between the updated reference frame and the updated match frame. The computer system also generates a set of unprojected updated feature matches by unprojecting the updated feature matches into 3D space, and the computer system computes the updated matrix based on the set of unprojected updated feature matches by minimizing a cost function. In some implementations, the computer system computes the updated matrix using the Wahba method.

In response to successfully computing an updated matrix according to act 2504, act 2506 of flow diagram 2500 includes generating an aligned matrix, and act 2508 of flow diagram 2500 includes updating the updateable base matrix. Acts 2506 and 2508 are performed, in some instances, using one or more processors 4405 of a computer system 4400 (e.g., an HMD 200 and/or a user instrument 250). In some instances, a computer system generates an aligned updated matrix (according to act 2506) using a base reference camera pose, a base match camera pose, an updated reference camera pose, and an updated match camera pose, which may be poses associated with the updateable base matrix obtained according to act 2502. Furthermore, in some instances, a computer system updates the updateable base matrix (according to act 2508) by using the aligned updated matrix and the updateable base matrix (as previously obtained according to act 2502) as inputs for updating the updateable base matrix. The computer system may then proceed to perform act 2510, which includes generating a motion model using the updateable base matrix.

It should be noted that, in some instances, a computer system fails to compute an updated matrix. For example, in some instances, the match camera and the reference camera are not directed toward a common portion of a captured environment which may cause a system to fail to identify feature correspondences between a reference frame and a match frame. A computer system may fail to identify feature points for other reasons as well, such as occlusions, differences in camera modalities, etc. Failure to identify feature points within the match frame and/or the reference frame may cause the system to fail to compute an updated matrix.

In response to failing to compute an updated matrix according to act 2504, in some implementations, a computer system refrains from updating the updateable base matrix obtained according to act 2502. Instead, the computer system proceeds to act 2510 with the updateable base matrix obtained according to act 2502 (without updating the updateable base matrix, in contrast with act 2508 performed in response to successfully computing an updated matrix according to act 2504).

Act 2510 of flow diagram 2500 includes generating a motion model using the updateable base matrix (whether the updateable base matrix was updated according to act 2508 or not). Act 2510 is performed, in some instances, using one or more processors 4405 of a computer system 4400 (e.g., an HMD 200 and/or a user instrument 250). In some instances, a computer system the motion model includes the updateable base matrix, a reference camera transformation matrix generated based on inertial tracking data associated with the reference camera, and a match camera transformation matrix generated based on inertial tracking data associated with the match camera.

Arrow 2512 of flow diagram 2500 indicates that, in some instances, an updateable base matrix obtained according to act 2502 is updateable base matrix that was used to generate the motion model according to act 2510, whether the updateable base matrix was updated according to act 2508 or not. In this sense, an updateable base matrix may be regarded as a running average.

Figure 26:
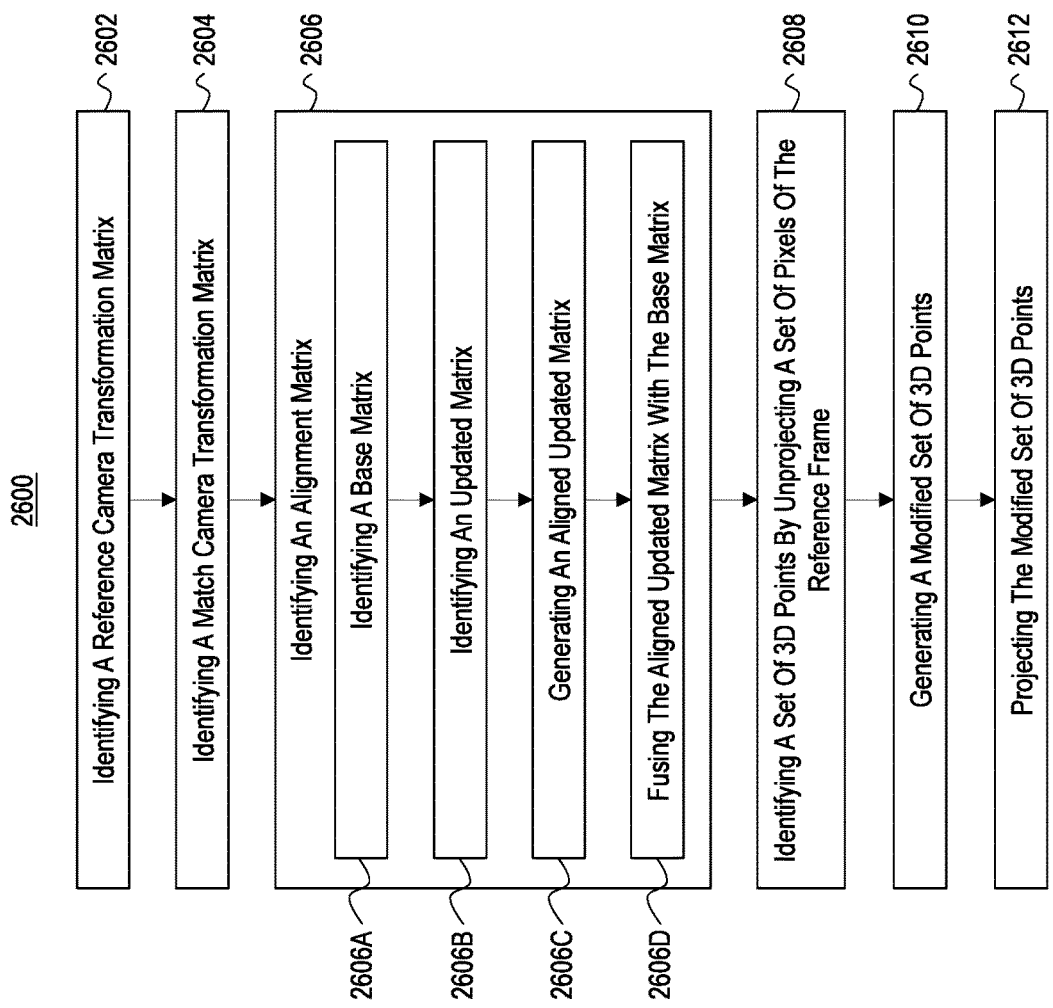
FIG. 26 illustrates an example flow diagram depicting acts associated with facilitating continuous image alignment of two cameras.

FIG. 26 illustrates an example flow diagram 2600 depicting acts associated with facilitating continuous image alignment of two cameras. The discussion of the various acts represented in flow diagram 2600 includes references to various hardware components described in more detail with reference to FIGS. 1, 2, and 44.

Act 2602 of flow diagram 2600 includes identifying a reference camera transformation matrix. Act 2602 of flow diagram 2600 is performed, in some instances, using one or more processors 4405 of a computer system 4400 (e.g., an HMD 200 and/or a user instrument 250). In some implementations, the reference camera transformation matrix is a 3D rotational matrix (e.g., identified based on inertial tracking data 270 obtained by a reference camera IMU 265) between a base reference camera pose and an updated reference camera pose, the base reference camera pose being associated with a base reference camera timepoint that occurs prior to an updated reference camera timepoint.

Act 2604 of flow diagram 2600 includes identifying a match camera transformation matrix. Act 2604 of flow diagram 2600 is performed, in some instances, using one or more processors 4405 of a computer system 4400 (e.g., an HMD 200 and/or a user instrument 250). In some implementations, the match camera transformation matrix is a 3D rotational matrix (e.g., identified based on inertial tracking data 240 obtained by a match camera IMU 235) between a base match camera pose and an updated match camera pose, the base match camera pose being associated with a base match camera timepoint that occurs prior to an updated match camera timepoint.

Act 2606 of flow diagram 2600 includes identifying an alignment matrix. Act 2606 of flow diagram 2600 is performed, in some instances, using one or more processors 4405 of a computer system 4400 (e.g., an HMD 200 and/or a user instrument 250). In some instances, the alignment matrix is based on visual correspondences between one or more reference frames captured by the reference camera and one or more match frames captured by the match camera Identifying an alignment matrix according to act 2606 may include various acts. For example, flow diagram 2600 illustrates that act 2606A includes identifying a base matrix (it should be noted that a base matrix may refer to a previously computed alignment matrix). In some instances, a computer system identifies a base matrix by identifying a set of base feature matches by performing feature matching between a base reference frame captured by the reference camera at the base reference camera pose and a base match frame captured by the match camera at the base match camera pose. The computer system also generates a set of unprojected base feature matches by unprojecting the base feature matches into 3D space. The computer system may then compute the base matrix based on the set of unprojected base feature matches by minimizing a cost function (e.g., according to the Wahba method). In some instances, the base matrix is a 3D rotation matrix.

Act 2606B includes identifying an updated matrix. In some instances, a computer system identifies an updated matrix by identifying a set of updated feature matches by performing feature matching between an updated reference frame captured by the reference camera at the updated reference camera pose and an updated match frame captured by the match camera at the updated match camera pose. The computer system also generates a set of unprojected updated feature matches by unprojecting the updated feature matches into 3D space. The computer system may then compute the updated matrix based on the set of unprojected updated feature matches by minimizing a cost function.

Act 2606C includes generating an aligned updated matrix. In some instances, a computer system generates the aligned updated matrix by aligning the updated matrix with the base matrix using the base reference camera pose, the base match camera pose, the updated reference camera pose, and the updated match camera pose.

Act 2606D includes fusing the aligned updated matrix with the base matrix. In some instances, a computer system fuses the aligned updated matrix with the base matrix by applying the aligned updated matrix and the base matrix as inputs to a function for generating the alignment matrix. In some implementations, the function for generating the alignment matrix is an interpolation function, and the interpolation function may comprise a smoothness term that determines weights of the aligned updated matrix and the base matrix for generating the alignment matrix.

Act 2608 of flow diagram 2600 includes identifying a set of 3D points by unprojecting a set of pixels of the reference frame. Act 2608 of flow diagram 2600 is performed, in some instances, using one or more processors 4405 of a computer system 4400 (e.g., an HMD 200 and/or a user instrument 250). In some instances, a computer system identifies the 3D points by unprojecting the set of pixels of the reference frame using an intrinsic matrix of the reference camera and using a uniform depth.

Act 2610 of flow diagram 2600 includes generating a modified set of 3D points. Act 2610 of flow diagram 2600 is performed, in some instances, using one or more processors 4405 of a computer system 4400 (e.g., an HMD 200 and/or a user instrument 250). In some instances, a computer system generates a modified set of 3D points by applying the motion model to the set of 3D points identified according to act 2608.

Act 2612 of flow diagram 2600 includes projecting the modified set of 3D points. Act 2612 of flow diagram 2600 is performed, in some instances, using one or more processors 4405 of a computer system 4400 (e.g., an HMD 200 and/or a user instrument 250). In some instances, a computer system projects the modified set of 3D points (from act 2610) using an intrinsic matrix of the match camera. The projected modified set of 3D points may enable a computer system to generate a composite image for display to a user (e.g., on displays 225A and 225B of an HMD 200).

Updating Continuous Image Alignment of Separate Cameras

As described hereinabove, a system may generate a motion model that is configured to facilitate continuous mapping of sets of pixels from a reference frame to a corresponding sets of pixels of a match frame, even as the pose of the reference camera and the match camera change over time (see, e.g., FIGS. 11-17 and Equations 2 and 4). A motion model includes an alignment matrix, which may be thought of as a running average that uses a previous alignment matrix and an aligned current matrix to generate an updated alignment matrix for use in the motion model (as used herein, a "current matrix" may be thought of as analogous to an "updated matrix" as used herein). In some instances, as described hereinabove, a computer system fuses a previous alignment matrix (or base matrix) with an aligned current matrix to generate the updated alignment matrix.

Figure 27:
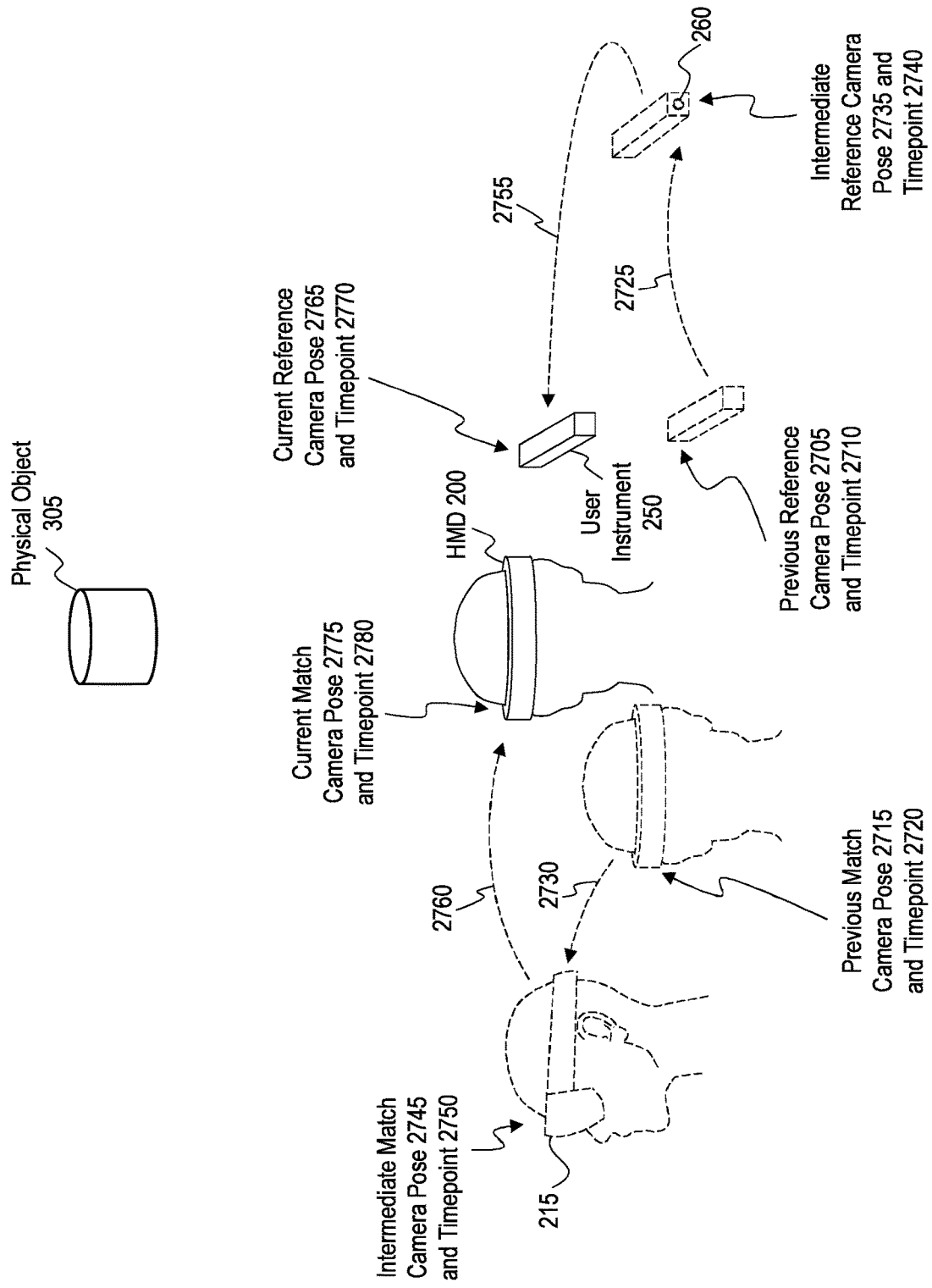
FIG. 27 illustrates an example of a reference camera and a match camera capturing an environment at different timepoints.

To illustrate, FIG. 27 depicts an example of a reference camera 260 of a user instrument 250 and a match camera 215 of an HMD 200 capturing an environment that includes a physical object 305 at different timepoints. Specifically, FIG. 27 illustrates the reference camera 260 capturing an image of the physical object 305 at a previous reference camera pose 2705 and at a previous reference camera timepoint 2710. Similarly, FIG. 27 illustrates the match camera 215 capturing an image of the physical object 305 at a previous match camera pose 2715 and at a previous match camera timepoint 2720.

Figure 28:
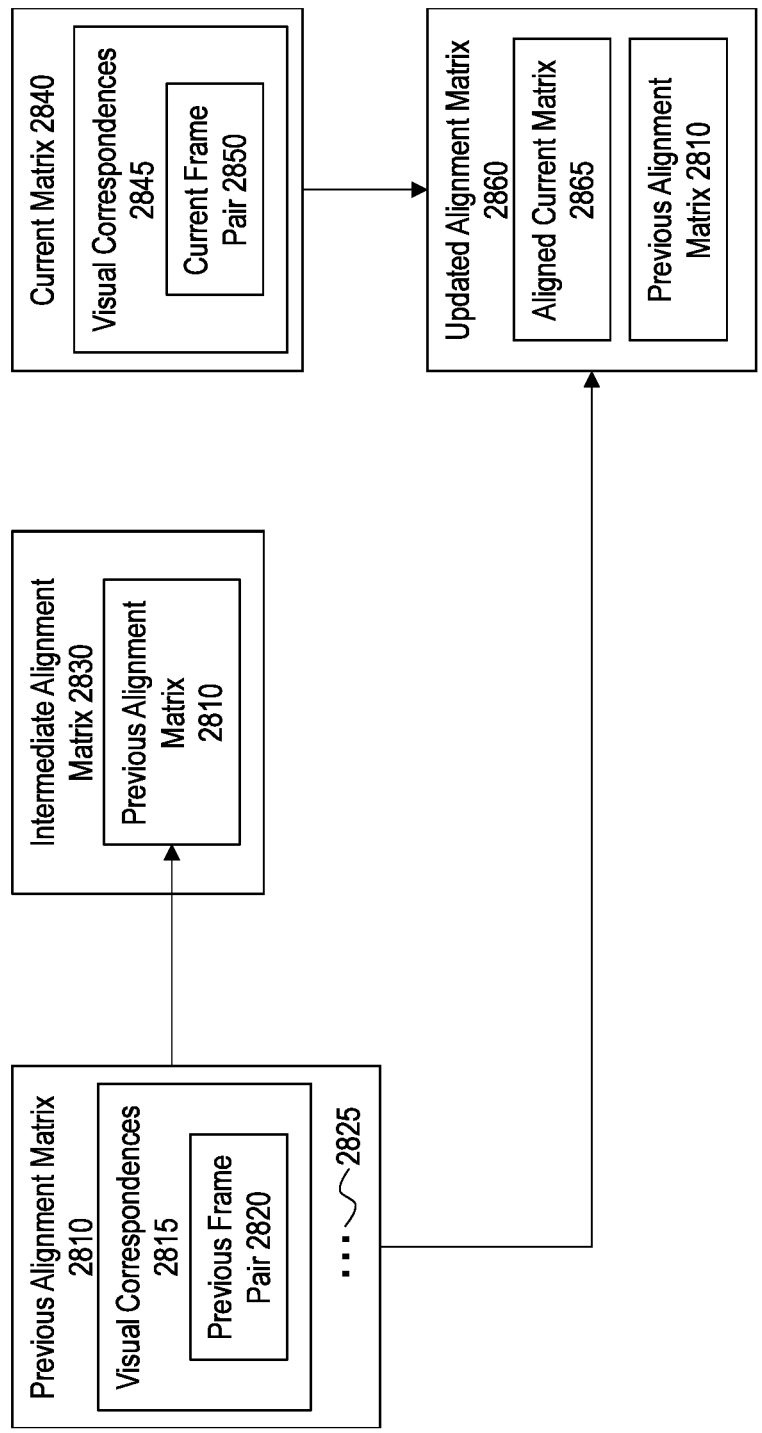
FIG. 28 illustrates example alignment matrices that may be associated with frame pairs captured by the reference camera and the match camera.

Referring briefly to FIG. 28, the images captured by the reference camera 260 and the match camera 215 at their respective previous timepoints form a previous frame pair 2820. In some instances, a system identifies visual correspondences 2815 between the images of the previous frame pair 2820 (e.g., by performing feature matching on the images of the previous frame pair 2820). A system may then determine a previous alignment matrix 2810 using the visual correspondences 2815 (and/or other components, such as one or more alignment matrices for timepoints prior to timepoints associated with the previous frame pair 2820, indicated by ellipsis 2825). In some implementations, the previous alignment matrix 2810 operates as part of a motion model to map pixels of a previous reference frame (e.g., captured at the previous reference camera timepoint 2710) to corresponding pixels of a previous match frame (e.g., captured at the previous match camera timepoint 2720) (e.g., see Equation 1 and/or 2).

Returning to example(s) depicted in FIG. 27, after capturing images of the physical object 305 with the reference camera 260 at the previous reference camera timepoint 2710 and with the match camera 215 at the previous match camera timepoint 2720, the pose of the reference camera 260 changes (indicated by arrow 2725) to correspond to the intermediate reference camera pose 2735 at the intermediate reference camera timepoint 2740. Similarly, the pose of the match camera 215 changes (indicated by arrow 2730) to correspond to the intermediate match camera pose 2745 at the intermediate match camera timepoint 2750. Both the reference camera 260 and the match camera 215 capture images while oriented according to their respective intermediate pose (e.g., intermediate reference camera pose 2735 and intermediate match camera pose 2745, respectively) to form an intermediate frame pair.

As is evident from FIG. 27, the reference camera 260, when oriented according to intermediate reference camera pose 2735, and the match camera 215, when oriented according to intermediate match camera pose 2745, are directed away from the physical object 305 such that neither camera captures the physical object 305. Accordingly, a computer system may fail to identify visual correspondences between the images of the intermediate frame pair. Thus, FIG. 28 illustrates that an intermediate alignment matrix 2830 for mapping pixels of an intermediate reference frame (e.g., captured at the intermediate reference camera timepoint 2740) to corresponding pixels of an intermediate match frame (e.g., captured at the intermediate match camera timepoint 2750) may incorporate the previous alignment matrix 2810, without generating an updated alignment matrix based on the intermediate frame pair (e.g., see Equation 2).

Returning again to example(s) depicted in FIG. 27, after capturing the intermediate frame pair with the reference camera 260 at the intermediate reference camera timepoint 2740 and with the match camera 215 at the intermediate match camera timepoint 2750, the pose of the reference camera 260 changes (indicated by arrow 2755) to correspond to the current reference camera pose 2765 at the current reference camera timepoint 2770. Similarly, the pose of the match camera 215 changes (indicated by arrow 2760) to correspond to the current match camera pose 2775 at the current match camera timepoint 2780. Both the reference camera 260 and the match camera 215 capture images while oriented according to their respective current pose (e.g., current reference camera pose 2765 and current match camera pose 2775, respectively) to form an current frame pair 2850 (see, briefly, FIG. 28). As is evident from FIG. 27, the reference camera 260, when oriented according to current reference camera pose 2765, and the match camera 215, when oriented according to current match camera pose 2775, are directed toward the physical object 305 such that both cameras capture the physical object 305.

Referring again to FIG. 28, in some instances, a system identifies visual correspondences 2845 between the images of the current frame pair 2850 (e.g., by performing feature matching on the images of the current frame pair 2850). A system may then determine a current matrix 2840 using the visual correspondences 2845. FIG. 28 also illustrates that, in some instances, a system generates an aligned current matrix 2865 (e.g., according to Equation 3) and fuses the aligned current matrix 2865 with the previous alignment matrix 2810 (or the intermediate alignment matrix 2830, which incorporates the previous alignment matrix) to generate an updated alignment matrix 2860 (e.g., according to Equation 4). For example, with parenthetical reference to FIGS. 23A and 23B, a computer system may utilize a fuser (e.g., fuser 2300) that implements an interpolation function (e.g., interpolation function 2305), which, in essence, blends or combines the aligned current matrix 2865 (e.g., aligned updated matrix 2210) with the previous alignment matrix 2810 (e.g., base matrix 610 or alignment matrix 2315) to generate the updated alignment matrix 2860 (e.g., alignment matrix 2315 or subsequent alignment matrix 2325).

In some implementations, the updated alignment matrix 2860 operates as part of a motion model to map pixels of a current reference frame (e.g., captured at the current reference camera timepoint 2770) to corresponding pixels of a current match frame (e.g., captured at the current match camera timepoint 2780) (e.g., see Equation 2).

As indicated hereinabove, in some implementations, an interpolation function utilizes a smoothness term (or smoothness function, see Equation 4). In some implementations, the smoothness term determines how to weight the previous alignment matrix 2810 and the aligned current matrix 2865 for generating the updated alignment matrix 2860. By way of example, in some implementations, when a smoothness term has a value that approaches a maximum value (e.g., a value of 1), the interpolation function increasingly ignores the aligned current matrix 2865, giving more weight to the previous alignment matrix 2810 for generating the updated alignment matrix 2860, which may be beneficial when expected accuracy of the previous alignment matrix 2810 is high. Furthermore, in some implementations, when the smoothness term has a value that approaches a minimum value (e.g., a value of 0), the interpolation function increasingly ignores the previous alignment matrix 2810, giving more weight to the aligned current matrix 2865 for generating the updated alignment matrix 2860, which may be beneficial when the expected accuracy of the previous alignment matrix 2810 is low.

Different smoothness values may be appropriate for different circumstances. For example, selecting a smoothness value that gives more weight to the previous alignment matrix 2810 may ameliorate the effects of noise that may be present in the aligned current matrix 2865 (e.g., noise introduced when performing feature matching). However, selecting a smoothness value that gives more weight to the aligned current matrix 2865 may ameliorate potential inaccuracy of the previous alignment matrix 2810 with respect to current frames (e.g., inaccuracy brought about by IMU drift).

Selecting a smoothness value that gives more weight to the previous alignment matrix 2810 when the previous alignment matrix 2810 is inaccurate may cause inaccuracies in composite frames. Although these inaccuracies may correct over time, the delay in providing accurate composite frames may render a motion model unsuitable for certain applications (e.g., precise operations and/or operations with rapid changes in camera orientation). Thus, in some implementations, it may be beneficial to intelligently determine/update the smoothness value based on the expected accuracy of the previous alignment matrix 2810.

The expected accuracy of a previous alignment matrix 2810 may depend on the circumstances. For example, in some instances, a reference camera 260 and/or a match camera 215 undergo(es) a significant amount of motion from the time that a previous frame pair 2820 was captured for generating a previous alignment matrix 2810, which may degrade the accuracy/applicability of a previous alignment matrix 2810 with respect to frame pairs captured at current timepoints (e.g., because of IMU drift, changes in parallax, etc.). This may occur, for example, where a system fails to identify visual correspondences between images of one or more intermediate frame pairs that intervene between current timepoints and previous timepoints at which visual correspondences were successfully identified (e.g., as illustrated in FIGS. 27 and 28).

Accordingly, in some instances, a computer system intelligently determines/updates the smoothness term based the expected accuracy of one or more previous alignment matrices.

Figure 29:
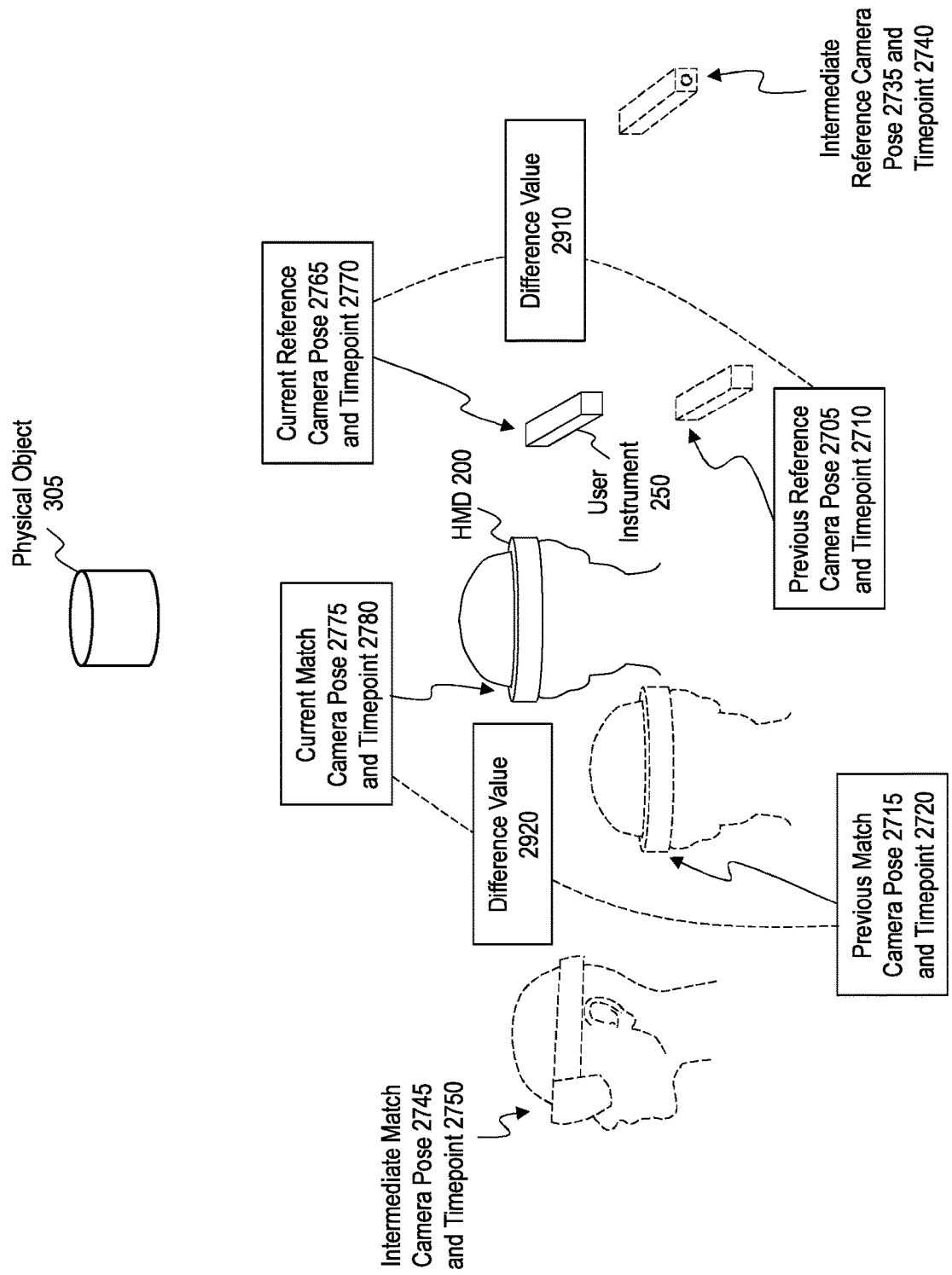
FIG. 29 illustrates an example of difference values associated with the reference camera and the match camera at different timepoints.

FIG. 29 illustrates the same frame capture and pose change sequence described hereinabove with reference to FIGS. 27 and 28. FIG. 29 demonstrates that in some instances, a system identifies a difference value 2910 associated with the reference camera 260 between the current reference camera timepoint 2770 and the previous reference camera timepoint 2710 (which may be the most recent previous reference camera timepoint for which visual correspondences were successfully identified to generate a previous alignment matrix). Additionally, or alternatively, a system may identify a difference value 2920 associated with the match camera 215 between the current match camera timepoint 2780 and the previous match camera timepoint 2720 (which may be the most recent previous match camera timepoint for which visual correspondences were successfully identified to generate a previous alignment matrix). High difference value(s) 2910 and/or 2920 may indicate that an expected accuracy of a previous alignment matrix 2810 should be regarded as low (e.g., because of IMU drift errors accumulating), whereas low difference value(s) 2910 and/or 2920 may indicate that an expected accuracy of a previous alignment matrix 2810 should be regarded as high. Additional details concerning difference values will be provided hereinafter.

Figure 30:
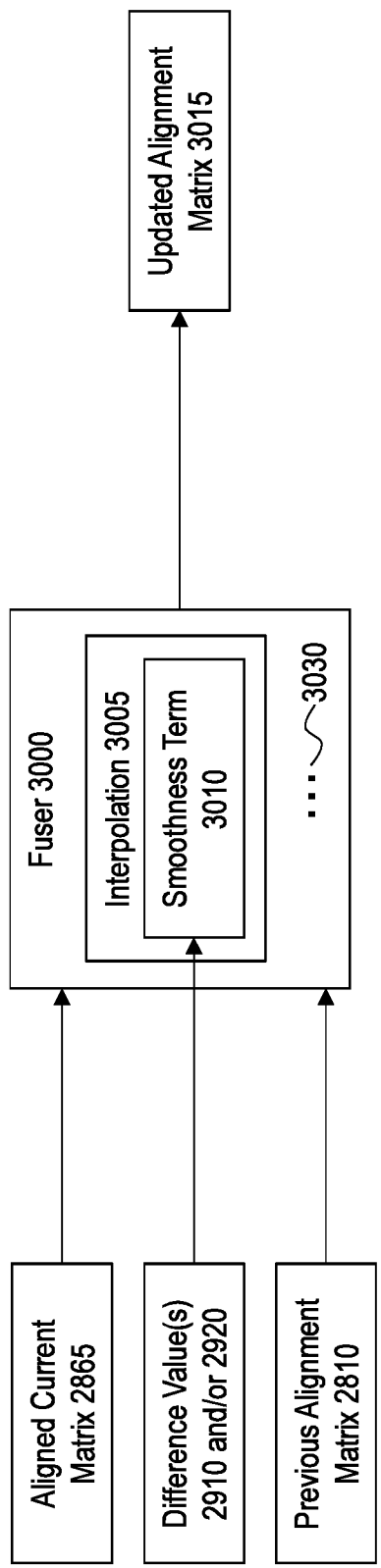
FIG. 30 illustrates an example of generating an updated alignment matrix using an aligned current matrix, a previous alignment matrix, and one or more difference values as inputs.

FIG. 30 illustrates an example of generating an updated alignment matrix 3015 using an aligned current matrix 2865, a previous alignment matrix 2810, and difference value(s) 2910 and/or 2920. For example, in some implementations, a system uses the aligned current matrix 2865, the previous alignment matrix 2810, and the difference value(s) 2910 and/or 2920 as inputs to a fuser 3000 for generating the updated alignment matrix 3015. Similar to the fuser 2300 described hereinabove with reference to FIGS. 23A and 23B, the fuser 3000 may include an interpolation function 3005 that incorporates a smoothness term 3010 (and/or other alternative or additional terms, indicated by ellipsis 3030).

The smoothness term 3010, in some instances, is intelligently determined based on the difference value(s) 2910 and/or 2920. As described hereinabove, the smoothness term 3010 may determine a weight for blending the previous alignment matrix 2810 with the aligned current matrix 2865 to generate the updated alignment matrix 3015. For example, higher difference value(s) 2910 and/or 2920 may cause the smoothness term to approach a minimum value (e.g., a value of 0), which may cause the interpolation function 3005 to ignore the previous alignment matrix 2810 to a higher degree when blending the aligned current matrix 2865 with the previous alignment matrix 2810 to generate the updated alignment matrix 3015. Conversely, for example, lower difference value(s) 2910 and/or 2920 may cause the smoothness term to approach a maximum value (e.g., a value of 1), which may cause the interpolation function 3005 to ignore the aligned current matrix 2865 to a higher degree when blending the aligned current matrix 2865 with the previous alignment matrix 2810 to generate the updated alignment matrix 3015.

Figure 31:
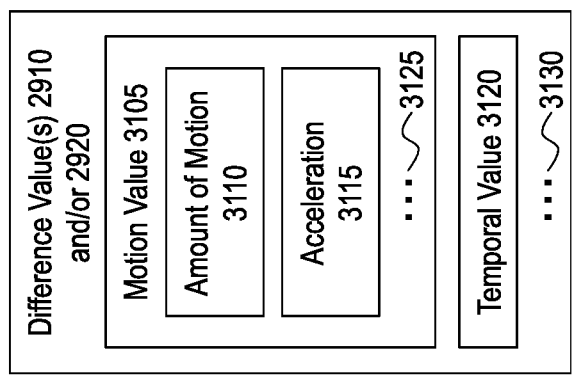
FIG. 31 illustrates examples of difference values that may be associated with the reference camera and the match camera at different timepoints.

FIG. 31 illustrates example implementations of the difference value(s) 2910 and/or 2920 that a system may identify in association with a reference camera 260 and/or a match camera 215 at different timepoints. FIG. 31 illustrates that, in some instances, the difference value(s) 2910 and/or 2920 is/are identified as a motion value 3105. For instance, a motion value 3105 may indicate an amount of motion 3110 that the reference camera 260 and/or the match camera 215 has/have undergone between a previous timepoint (e.g., previous reference camera timepoint 2710, previous match camera timepoint 2720) and a current timepoint (current reference camera timepoint 2770, current match camera timepoint 2780). A large amount of motion may indicate that IMU drift errors have been able to accumulate over time, indicating that the expected accuracy of a previous alignment matrix 2810 is low, which may cause a system to select a low smoothness term 3010.

FIG. 31 also demonstrates that a motion value 3105 may indicate one or more acceleration values 3115 experienced by the reference camera 260 and/or the match camera 215 between a previous timepoint (e.g., previous reference camera timepoint 2710, previous match camera timepoint 2720) and a current timepoint (current reference camera timepoint 2770, current match camera timepoint 2780). High acceleration values may cause IMU drift errors to be higher than would exist for low acceleration values (e.g., particularly where components of the IMU become saturated, such a gyroscope), which may indicate that the expected accuracy of a previous alignment matrix 2810 is low and may cause a system to select a low smoothness term 3010. The ellipsis 3125 indicates that a motion value 3105 may indicate other metrics, such as, by way of non-limiting example, translational velocity (which may indicate a change in parallax that may render a previous alignment matrix 2810 less accurate).

As depicted in FIG. 31, difference value(s) 2910 and/or 2920 are identified as a temporal value 3120, such as a number of frames or amount of time that have/has elapsed since the most recent previous timepoint at which visual correspondences were successfully identified. A high number of frames or amount of time between successful visual correspondences may indicate that a previous alignment matrix 2810 may have become inaccurate, which may cause a system to select a lower smoothness term 3010. The ellipsis 3130 indicates that other implementations of difference value(s) 2910 and/or 2920 are within the scope of this disclosure.

Those skilled in the art will recognize, in view of the present disclosure, that the difference value(s) 2910 and/or 2920 may take on various forms. Accordingly, it will be appreciated, in view of the present disclosure, that the descriptions herein of difference values as "high" or "low" may refer to the magnitude of the difference value in absolute terms (e.g., regardless of directionality and/or whether a particular measured value has a positive or negative value).

The following discussion focuses on a particular example implementation of a smoothness term/smoothness function as described hereinabove. One will appreciate, in view of the present disclosure, that the following particular example implementation is provided to assist in understanding, and not by way of limitation.

In one example implementation, the function smoothness ( ) is defined as follows:

$$\text{smoothness}() = \text{strength} * e^{\frac{-0.5 * \text{angle\_sum}()^2}{\text{falloff}^2}} \quad (5)$$

Where the parameters strength and the parameter falloff may be set to predetermined constants (e.g., 0.7 for strength, 30 for falloff). The function angle_sum may be thought of as computing difference values for the reference camera and the match camera as described hereinabove and may be defined as follows:

$$\text{angle\_sum}(\quad) = \text{angle}(P_{ref\_cur}, P_{ref\_last}) + \text{angle}(P_{match\_cur}, P_{match\_last}) \quad (6)$$

Where $P_{ref\_cur}$ represents the current pose of the reference camera and $P_{ref\_last}$ represents the reference camera pose at which visual correspondences were most recently successfully identified/computed (e.g., the reference camera pose for the most recent timepoint at which an alignment matrix was successfully updated). Similarly, $P_{match\_cur}$ represents the current pose of the match camera and $P_{match\_last}$ represents the match camera pose at which visual correspondences were most recently successfully identified/computed.

The function angle( ) may be generalized as follows:

$$\text{angle}(P, P') = a\cos((P*(0,0,1)^T)^T*(P'*(0,0,1)^T)) \quad (7)$$

Which computes the cross product of the third columns of the two matrices P and P', which may correspond to the z axes of the two matrices. The a cos( ) operation may provide the angle between the computed axes.

Figure 32:
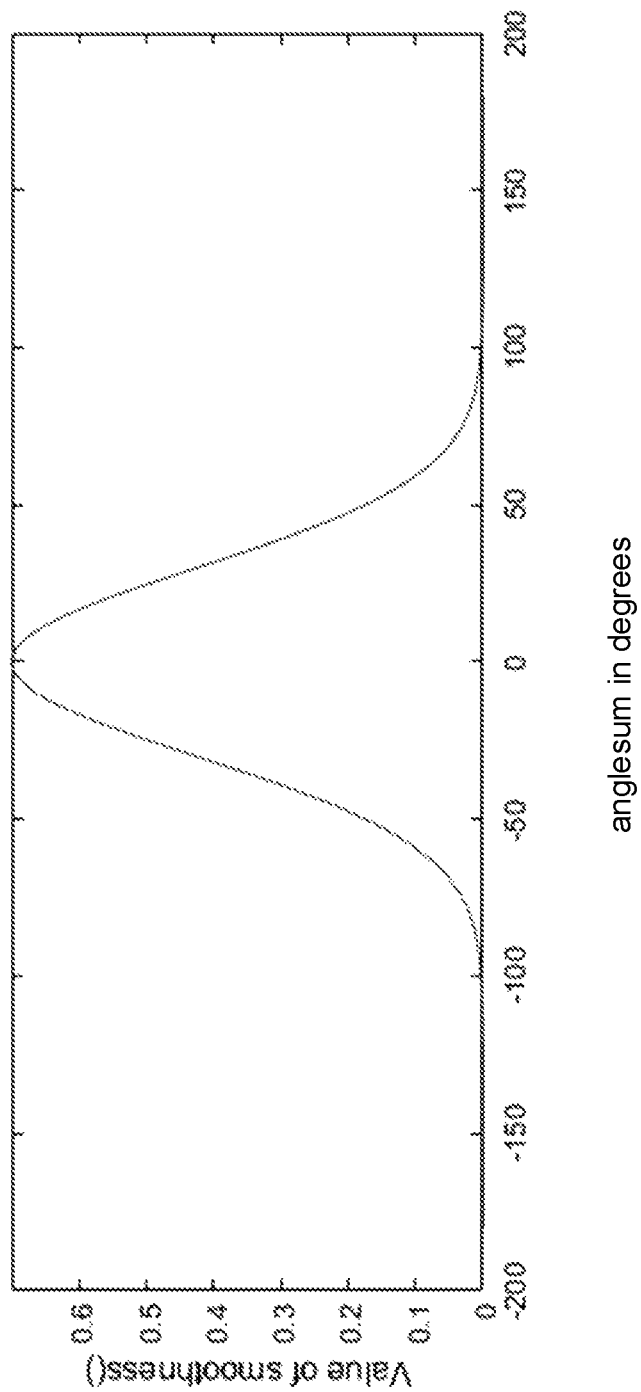
FIG. 32 illustrates an example plot of a smoothness function according to an implementation of the present disclosure.

FIG. 32 illustrates an example plot of an example implementation of a smoothness function described hereinabove with reference to Equations 5-7. As is evident from FIG. 32, the value of the smoothness term is greater for smaller difference values (e.g., for smaller anglesum values, in absolute terms), and the value of the smoothness term is smaller for greater difference values (e.g., for larger anglesum values, in absolute terms).

Example Method(s) for Updating Continuous Image Alignment of Separate Cameras

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 33:
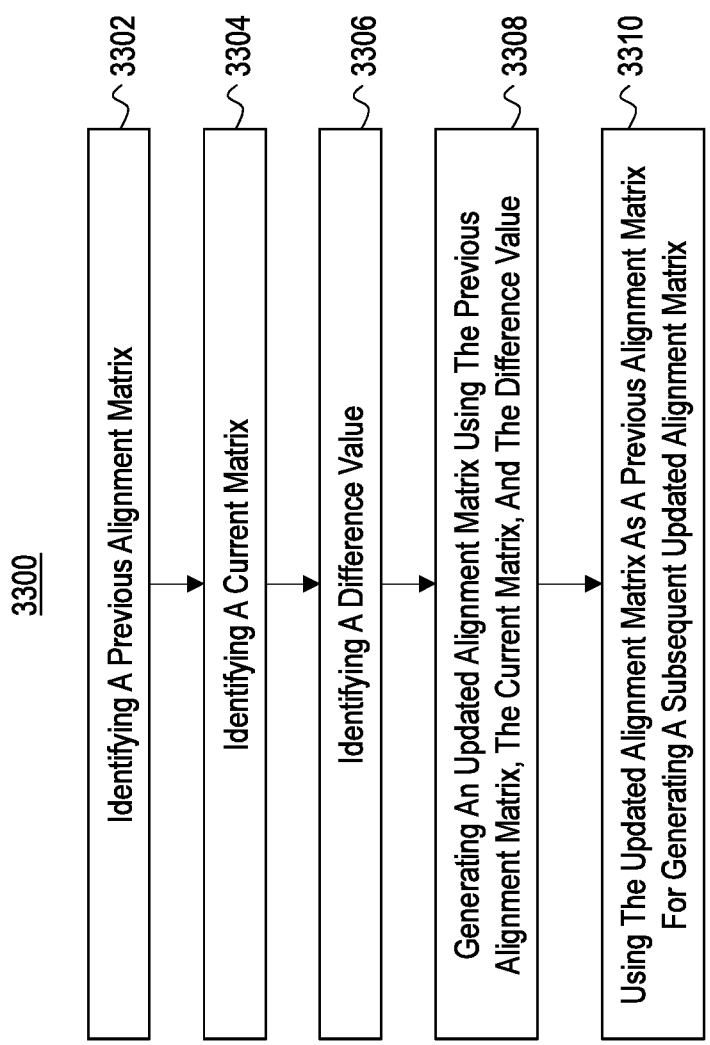
FIG. 33 illustrates an example flow diagram depicting acts associated with updating continuous image alignment of a reference camera and a match camera.

FIG. 33 illustrates an example flow diagram 3300 depicting acts associated with updating continuous image alignment of a reference camera and a match camera. The discussion of the various acts represented in flow diagram 3300 includes references to various hardware components described in more detail with reference to FIGS. 1, 2, and 44.

Act 3302 of flow diagram 3300 includes identifying a previous alignment matrix. Act 3302 is performed, in some instances, using one or more processors 4405 of a computer system 4400 (e.g., an HMD 200 and/or a user instrument 250). In some instances, the previous alignment matrix is associated with a previous frame pair captured at one or more previous timepoints by a reference camera and a match camera. In some instances, the previous alignment matrix is based on visual correspondences between images of the previous frame pair.

Act 3304 of flow diagram 3300 includes identifying a current matrix. Act 3304 is performed, in some instances, using one or more processors 4405 of a computer system 4400 (e.g., an HMD 200 and/or a user instrument 250). In some instances, the current matrix is associated with a current frame pair captured at one or more current timepoints by the reference camera and the match camera. In some instances, the current matrix is based on visual correspondences between images of the current frame pair. Furthermore, in some implementations, the current matrix is an aligned current matrix, in that the current matrix is aligned with the previous alignment matrix using inertial tracking data associated with the reference camera and the match camera.

Act 3306 of flow diagram 3300 includes identifying a difference value. Act 3306 is performed, in some instances, using one or more processors 4405 of a computer system 4400 (e.g., an HMD 200 and/or a user instrument 250). The difference value may be associated with the reference camera or the match camera relative to the one or more previous timepoints and the one or more current timepoints. In some implementations, the difference value comprises a motion value associated with the reference camera or the match camera relative to the one or more previous timepoints and the one or more current timepoints. The motion value may indicate an amount of motion associated with the reference camera or the match camera relative to the one or more previous timepoints and the one or more current timepoints. Additionally, or alternatively, the motion value may indicate an acceleration associated with the reference camera or the match camera relative to the one or more previous timepoints and the one or more current timepoints. In some implementations, the difference value comprises a temporal value associated with the reference camera or the match camera relative to the one or more previous timepoints and the one or more current timepoints.

Act 3308 of flow diagram 3300 includes generating an updated alignment matrix using the previous alignment matrix, the current matrix, and the difference value. Act 3308 is performed, in some instances, using one or more processors 4405 of a computer system 4400 (e.g., an HMD 200 and/or a user instrument 250). In some instances, a computer system utilizes the previous alignment matrix, the current matrix, and the difference value as inputs to a fuser that includes an interpolation function for generating the updated alignment matrix. In some instances, the interpolation function blends the previous alignment matrix with the current matrix to generate the updated alignment matrix. Furthermore, in some implementations, the interpolation function comprises a smoothness term that is determined based on the difference value. The smoothness term may determine a weight for blending the previous alignment matrix with the current matrix to generate the updated alignment matrix. For example, when the smoothness term has a minimum smoothness value, the weight may cause the interpolation function to ignore the previous alignment matrix when generating the updated alignment matrix.

Act 3310 of flow diagram 3300 includes using the updated alignment matrix as a previous alignment matrix for generating a subsequent updated alignment matrix. Act 3310 is performed, in some instances, using one or more processors 4405 of a computer system 4400 (e.g., an HMD 200 and/or a user instrument 250). In some instances, a computer system utilizes the updated alignment matrix, a subsequently obtained current matrix, and a subsequently identified difference value as inputs to a fuser that includes an interpolation function for generating the subsequent updated alignment matrix (e.g., similar to the manner described hereinabove with reference to act 3308).

Reducing a Search Area for Identifying Correspondences Between Images

As described hereinabove, a system may generate a motion model that is configured to facilitate continuous mapping of sets of pixels from a reference frame to corresponding sets of pixels of a match frame, even as the pose of the reference camera and the match camera change over time (see, e.g., FIGS. 11-17 and Equations 2 and 4). A motion model may include an alignment matrix, which may be generated based on various matrices, such as a base matrix (e.g., base matrix 610), an updated matrix (e.g., updated matrix 2010), an aligned updated matrix (e.g., aligned updated matrix 2210), a previously computed alignment matrix, etc. In some implementations, these various matrices are computed, at least in part, by performing feature matching between images captured by the reference camera 260 and the match camera 215 (e.g., see FIGS. 6 and 20 and attendant description).

By way of reprisal, in some implementations, performing feature matching involves identifying feature points and feature descriptors within an image captured by the reference camera 260 and an image captured by the match camera 215. In some instances, a feature point (sometimes referred to as "keypoints," "points of interest," or simply "features") refers to a pixel within an image that comprises rich texture information, such as edges, corners, and/or other readily identifiable structures. In some instances, a feature descriptor (also referred to as a "feature vector") results from extracting image data/statistics from a local image/pixel patch around an identified feature point. A feature descriptor may operate as an identifier for the feature point about which the feature descriptor is centered. Various approaches exist for extracting feature descriptors, such as local histogram approaches, N-jets approaches, and/or others. For example, a feature descriptor may be identified based on a histogram of gradient magnitudes (e.g., changes in intensity and/or color) and/or orientations (e.g., edge orientations) for pixels within an image patch centered on a feature point.

A system may employ various techniques for identifying feature points and/or feature descriptors, such as, by way of non-limiting example, scale-invariant feature transform (SIFT), speeded up robust features (SURF), Canny operator, Kayyali operator, Moravec algorithm, Harris & Stephens/ Shi-Tomasi algorithms, Förstner detector, smallest univalue segment assimilating nucleus (SUSAN) detector, level curve curvature approach, DAISY algorithms, and/or others.

Figure 34:
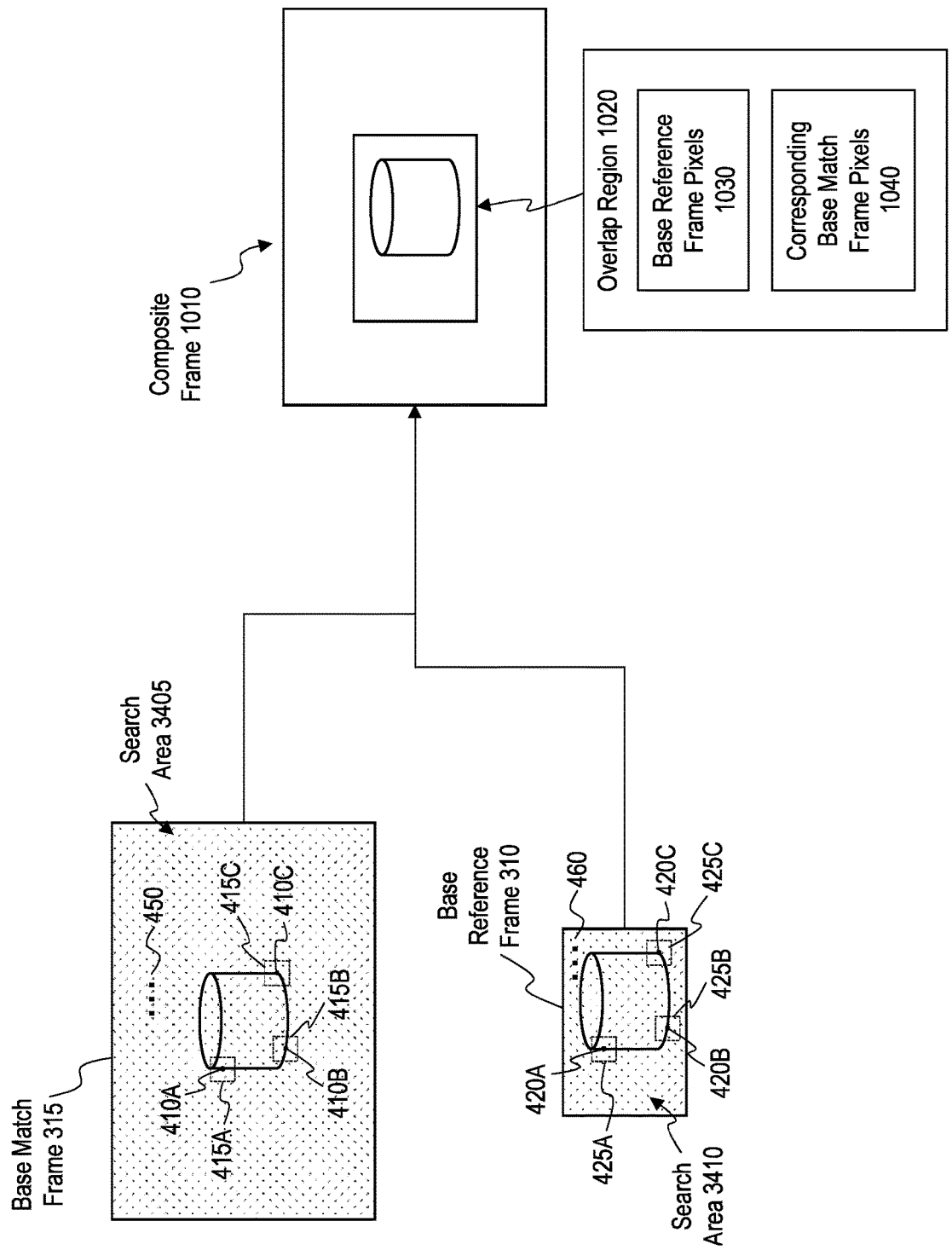
FIG. 34 illustrates an example of performing feature matching on a match frame and a reference frame in order to generate a composite frame that includes an overlap region.

Similar to FIG. 4 described hereinabove, FIG. 34 illustrates the base match frame 315 captured by the match camera 215 at the base match camera pose 330 and base match camera timepoint 335. FIG. 34 also illustrates the base reference frame 310 captured by the reference camera 260 at the base reference camera pose 320 and base reference camera timepoint 325. Additionally, FIG. 34 illustrates various feature points associated with the physical object 305 as represented in the base 310 and the base match frame 315 (e.g., feature points 410A, 410B, and 410C within the base match frame 315, and feature points 420A, 420B, and 420C within the base reference frame 310). FIG. 34 also depicts feature descriptors associated with the various feature points (e.g., feature descriptors 415A, 415B, and 415C associated, respectively, with feature points 410A, 410B, and 410C within the base match frame 315, and feature descriptors 425S, 425B, and 425C associated, respectively, with feature points 420A, 420B, and 420C within the base reference frame 310).

The feature points of the base match frame 315 correspond to the feature points of the base reference frame 310 shown in FIG. 34 (e.g., they represent common 3D points within the captured environment). Thus, the feature points of the base match frame 315 and the corresponding feature points of the base reference frame 310 may be considered a plurality of feature matches. In some instances, a system identifies feature matches by comparing the feature descriptors of the feature points identified in the images (e.g., using a brute-force matcher, a FLANN matcher, etc.). The ellipses 450 and 460 within the base match frame 315 and the base reference frame 310, respectively, indicate that a system may identify any number of feature matches between images captured by the match camera 215 and the reference camera 260.

As described hereinabove, a system may utilize the feature matches identified within the base match frame 315 and the base reference frame 310 to generate a base matrix 610 (see FIGS. 5 and 6 and attendant description). The base matrix 610 may provide a basis for generating a motion model for generating composite frames, such as composite frame 1010 illustrated in FIG. 34. For example, composite frame 1010 includes an overlap region 1020 with base reference frame pixels 1030 mapped onto corresponding base match frame pixels 1040 (see FIGS. 7-10 and attendant description). The composite frame 1010 may be thought of, in some instances, as an overlay of base reference frame pixels 1030 onto the base match frame 315, and the overlap region 1020 may be thought of as a mapping region within the base match frame 315 to which each pixel of the base reference frame 310 is mapped.

Although the present disclosure focuses, in some respects, on implementations in which images captured by the reference camera 260 have a lower image resolution than the images captured by the match camera 215, it will be appreciated, in view of the present disclosure, that this arrangement is provided as an example only and is non-limiting. For example, in other implementations, images captured by the reference camera 260 have an image resolution that is the same as or higher than the image resolution of the images captured by the match camera 215. Furthermore, it should be noted that the images captured by the reference camera 260 and the match camera 215 may have the same, or different, angular resolution, depending on the combination of field of view and image sensor resolution for the different cameras.

FIG. 34 also illustrates search area 3405 within the base match frame 315 that comprises all pixels of the base match frame 315. Similarly, FIG. 34 illustrates search area 3410 within the base reference frame that comprises all pixels of the base reference frame 310. The search areas 3405 and 3410 indicate the area in which a system may search for feature points/feature matches within the base match frame 315 and the base reference frame 310, respectively.

As described hereinabove, a system may perform feature matching on subsequent frames captured by the reference camera 260 and the match camera 215 to update the motion model for generating composite frames. Feature extraction and feature matching are often regarded as computationally expensive processes, particularly when searching for feature points/matches over large search areas within the images. Accordingly, in some instances, computational resources are saved by reducing the search area for identifying feature matches between subsequent frames captured by the reference camera 260 and the match camera 215.

Figure 35:
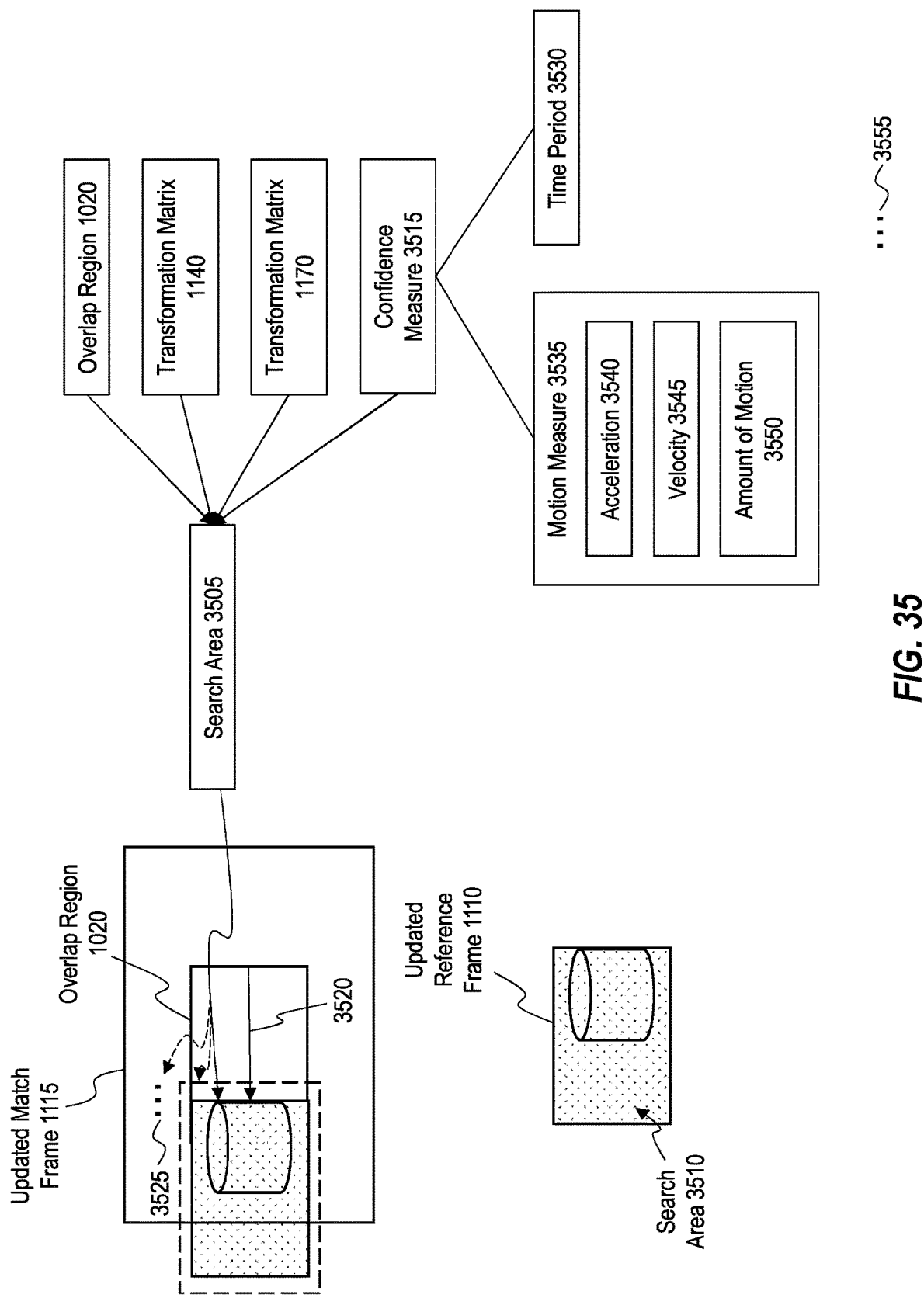
FIG. 35 illustrates an example of identifying a reduced search area within a match frame for performing feature matching.

For example, FIG. 35 illustrates the updated match frame 1115 captured by the match camera 215 at the updated match camera pose 1130 and updated match camera timepoint 1135. Similarly, FIG. 35 illustrates the updated reference frame 1110 captured by the reference camera 260 at the updated reference camera pose 1120 and updated reference camera timepoint 1125. As noted hereinabove, the updated match camera timepoint 1135 and the updated reference camera timepoint 1125 are subsequent to the base match camera timepoint 335 and the base reference camera timepoint 325, respectively.

FIG. 35 shows a search area 3505 for searching for feature points within the updated match frame 1115 and a search area 3510 for searching for feature points within the updated reference frame 1110 to facilitate feature matching. As is evident from FIG. 35, search area 3510 associated with the updated reference frame 1110 corresponds in size to search area 3410 associated with the base reference frame 310 (e.g., both search area 3510 and search area 3410 include each pixel of the updated reference frame 1110 and the base reference frame 310, respectively). As is also evident from FIG. 35, search area 3505 associated with the updated match frame 1115 is smaller in size than search area 3405 associated with the base match frame 315, which may reduce the computational burden associated with identifying feature points within the updated match frame 1115 (e.g., as compared with the computational burden associated with identifying feature points within the base match frame 315). In this regard, in some instances, the search area 3505 is a subset of pixels (or region of interest) within the updated match frame 1115, and a system may search within the subset of pixels for feature points.

A system may define a search area 3505 within the updated match frame 1115 based on a variety of elements/ inputs. In some instances, a system defines the search area 3505 based on an overlap region associated with a previously generated composite frame. By way of illustration, FIG. 35 shows the overlap region 1020 overlaid on the updated match frame 1115 (e.g., according to the pixel coordinates of the overlapping region 1020 within the composite frame 1010). FIG. 35 also illustrates an arrow 3520 extending from the overlap region 1020 toward the search area 3505, indicating that, in some instances, defining the search area 3505 may be conceptualized as transforming (and/or resizing) the overlap region 1020 as represented on the match frame 1115. Under this conceptualization, the manner in which a system transforms and/or resizes the overlap region 1020 to define the search area 3505 may depend on various elements/inputs.

In some instances, a system defines the search area 3505 based on inertial tracking data (e.g., inertial tracking data 240 obtained by a match camera IMU 235 and/or inertial tracking data 270 obtained by a reference camera IMU 265). For example, in some instances, a system identifies a reference camera transformation matrix 1170 (e.g., a 3D rotational matrix indicating rotation between the base reference camera pose 320 and the updated reference camera pose 1120, if any) based on inertial tracking data 270 associated with the reference camera 260. The system may additionally, or alternatively, identify a match camera transformation matrix 1140 (e.g., a 3D rotational matrix indicating rotation between the base match camera pose 330 and the updated match camera pose 1130, if any) based on inertial tracking data 240 associated with the match camera 215.

In some implementations, a system uses changes in the relative positioning of the reference camera 260 and the match camera 215 indicated by the reference camera transformation matrix 1170 and/or the match camera transformation matrix 1140 to transform the overlap region 1020, as represented in the updated match frame 1115, to identify a predicted overlap region within the updated match frame 1115 (e.g., indicated by arrow 3520 in FIG. 35). The predicted overlap region may indicate an expected region of pixels within the updated match frame 1115 that are expected to correspond to the pixels of the updated reference frame 1110 (e.g., pixels within the updated match frame 1115 that are expected to be represent the same portion of the captured environment as the pixels of the updated reference frame 1110). Accordingly, in some implementations, the positioning of the predicted overlap region within the updated match frame 1115 (based on the overlap region 1020, the match camera transformation matrix 1140, and/or the reference camera transformation matrix 1170) may provide a basis for defining the positioning of the search area 3505 within the updated match frame 1115.

FIG. 35 also illustrates that a system may define search area 3505 based on other elements/inputs. In some instances, a system utilizes a confidence measure 3515 to define aspects of the search area 3505 (e.g., the size of the search area 3505). The confidence measure 3515 may indicate an expected accuracy of the positioning of the search area 3505 (e.g., determined based on the overlap region 1020, the match camera transformation matrix 1140, and/or the reference camera transformation matrix). Where a confidence measure 3515 indicates a high degree of expected accuracy of the positioning of the search area 3505, a system may define the search area 3505 to have a size that is similar to or the same as the size of the overlap region 1020. In contrast, where a confidence measure 3515 indicates a low degree of expected accuracy of the positioning of the search area 3505, a system may define the search area 3505 to have a size that is larger than the overlap region 1020 (e.g., to varying degrees). Accordingly, in some instances, the size of the search area 3505 depends on a value of the confidence measure 3515, as indicated in FIG. 35 by the dashed portions of the search area 3505 and the ellipsis 3525.

The confidence measure 3515 may comprise various elements. For example, in some instances, the confidence measure 3515 comprises a time period 3530, such as a time period between the base match camera timepoint 335 and the updated match camera timepoint 1135 and/or a time period between the base reference camera timepoint 325 and the updated reference camera timepoint 1125. Stated in a different way, in some implementations, the time period 3530 indicates an amount of time that has elapsed since a system successfully identified feature matches between images captured by the match camera 215 and the reference camera 260 to update an alignment matrix (as described hereinabove). In some instances, a larger time period 3530 indicates a lower degree of expected accuracy of the positioning of the search area 3505 within the updated match frame 1115 (e.g., because of a larger time period for IMU drift errors to accumulate). Accordingly, a larger time period 3530 may result in a confidence measure 3515 that causes the system to increase the size of the search area 3505 (potentially to fill the entirety of the updated match frame 1115) to account for a low expected accuracy of the positioning of the search area 3505 within the updated match frame 1115.

In some instances, the confidence measure comprises a motion measure 3535, such as a motion measure relative to the match camera 215 (e.g., between the base match camera pose 330 and the updated match camera pose 1130) and/or the reference camera 260 (e.g., between the base reference camera pose 1120 and the updated reference camera pose 320). In some instances, the system determines the motion measure 3535 based on IMU data (e.g., obtained by the match camera IMU 235 and/or the reference camera IMU 265). Accordingly, the motion measure 3535 may comprise various indications of motion, such as an acceleration 3540 (e.g., rotational and/or translational), a velocity 3545 (e.g., translational and/or rotational), an amount of motion 3550 (e.g., an amount of motion that the reference camera 260 and/or the match camera 215 has/have undergone between a previous timepoint and a current timepoint), and/or other metrics.

It should be noted that, in some instances, the motion measure 3535 indicates relative motion of the reference camera 260 and the match camera 215 (e.g., relative to one another) and/or a combination/composition of separate motion measures associated with the separate cameras (e.g., the reference camera 260 and the match camera 215).

In some instances, a larger motion measure 3535 indicates a lower degree of expected accuracy of the positioning of the search area 3505 within the updated match frame 1115 (e.g., because of higher IMU drift errors, particularly where components of the IMU become saturated, such a gyroscope). Accordingly, a larger motion measure 3535 may result in a confidence measure 3515 that causes the system to increase the size of the search area 3505 (potentially to fill the entirety of the updated match frame 1115) to account for a low expected accuracy of the positioning of the search area 3505 within the updated match frame 1115.

The ellipsis 3555 indicates that a system may utilize any number of additional and/or alternative factors to define the search area 3505.

One will appreciate, in view of the present disclosure, that the foregoing description of the size of the search area 3505 relative to the overlap region 1020 (e.g., "larger than the overlap region" or "similar to or the same as the size of the overlap region") is simplified for ease of explanation and intentionally does not account for situations in which the search area 3505 spans and/or extends beyond a boundary of the updated match frame 1115. For example, in some instances (as suggested in FIG. 35), the effective size of a search area 3505 for identifying feature points may be reduced when the search area 3505 spans and/or extends beyond a boundary of the updated match frame 1115. Accordingly, in some instances, even when a confidence measure 3515 indicates that the size of a search area 3505 should be larger than the size of the overlap region 1020 (e.g., to account for a low expected accuracy of the positioning of the search area 3505 within the updated match frame 1115), the effective size of the search area 3505 for identifying feature points may actually be smaller than the overlap region 1020 when the search area 3505 spans and/or extends beyond a boundary of the updated match frame 1115 (e.g., as suggested in FIG. 35 by the search area 3505 extending beyond the left boundary of the updated match frame 1115).

Figure 36:
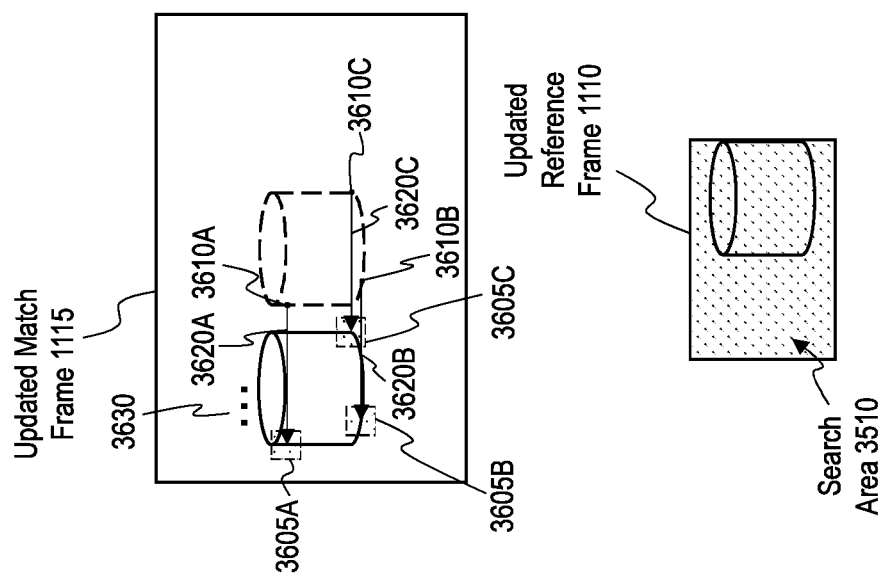
FIG. 36 illustrates an example of identifying a plurality of reduced search areas within a match frame for performing feature matching.

FIG. 35 illustrates instances of an example implementation of the present disclosure in which a system defines a search area 3505 within the updated match frame 1115 based at least in part on an overlap region 1020. FIG. 36 illustrates an alternative embodiment in which a defined search area includes a plurality of components, with the components being determined based on locations of previously identified feature matches.

For example, FIG. 36 illustrates the updated match frame 1115 with various feature points depicted thereon, including feature points 3610A, 3610B, and 3610C. The various feature points depicted on the updated match frame 1115 represent feature points identified by (successfully) performing feature matching on a previous frame pair (e.g., the base match frame 315 and the base reference frame 320). Stated differently, the various feature points depicted on the updated match frame 1115 in FIG. 36 (e.g., feature points 3610A, 3610B, and 3610C) represent feature points identified within a previous image captured by the match camera 215 (e.g., the base match frame 315) that correspond to, or represent the same portions of the captured environment as, feature points identified within a previous image captured by the reference camera 260 (e.g., the base reference frame 310). Accordingly, in some instances, the feature points represented on the updated match frame 1115 in FIG. 36 (e.g., 3610A, 3610B, and 3610C) may be regarded, individually and/or collectively, as an overlap region.

Analogizing the feature points depicted in the updated match frame 1115 of FIG. 36 (e.g., 3610A, 3610B, and 3610C) to an overlap region, a system may define a search region for searching for feature points within the updated match frame 1115 based at least in part on these feature points (e.g., as described hereinabove with reference to the overlap region 1020 of FIG. 35). By way of illustration, a system may identify expected positions of updated feature points in the updated match frame 1115 by transforming the feature points 3610A, 3610B, and 3610C (e.g., using the pixel coordinates of these feature points) based on a match camera transformation matrix 1140 and/or a reference camera matrix 1170 (e.g., indicated in FIG. 36 by the arrows 3620A, 3620B, and 3620C). A system may also define pixel regions surrounding the expected positions of the updated feature points as search areas 3605A, 3605B, and 3605C or components of a composite search area. As with the search area 3505 described with reference to FIG. 35, the size of the search areas 3605A, 3605B, and 3605C or components of a composite search area of FIG. 36 may be defined based on a confidence measure 3515 (e.g., comprising a motion measure 3535 and/or a time period 3530).

The ellipsis 3630 indicates that a system may identify any number of search areas 3605A, 3605B, and 3605C or components of a composite search area within which to search for updated feature points within the updated match frame 1115. In some instances, defining a plurality of search areas 3605A, 3605B, and 3605C localized around expected positions of updated feature points may further decrease the computational burden associated with performing feature matching to facilitate continuous alignment of separate camera imagery (e.g., by causing the system to refrain from searching for feature points in portions of the updated match frame 1115 that are not expected to include feature points that correspond to feature points of the updated reference frame 1110).

Figure 37:
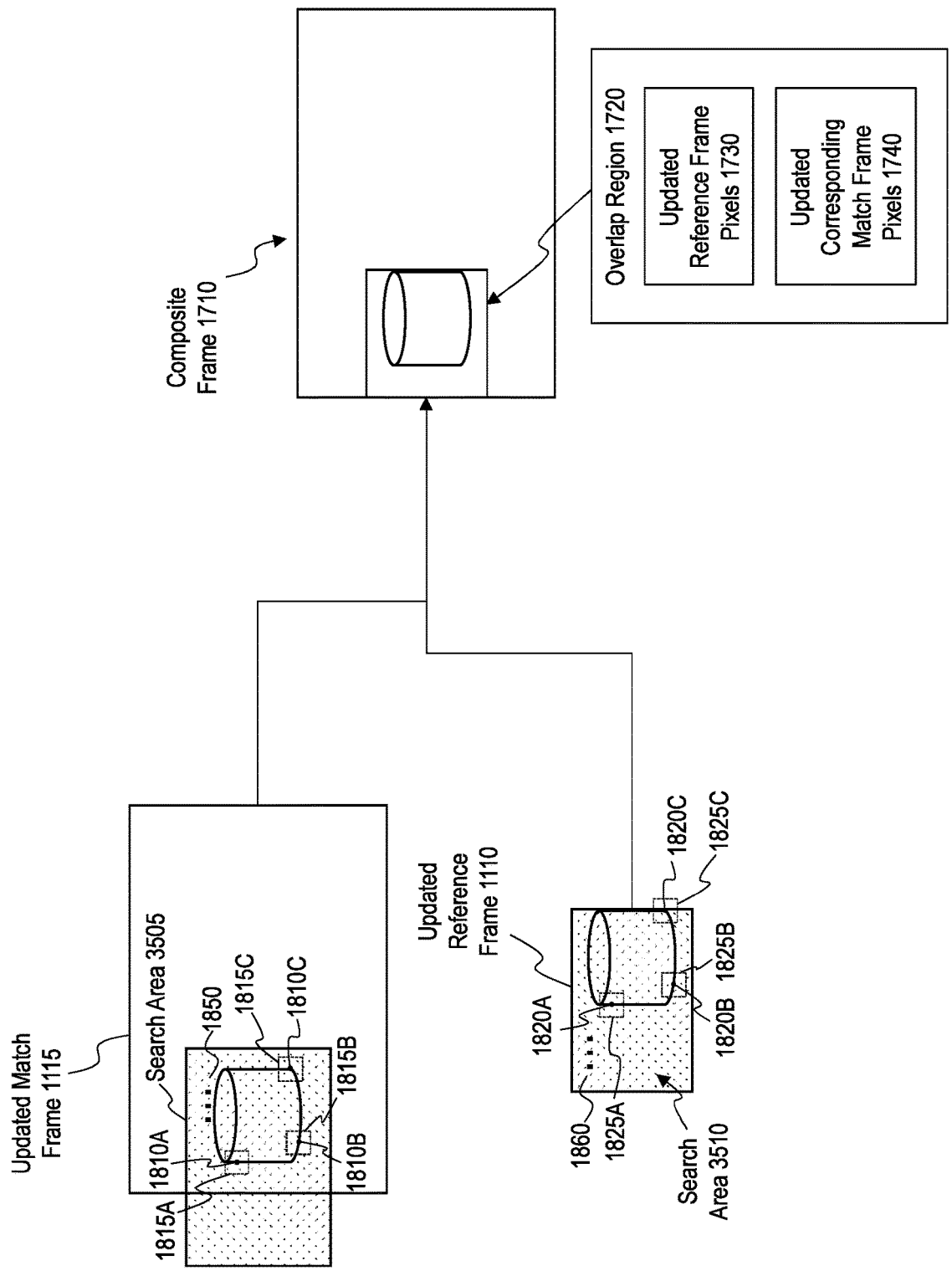
FIG. 37 illustrates an example of using a reduced search area to perform feature matching on a match frame and a reference frame in order to generate a composite frame that includes an overlap region.

FIG. 37 illustrates an example of using the search area 3505 (e.g., described hereinabove with reference to FIG. 35) to determine correspondences between pixels of the updated match frame 1115 and pixels of the updated reference frame 1110 by performing feature matching (as noted earlier, an effective search area for performing feature matching may omit portions of the search area that lie beyond the boundaries of the updated match frame 1115). In one example, the system identifies feature points 1810A, 1810B, and 1810C within the search area 3505 of the updated match frame 1115 and feature points 1820A, 1820B, and 1820C within the search area 3510 of the updated reference frame 1110, and the system determines that the feature points of the updated match frame 1115 correspond to the feature points of the updated reference frame 1110 using feature descriptors 1815A, 1815B, and 1815C (associated with feature points 1810A, 1810B, and 1810C, respectively) and feature descriptors 1825A, 1825B, and 1825C (associated with feature points 1820A, 1820B, and 1820C). In the above example, the system refrains from searching for feature points within the updated match frame 1115 outside of the search area 3505, thereby preserving computational resources.

The ellipses 1850 and 1860 indicate that a system may identify any number of feature matches between the updated match frame 1115 and the updated reference frame 1110. Using the identified feature matches, a system may generate and/or update an alignment matrix for a motion model for generating a composite frame 1710 (as described hereinabove). As illustrated in FIG. 37, the composite frame 1710 includes an overlap region 1720 wherein updated reference frame pixels 1730 are overlaid on updated corresponding match frame pixels 1740.

In some instances, a system fails to identify correspondences (e.g., by performing feature matching) between a match frame and a reference frame. A failure to identify correspondences between a match frame and a reference frame may indicate that the match camera 215 and a reference camera 260 capture different portions of an environment (e.g., see the intermediate match camera pose 2745 and the intermediate reference camera pose 2735 of FIG. 27). In some instances, in response to failing to determine correspondences between a match frame and a reference frame, a system modifies (e.g., expands) a search area for identifying correspondences in subsequent frame pairs (see the dashed lines associated with the search area 3505 of FIG. 35). A reference camera 260 and a match camera 215 may become redirected to capture a common portion of an environment after a period of capturing different portions of the environment. In some implementations, a modified (e.g., expanded) search area enables a system to readily identify feature matches soon after the field of view of the reference camera 260 and the field of view of the match camera 215 begin to overlap after a period of failing to overlap.

Example Method(s) for Reducing a Search Area for Identifying Correspondences Between Images The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 38:
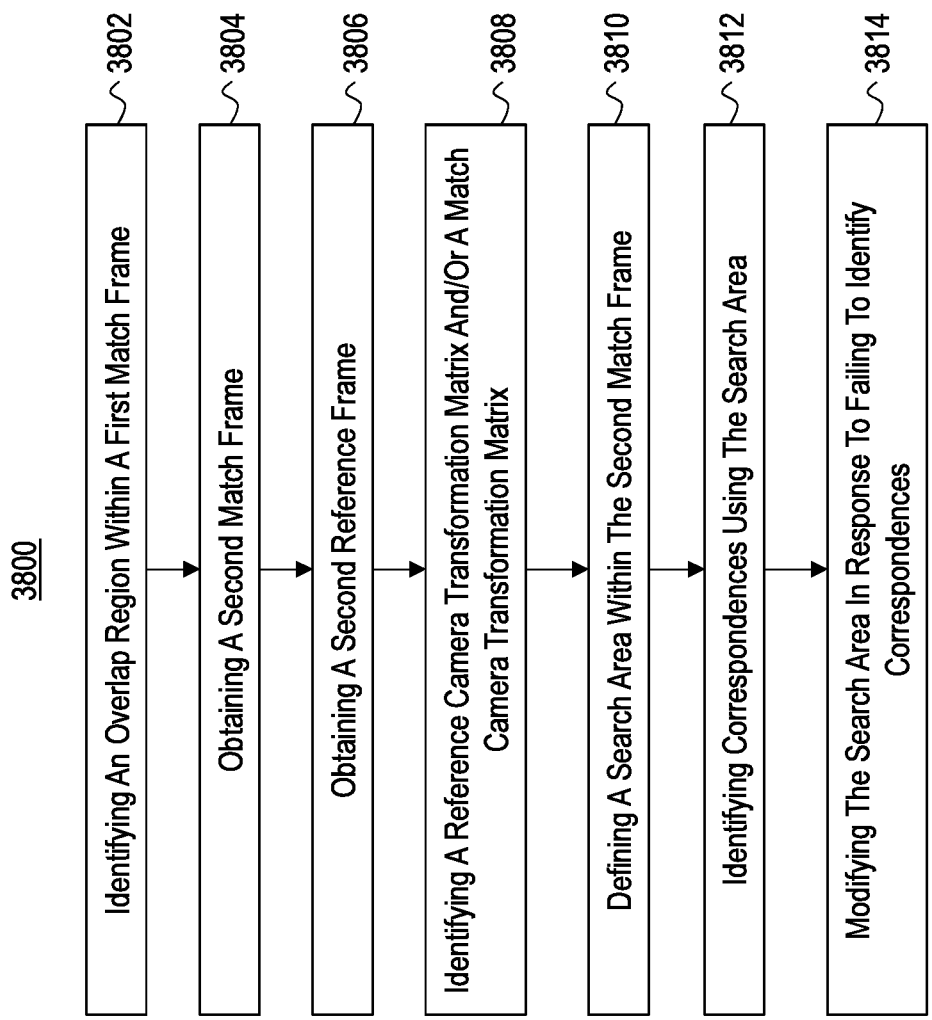
FIG. 38 illustrates an example flow diagram depicting acts associated with reducing a search area for identifying correspondences between images.

FIG. 38 illustrates an example flow diagram 3800 depicting acts associated with reducing a search area for identifying correspondences between images. The discussion of the various acts represented in flow diagram 3800 includes references to various hardware components described in more detail with reference to FIGS. 1, 2, and 44.

Act 3802 of flow diagram 3800 includes identifying an overlap region within a first match frame. Act 3802 is performed, in some instances, using one or more processors 4405 of a computer system 4400 (e.g., an HMD 200 and/or a user instrument 250). In some instances, the match frame is captured by a match camera at a first match camera timepoint and with a first match camera pose. Furthermore, in some instances the overlap region includes one or more points of the first match frame that correspond to one or more corresponding points of a first reference frame captured by a reference camera at a first reference camera timepoint and with a first reference camera pose. The one or more points of the first match frame and the one or more corresponding points of the first reference frame are associated with one or more same portions of an environment represented in the first reference frame and the first match frame. In some instances, the overlap region comprises a mapping region within the first match frame, and each pixel of the first reference frame is mapped to the mapping region.

Furthermore, in some instances, the overlap region includes a particular point (or any number of particular points) of the of the first match frame that corresponds to a particular corresponding point of the reference frame. The particular point and the particular corresponding point are associated with features identified within the match frame and the reference frame, respectively.

Act 3804 of flow diagram 3800 includes obtaining a second match frame. Act 3804 is performed, in some instances, using one or more processors 4405 of a computer system 4400 (e.g., an HMD 200 and/or a user instrument 250) and/or one or more match cameras 215. In some instances, the second match frame is captured by a match camera at a second match camera timepoint and with a second match camera pose, where the second match camera timepoint is subsequent to the first match camera timepoint (described above with reference to act 3802).

Act 3806 of flow diagram 3800 includes obtaining a second reference frame. Act 3806 is performed, in some instances, using one or more processors 4405 of a computer system 4400 (e.g., an HMD 200 and/or a user instrument 250) and/or one or more reference cameras 260. In some instances, the second reference frame is captured by the reference camera at a second reference camera timepoint and with a second reference camera pose, where the second reference camera timepoint is subsequent to the first reference camera timepoint (described above with reference to act 3802).

Act 3808 of flow diagram 3800 includes identifying a reference camera transformation matrix and/or a match camera transformation matrix. Act 3808 is performed, in some instances, using one or more processors 4405 of a computer system 4400 (e.g., an HMD 200 and/or a user instrument 250). In some instances, the reference camera transformation matrix is a 3D rotational matrix (e.g., identified based on inertial tracking data 270 obtained by a reference camera IMU 265) and/or the match camera transformation matrix is a 3D rotation matrix (e.g., identified based on inertial tracking data 240 obtained by a. For example, the reference camera transformation matrix may indicate rotation between the first reference camera pose and the second reference camera pose, and/or the match camera transformation matrix may indicate rotation between the first match camera pose and the second match camera pose.

Act 3810 of flow diagram 3800 includes defining a search area within the second match frame. Act 3810 is performed, in some instances, using one or more processors 4405 of a computer system 4400 (e.g., an HMD 200 and/or a user instrument 250). In some instances, the search area is larger than the overlap region. In some instances, the search area is defined within the second match frame based on the overlap region (from act 3802) and the reference camera transformation matrix (from act 3808) and/or the match camera transformation matrix (from act 3808). In some implementations, wherein the search area consists of a subset of pixels within the second match frame.

Furthermore, in some instances, the search area is defined based on a confidence measure associated with the reference camera or the match camera. The confidence measure, in some implementations, comprises a time period between (1) the first match camera timepoint and the second match camera timepoint, and/or (2) the first reference camera timepoint and the second reference camera timepoint.

In some implementations, the confidence measure comprises a motion measure relative to (1) the first match camera pose and the second match camera pose, and/or (2) the first reference camera pose and the second reference camera pose. In some instances, the motion measure comprises an acceleration measure or a translational or rotational velocity measure. In some instances, the motion measure comprises an amount of motion relative to (1) the first match camera pose and the second match camera pose, and/or (2) the first reference camera pose and the second reference camera pose.

Act 3812 of flow diagram 3800 includes identifying correspondences using the search area. Act 3812 is performed, in some instances, using one or more processors 4405 of a computer system 4400 (e.g., an HMD 200 and/or a user instrument 250). In some instances, a system identifies correspondences between pixels within the search area within the second match frame and pixels within the second reference frame (e.g., by performing feature matching).

Act 3814 of flow diagram 3800 includes modifying the search area in response to failing to identify correspondences. Act 3814 is performed, in some instances, using one or more processors 4405 of a computer system 4400 (e.g., an HMD 200 and/or a user instrument 250). In some instances, a system increases a size of the search area in response to failing to identify corresponding features between pixels within the search area within the second match frame and pixels within the second reference frame.

Facilitating the Identifying of Correspondences Between Images Experiencing Motion Blur As described hereinabove, a system may generate a motion model that is configured to facilitate continuous mapping of sets of pixels from a reference frame to corresponding sets of pixels of a match frame, even as the pose of the reference camera and the match camera change over time (see, e.g., FIGS. 11-17 and Equations 2 and 4). A motion model may include an alignment matrix, which may be generated based on various matrices, such as a base matrix (e.g., base matrix 610), an updated matrix (e.g., updated matrix 2010), an aligned updated matrix (e.g., aligned updated matrix 2210), a previously computed alignment matrix, etc. In some implementations, these various matrices are computed, at least in part, by identifying correspondences between images captured by the reference camera 260 and the match camera 215, such as by performing feature matching (e.g., see FIGS. 6 and 20 and attendant description).

By way of reprisal, in some implementations, performing feature matching involves identifying feature points and feature descriptors within an image captured by the reference camera 260 and an image captured by the match camera 215. In some instances, a feature point (sometimes referred to as "keypoints," "points of interest," or simply "features") refers to a pixel within an image that comprises rich texture information, such as edges, corners, and/or other readily identifiable structures. In some instances, a feature descriptor (also referred to as a "feature vector") results from extracting image data/statistics from a local image/pixel patch around an identified feature point. A feature descriptor may operate as an identifier for the feature point about which the feature descriptor is centered. Various approaches exist for extracting feature descriptors, such as local histogram approaches, N-jets approaches, and/or others. For example, a feature descriptor may be identified based on a histogram of gradient magnitudes (e.g., changes in intensity and/or color) and/or orientations (e.g., edge orientations) for pixels within an image patch centered on a feature point.

A system may employ various techniques for identifying feature points and/or feature descriptors, such as, by way of non-limiting example, scale-invariant feature transform (SIFT), speeded up robust features (SURF), Canny operator, Kayyali operator, Moravec algorithm, Harris & Stephens/Shi-Tomasi algorithms, Förstner detector, smallest univalue segment assimilating nucleus (SUSAN) detector, level curve curvature approach, DAISY algorithms, and/or others.

As described above, feature point identification and/or feature matching relies on identifying one or more pixels within an image that comprise rich texture information, such as edges, corners, and/or other readily identifiable structures. Accordingly, performing feature point identification and/or feature matching operations may be hindered when blurring artifacts are present in the image(s) being analyzed. Blurring artifacts present in an image may blur edges, corners, and/or other otherwise readily identifiable structures within the image and may therefore cause a system to fail to identify features within the image.

Motion blur refers to blurring artifacts present in a frame captured by a camera when relative motion between the camera and the captured environment causes at least a portion of the captured environment to shift during the camera exposure time. Movement of objects in the captured environment and/or movement of the camera may cause motion blur. For example, relative motion between a camera and/or objects in the captured environment may cause multiple pixels of the image sensor of the camera to capture the same resolvable 3D point in the captured environment during the camera exposure time, which may cause blurring effects.

FIG. 39 depicts the base match frame 315 captured by the match camera 215 at the base match camera pose 330 and base match camera timepoint 335. FIG. 39 also illustrates the base reference frame 310 captured by the reference camera 260 at the base reference camera pose 320 and base reference camera timepoint 325 (see FIG. 3). As depicted in FIG. 39, the relative motion between the match camera 215 and the physical object 305 (if any) during the camera exposure time of the match camera 215 (while capturing the base match frame 315) is insufficient to cause blurring artifacts in the base match frame 315. Similarly, the relative motion between the reference camera 260 and the physical object 305 (if any) during the camera exposure time of the reference camera 260 (while capturing the base reference frame 310) is insufficient to cause blurring artifacts in the base reference frame 310.

In contrast, FIG. 39 depicts an updated match frame 3915 and an updated reference frame 3910. The updated match frame 3915 corresponds in at least some respects to the updated match frame 1115 described hereinabove with reference to FIG. 11 (e.g., the updated match frame 3915 is captured by the match camera 215 at the updated match camera pose 1130 and updated match camera timepoint 1135), and the updated reference frame 3910 corresponds in at least some respects to the updated reference frame 1110 described hereinabove with reference to FIG. 11 (e.g., the updated reference frame 3910 is captured by the reference camera 260 at the updated reference camera pose 1120 and updated reference camera timepoint 1125).

However, for illustrative purposes, FIG. 39 depicts the updated match frame 3915 and the updated reference frame 3910 to include motion blur. For example, relative motion between the match camera 215 and the physical object 305 during the camera exposure time of the match camera 215 (while capturing the updated match frame 3915) causes multiple pixels of the match camera 215 image sensor to capture the same 3D points of the physical object 305, causing blurring artifacts. Similarly, by way of example, relative motion between the reference camera 260 and the physical object 305 during the camera exposure time of the reference camera 260 (while capturing the updated reference frame 3910) causes multiple pixels of the reference camera 260 image sensor to capture the same 3D points of the physical object 305, causing blurring artifacts.

Motion blur present in the updated match frame 3915 and/or the updated reference frame 3910 may cause a system to at least partially fail to identify correspondences (e.g., by performing feature matching) between the updated match frame 3915 and the updated reference frame 3910 to generate an alignment matrix for generating/updating a motion model for facilitating continuous image alignment between images captured by the match camera 215 and the reference camera. Accordingly, at least some implementations of the present disclosure include techniques for facilitating the identifying of correspondences between images experiencing motion blur. Although FIG. 39 illustrates an example in which both the updated match frame 3915 and the updated reference frame 3910 experience motion blur, it should be noted that at least some of the principles described herein may be beneficial in instances where only one frame of a frame pair experiences motion blur.

In some implementations, a system intelligently generates a modified (e.g., downsampled) frame pair and performs feature matching on the modified (e.g., downsampled) frame pair to facilitate the identifying of correspondences between images experiencing motion blur. Motion blur may cause pixels in a camera sensor to sample a larger spatial area than what would normally be sampled by each pixel. The resulting image blur may reduce the fidelity of objects with high spatial frequency or that indicate a spatial change (e.g., objects such as edges, corners and/or other readily identifiable structures). Modifying (e.g., downsampling) the image may cause the resulting image to be comprised of mid and low frequency content and may enable a system to perform image matching using images that include the mid and low frequency features in the imagery. Performing feature matching using the mid and low frequency information may facilitate the identification of such structures during feature point identification and/or feature matching.

Figure 40:
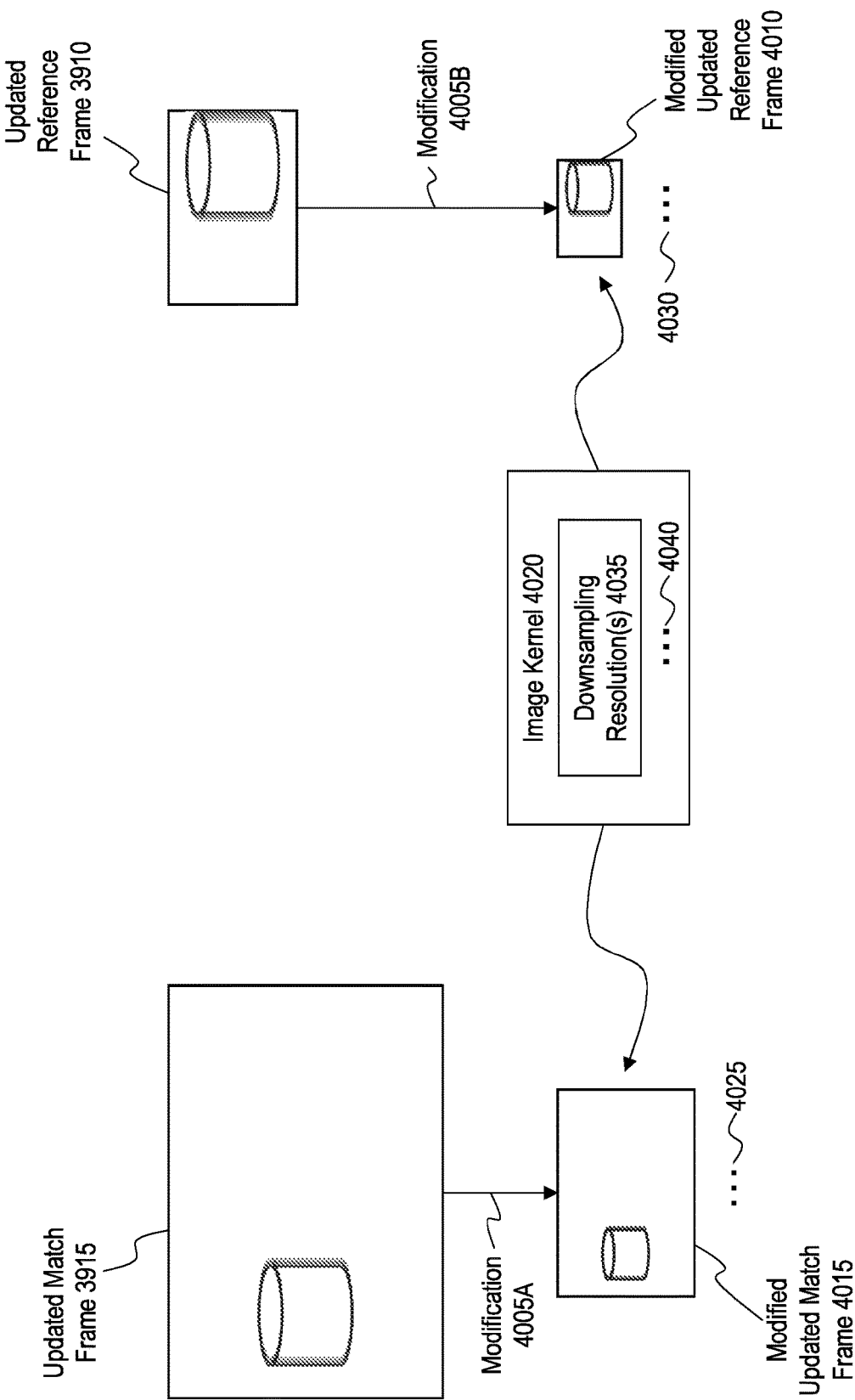
FIG. 40 illustrates an example of generating a modified reference frame and a modified match frame using one or more image kernels.

FIG. 40 illustrates a conceptual representation of generating a modified reference frame and a modified match frame using one or more image kernels. In particular, FIG. 40 illustrates performing modification 4005A on the updated match frame 3915. Similarly, FIG. 40 illustrates performing modification 4005B on the updated reference frame 3910. The modifications 4005A and 4005B may comprise various operations that utilize an image kernel 4020 (e.g., a convolutional matrix, mask, etc. utilized for image processing/resampling) to generate a modified image (e.g., modified updated match frame 4015, modified updated reference frame 4010). For example, modifications 4005A and/or 4005B may involve performing a convolution between an image (e.g., updated match frame 3915, updated reference frame 3910) and the image kernel 4020.

Accordingly, an image kernel 4020 may take on various forms, in accordance with implementations of the present disclosure. For example, in some instances, an image kernel 4020 indicates downsampling resolution(s) 4035, thereby causing the modifications 4005A and 4005B to function as downsampling operations. FIG. 40 illustrates an example implementation in which the image kernel 4020 indicates downsampling resolution(s) 4035. According to the implementation illustrated in FIG. 40, performing modification 4005A on the updated match frame 3915 generates a modified updated match frame 4015 that is a downsampled updated match frame. Accordingly, the modified updated match frame 4015 has a lower image size and pixel resolution than the updated match frame 3915, thereby blurring the high frequency content and causing visual correspondence matching (when performed, see FIG. 42) on the mid and low frequency content, as described above. Similarly, FIG. 40 shows that performing modification 4005B on the updated reference frame 3910 generates a modified updated reference frame 4010 that is a downsampled updated reference frame. Accordingly, the modified updated reference frame 4010 has a lower image size and pixel resolution than the updated reference frame 3910.

In at least some implementations where the image kernel 4020 indicates downsampling resolution(s) 4035, performing modifications 4005A and/or 4005B comprises reducing sections of pixels in an original image (e.g., updated match frame 3915 and/or updated reference frame 3910) to a single pixel in the downsampled image (e.g., modified updated match frame 4015 and/or modified updated reference frame 4010). For example, in some instances, each pixel in the downsampled image is defined by a pixel of the original image as follows:

$$p_d(m,n)=p(Km,Kn) \qquad (8)$$

Where $p_d$ is the pixel in the downsampled image, p is the pixel in the original image, K is a scaling factor, m is the pixel coordinate in the horizontal axis, and n is the pixel coordinate in the vertical axis. In some instances, performing modifications 4005A and/or 4005B also includes performing prefiltering functions for defining the pixels of the downsampled image, such as anti-aliasing prefiltering functions to prevent aliasing artifacts.

In some implementations, performing modifications 4005A and/or 4005B includes utilizing an averaging filter for defining the pixels of the downsampled image (e.g., modified updated match frame 4015 and/or modified updated reference frame 4010) based on the average of a section of pixels in the original image (e.g., updated match frame 3915 and/or updated reference frame 3910). In one example of downsampling by a factor of 2 along each axis, each pixel in the downsampled image is defined by an average of a 2×2 section of pixels in the original image as follows:

$$p_d(m,n) = \frac{[p(2m, 2n) + p(2m, 2n+1) + p(2m+1, 2n) + p(2m+1, 2n+1)]}{4} \qquad (9)$$

Where $p_d$ is the pixel in the downsampled image, p is the pixel in the original image, m is the pixel coordinate in the horizontal axis, and n is the pixel coordinate in the vertical axis. Accordingly, in some instances, performing modifications 4005A and 4005B on the updated match frame 3915 and the updated reference frame 3910, respectively, generates a downsampled updated match frame and a downsampled updated reference frame, respectively (represented in FIG. 40 by modified updated match frame 4015 and modified updated reference frame 4010). In some instances, the downsampled updated match frame and the downsampled updated reference frame have pixel resolutions that are reduced by a factor of two in both the horizontal axis and the vertical axis relative, respectively, to the pixel resolution of the updated match frame 3915 and the updated reference frame 3910. Those skilled in the art will appreciate, in view of the present disclosure, that performing downsampling may generate a downsampled image with a pixel resolution that is reduced by a factor that is greater than or less than 2 along each axis of the images, such as a factor of 3 or 4.

In some implementations, a system performs modifications 4005A and/or 4005B using downsampling resolution(s) 4035 (e.g., indicated by image kernel 4020). In some instances, downsampling resolution(s) 4035 define how a system performs modifications 4005A and/or 4005B. For example, downsampling resolution(s) 4035 may represent a downsampling factor, such as a pixel bin size of a binning operation for combining pixels to generate the downsampled image (e.g., a 2×2 bin, a 3×3 bin, a 4×4 bin, etc.). In some instances, downsampling resolution(s) 4035 may determine whether a system reduces image size by a factor of 2, 3, 4, and/or other factors along each axis to generate a downsampled image. Additionally, or alternatively, downsampling resolution(s) 4035 may indicate a target resolution for the downsampled image, such as an image resolution, spatial resolution, and/or angular resolution (e.g., one target resolution for the modified updated match frame 4015 and a separate target resolution for the modified updated reference frame 4010).

Accordingly, a system may utilize the same downsampling resolution(s) 4035 (or any implementation of an image kernel 4020) for performing both modification 4005A and modification 4005B, or a system may utilize one downsampling resolution 4035 (or any implementation of an image kernel 4020) to perform modification 4005A and another downsampling resolution 4035 (or any implementation of an image kernel 4020) to perform modification 4005B. The ellipses 4025 and 4030 indicate that a system may perform downsampling (e.g., or any modification represented in FIG. 40 by modifications 4005A and 4005B) multiple times using downsampling resolution(s) 4035 (or any implementation of an image kernel 4020). Performing iterative downsampling operations is sometimes referred to as pyramiding.

Although the present description focuses, in some respects, on an image kernel 4020 that indicates downsampling resolution(s) 4035, it should be noted that an image kernel 4020 may additionally or alternatively comprise parameters for other types of image processing operations for generating modified images, as indicated in FIG. 40 by the ellipsis 4040. For example, an image kernel 4020 may comprise any form of blur or sharpen kernel (e.g., Gaussian, spline, etc.) and/or any type of digital filtering technique for reducing the impact of high frequency blur on images captured by the reference camera 260 and/or the match camera 215.

Figure 41:
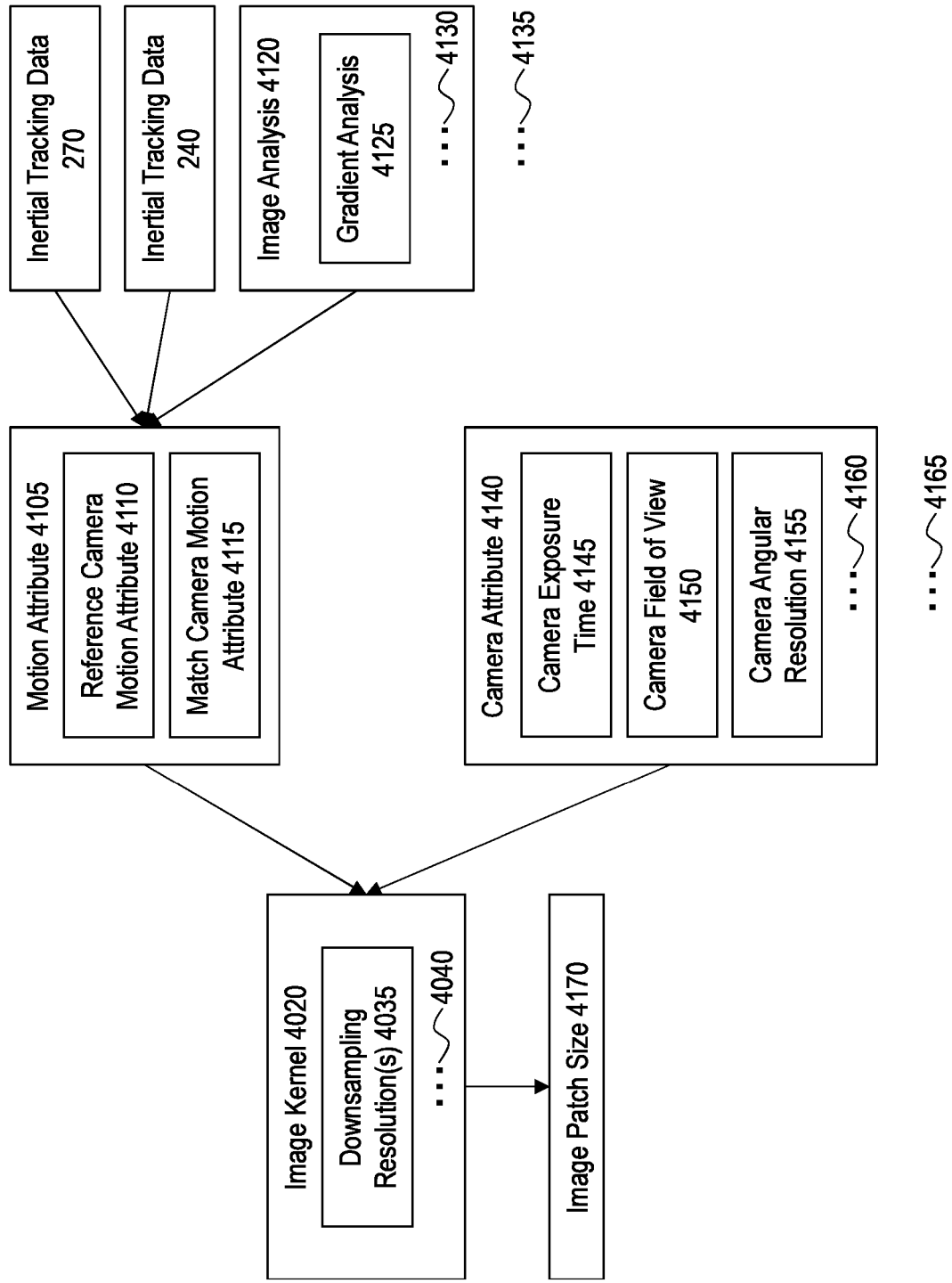
FIG. 41 illustrates an example of determining one or more image kernels.

In some implementations, the image kernel(s) 4020 is/are predetermined in a static manner, whereas in other implementations, the image kernel(s) 4020 is/are dynamically determined based on one or more elements/inputs. FIG. 41 illustrates an example of determining image kernel(s) 4020 based on a motion attribute 4105 and/or a camera attribute 4140 (the ellipsis 4165 indicates that a system may utilize any number of additional or alternative inputs/elements to determine downsampling resolution(s) 4020).

In some instances, a motion attribute 4105 includes a reference camera motion attribute 4110 and/or a match camera motion attribute 4115. In some implementations, a reference camera motion attribute 4110 is based on inertial tracking data 270 obtained by a reference camera IMU 265, and a match camera motion attribute 4115 is based on inertial tracking data 240 obtained by the match camera IMU 235. The reference camera motion attribute 4110 may indicate a measure of motion associated with the reference camera 260 during the camera exposure time of the reference camera 260 (e.g., while capturing the updated reference frame 3910). Similarly, the match camera motion attribute 4115 may indicate a measure of motion associated with the match camera 215 during the camera exposure time of the match camera 215 (e.g., while capturing the updated match frame 3915). For example, the inertial tracking data 270, 240 may indicate an acceleration (e.g., rotational and/or translational), a velocity (e.g., translational and/or rotational), an amount of motion (e.g., an amount of motion that the reference camera 260 and/or the match camera 215 has/have undergone between a previous timepoint and a current timepoint), and/or other motion metrics associated with the reference camera 260 and/or the match camera 215 during their respective camera exposure times. It should be noted that references herein to "camera exposure time(s)" may also refer to a thermal time constant associated with a thermal time constant associated with a bolometer of a thermal imaging camera 120 (e.g., a microbolometer) for capturing thermal images.

In some instances, a system additionally or alternatively determines a motion attribute 4105 based on image analysis 4120 of the reference frame (e.g., by performing image analysis 4120 on the updated match frame 3915 and/or the updated reference frame 3910). Image analysis 4120 may include various processes, such as, for example, gradient analysis 4125, which, in some instances, includes generating one or more histograms of gradients (e.g., based on a monochrome or grayscale image) and analyzing the number and/or ratio of pixels that comprise a low gradient value or a low change in intensity. For example, a large number and/or ratio of pixels comprising a low gradient value or a low change in intensity may indicate that the edges of objects represented in the image are blurred (e.g., by reason of motion blur).

In some instances, image analysis 4120 includes additional or alternative techniques, such as utilizing a point spread function, performing image edge analysis (e.g., determining whether sharp or gradual changes in intensity are present at edges), and/or any function(s) that receive(s) an image as an input and provides an indication of image blurriness as an output (as indicated in FIG. 41 by the ellipsis 4130).

In addition to inertial tracking data 270, 240 and image analysis 4120, the ellipsis 4135 indicates that a system may utilize any number of additional or alternative elements/inputs to determine a motion attribute 4105.

In some instances, a magnitude of a motion attribute 4105 (e.g., a measure of motion during camera exposure time) is associated with an amount of motion blur that is present or expected to be present in an image captured by a reference camera 260 and/or a match camera 215. For example, a motion attribute 4105 may indicate an IMU-based measure of motion during a camera exposure time (e.g., determined by inertial tracking data 270 and/or inertial tracking data 240), and a higher magnitude of the measure of motion may indicate a larger number and/or degree of expected blurring artifacts within the captured image. In another example, a motion attribute 4105 may indicate a value that represents an amount of blurriness in a captured image (e.g., determined by image analysis 4120), and a higher magnitude of the value may indicate a larger number and/or degree of blurring artifacts within the captured image.

Accordingly, in some instances, image kernel(s) 4020 is/are based on a magnitude of the motion attribute 4105. For instance, in an example implementation where the image kernel 4020 indicates downsampling resolution(s) 4035, a higher magnitude of a motion attribute 4105 may result in downsampling resolution(s) 4035 that cause a system to perform downsampling (e.g., modifications 4005A, 4005B) using a higher image resolution reduction factor (and/or to generate a downsampled image with a lower image size).

For example, where a magnitude of a motion attribute 4105 indicates a high degree and/or number of blurring artifacts in a captured image (e.g., updated match frame 3915 and/or updated reference frame 3910), a system may determine downsampling resolution(s) 4035 that is/are tailored to the degree and/or number of blurring artifacts indicated by the magnitude of the motion attribute 4105. The system may then utilize the downsampling resolution(s) 4035 to generate a downsampled image (e.g., modified updated match frame 4015 and/or modified updated reference frame 4010) with an appropriate image size that sharpens/clarifies the features of the objects represented in the captured image (e.g., to facilitate feature matching). It should be reiterated that downsampling resolution(s) 4035 may cause a system to perform iterative downsampling operations (e.g., pyramiding) to achieve an image size that sufficiently sharpens/clarifies the features of the captured objects.

In contrast, where a magnitude of a motion attribute 4105 indicates a lack of or low degree of blurring artifacts in a captured image, a system may refrain from determining downsampling resolution(s) 4035 and/or performing downsampling (e.g., modifications 4005A, 4005B).

It should be noted that an amount of motion blur present in images captured by a camera may depend on one or more camera attributes 4140. For example, when capturing the same environment under the same motion conditions, a camera with a longer camera exposure time 4145 may capture a greater degree of motion blur than a camera with a shorter camera exposure time 4145. Also, when capturing the same environment under the same motion conditions, a camera with a higher camera angular resolution 4155 and/or a smaller camera field of view 4150 may capture a greater degree of motion blur than a camera with a lower camera angular resolution 4155 and/or a larger camera field of view 4150. Accordingly, in some instances, a system utilizes one or more camera attributes 4140 (e.g., camera exposure time 4145, camera field of view 4150, camera angular resolution 4155, and/or others indicated by the ellipsis 4160) in addition to one or more motion attributes 4105 as inputs for determining downsampling resolution(s) 4035 (or for determining other implementations of an image kernel 4020).

The ellipsis 4165 indicates that a system may utilize any number of additional or alternative inputs for determining image kernel (s) 4020. For example, in some implementations, a system may utilize a directional component associated with the motion attribute 4105 to determine image kernel(s) 4020. (e.g., to perform downsampling in the direction of the motion that caused the blurring artifacts).

FIG. 41 also illustrates that, in some instances, a system selectively modifies an image patch size 4170 based on the image kernel(s) 4020, the motion attribute 4105, the camera attribute 4140, and/or other inputs. In some instances, an image patch size 4170 corresponds to the size of an image patch used to generate feature descriptors for identified feature points as described hereinabove (see FIGS. 4, 18, 42, etc.). In some instances, reducing an image patch size 4170 enables a system to save computational resources when performing feature matching between downsampled images. In other instances, maintaining an original image patch size 4170 for performing feature matching between downsampled images provides robust feature descriptors for identified feature points that enable the system to identify corresponding features between the downsampled images with a high degree of confidence. Accordingly, a system may modify an image patch size 4170 for performing feature identification/matching based on the image kernel(s) 4020 (e.g., downsampling resolution(s) 4035) and/or other inputs in various implementations.

As indicated hereinabove with reference to FIG. 40, a system may utilize the image kernel(s) 4020 to generate a downsampled (or otherwise modified) frame pair (e.g., modified updated match frame 4015 and modified updated reference frame 4010). Subsequently, in some implementations, a system identifies correspondences between the images of the downsampled (or otherwise modified) frame pair.

Figure 42:
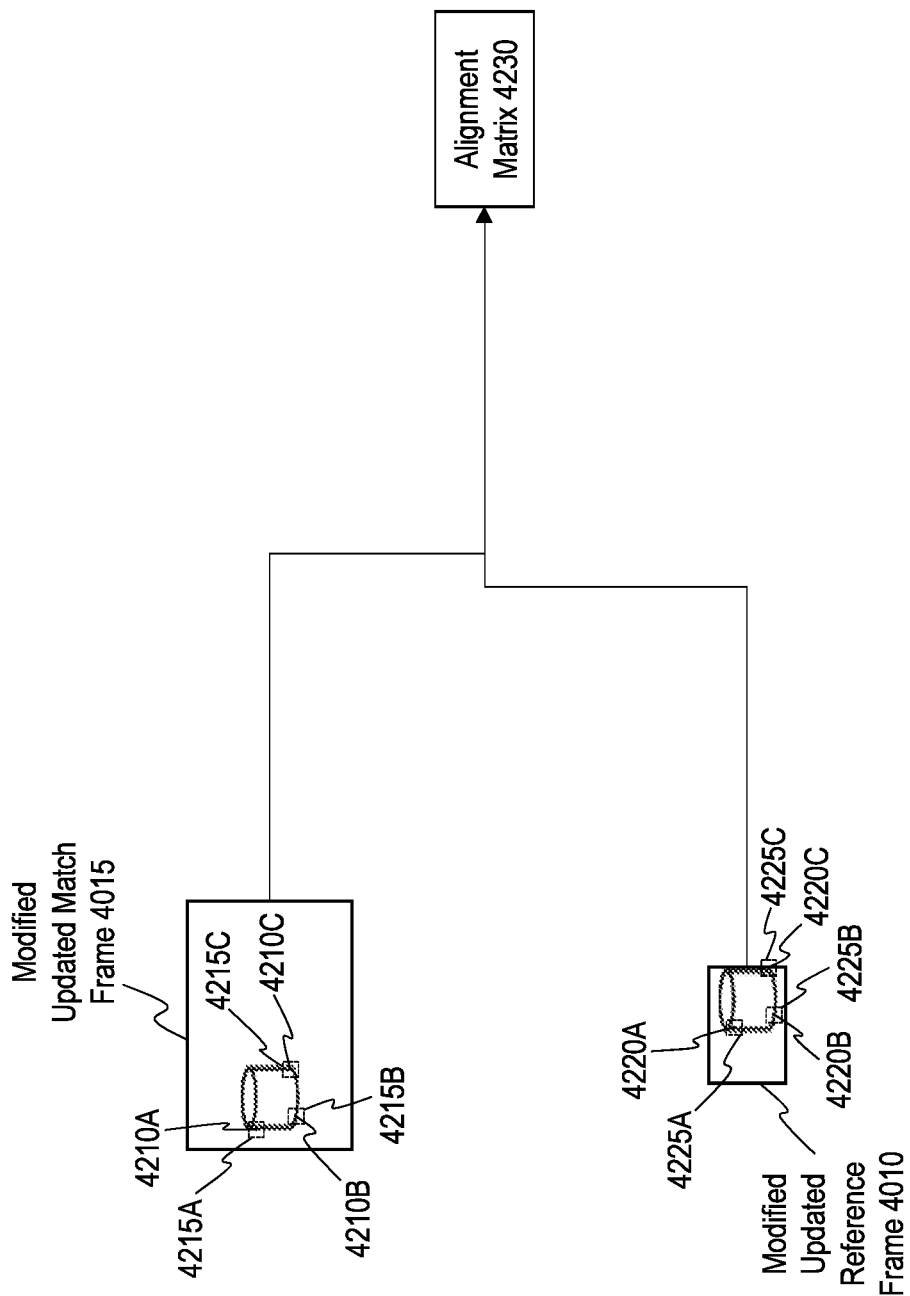
FIG. 42 illustrates an example of identifying correspondences between a modified reference frame and a modified match frame.

FIG. 42 illustrates a conceptual representation of performing feature matching on the modified updated match frame 4015 and the modified updated reference frame 4010. For example, FIG. 42 illustrates a system identifying various feature points within the modified updated match frame 4015 (e.g., feature points 4210A, 4210B, and 4210C) and identifying feature descriptors for the various feature points (e.g., feature descriptors 4215A, 4215B, and 4215C). Similarly, FIG. 42 illustrates the system identifying corresponding feature points within the modified updated reference frame 4010 that correspond to, or represent the same portions of the captured environment as, the feature points identified within the modified updated match frame 4015 (e.g., feature points 4220A, 4220B, and 4220C). The system also identifies feature descriptors for the corresponding feature points identified within the modified updated reference frame 4010 (e.g., feature descriptors 4225A, 4225B, and 4225C).

As is evident from FIG. 42 according to the implementation depicted, the system utilizes a modified (e.g., size-reduced) image patch size to define the feature descriptors for the various feature points identified within the downsampled frame pair (e.g., as compared with the image patch size utilized by systems performing feature matching on frame pairs that are not downsampled). One will note, in view of the present disclosure, that a system may alternatively utilize an unmodified image patch size to define feature descriptors within the downsampled frame pair.

FIG. 42 also illustrates utilizing the feature points identified within the modified updated match frame 4015 and the modified updated reference frame 4010 to generate an alignment matrix 4230 (e.g., as described hereinabove with reference to FIGS. 4-6 and 18-23B). A system may utilize the alignment matrix 4230 to facilitate mapping of pixels of a reference frame onto corresponding pixels of a match frame to generate a composite frame for display of a user (e.g., as described hereinabove with reference to FIGS. 7-10, 12-17 and 24).

Example Method(s) for Facilitating the Identifying of Correspondences Between Images Experiencing Motion Blur The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 43:
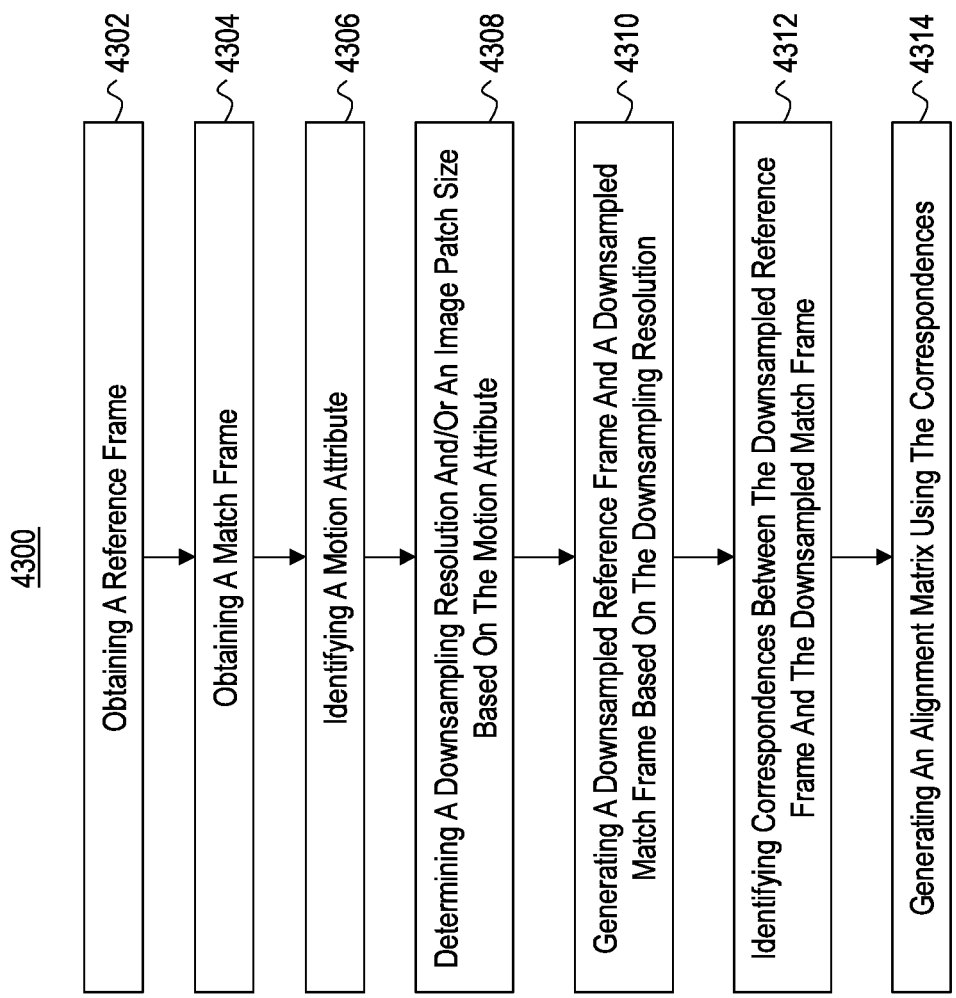
FIG. 43 illustrates an example flow diagram depicting acts associated with facilitating the identifying of correspondences between images experiencing motion blur.

FIG. 43 illustrates an example flow diagram 4300 depicting acts associated with facilitating the identifying of correspondences between images experiencing motion blur. The discussion of the various acts represented in flow diagram 4300 includes references to various hardware components described in more detail with reference to FIGS. 1, 2, and 44.

Act 4302 of flow diagram 4300 includes obtaining a reference frame. Act 4302 is performed, in some instances, using one or more processors 4405 of a computer system 4400 (e.g., an HMD 200 and/or a user instrument 250) and/or a reference camera 260. In some instances, the reference frame is captured by a reference camera at a reference camera timepoint (or set of reference camera timepoints, according to the reference camera exposure time).

Act 4304 of flow diagram 4300 includes obtaining a match frame. Act 4304 is performed, in some instances, using one or more processors 4405 of a computer system 4400 (e.g., an HMD 200 and/or a user instrument 250) and/or a match camera 215. In some instances, the match frame is captured by a match camera at a match camera timepoint (or set of match camera timepoints, according to the match camera exposure time).

Act 4306 of flow diagram 4300 includes identifying a motion attribute. Act 4306 is performed, in some instances, using one or more processors 4405 of a computer system 4400 (e.g., an HMD 200 and/or a user instrument 250). In some instances, the motion attribute comprises (1) a reference camera motion attribute associated with the reference camera at the reference camera timepoint, and/or (2) a match camera motion attribute associated with the match camera at the match camera timepoint. Furthermore, in some instances, the motion attribute is based on inertial tracking data (e.g., inertial tracking data obtained by a reference camera IMU 265 and a match camera IMU 235). For example, a reference camera motion attribute may be based on inertial tracking data 265 obtained by the reference camera MIU 265, and a match camera motion attribute may be based on inertial tracking data 235 obtained by the match camera IMU 235.

Additionally, or alternatively, the motion attribute is based on image analysis of the reference frame and/or the match frame (e.g., image gradient analysis, image edge analysis, utilizing a point spread function, etc.)

Act 4308 of flow diagram 4300 includes determining a downsampling resolution and/or an image patch size based on the motion attribute. Act 4308 is performed, in some instances, using one or more processors 4405 of a computer system 4400 (e.g., an HMD 200 and/or a user instrument 250). In some instances, a system utilizes various inputs to determine the downsampling resolution, such as the motion attribute (from act 4306) and/or one or more camera attributes (e.g., camera exposure time, camera field of view, camera angular resolution, etc.). In some instances, the downsampling resolution may be based on a magnitude of the motion attribute. Furthermore, in some instances, the downsampling resolution may be based on a directional component associated with the motion attribute.

In addition, in some implementations, the system modifies the image patch size for identifying correspondences between a downsampled reference frame and a downsampled match frame based on the downsampling resolution.

Act 4310 of flow diagram 4300 includes generating a downsampled reference frame and a downsampled match frame based on the downsampling resolution. Act 4310 is performed, in some instances, using one or more processors 4405 of a computer system 4400 (e.g., an HMD 200 and/or a user instrument 250). In some instances, the downsampling resolution indicates a downsampling size reduction factor or bin size for performing downsampling to generate the downsampled reference frame and the downsampled match frame. In some instances, the downsampling resolution indicates final downsampled image resolutions for the downsampled match frame and/or the downsampled match frame.

Act 4312 of flow diagram 4300 includes identifying correspondences between the downsampled reference frame and the downsampled match frame. Act 4312 is performed, in some instances, using one or more processors 4405 of a computer system 4400 (e.g., an HMD 200 and/or a user instrument 250). In some instances, identifying correspondences between the downsampled reference frame and the downsampled match frame includes performing feature extraction on the downsampled reference frame and the downsampled match frame (e.g., identifying feature points and feature descriptors) and performing feature matching between the identified feature points (e.g., by comparing feature descriptors associated with the identified feature points). In some instances, the system identifies feature descriptors utilizing a modified image patch size (e.g., according to act 4308).

Act 4314 of flow diagram 4300 includes generating an alignment matrix using the correspondences. Act 4314 is performed, in some instances, using one or more processors 4405 of a computer system 4400 (e.g., an HMD 200 and/or a user instrument 250). In some instances, the alignment matrix is generated at least in part by unprojecting the identified correspondences (e.g., feature matches) into 3D space and minimizing a cost function (e.g., according to the Wahba method as described hereinabove). The system may utilize the alignment matrix to generate a mapping that maps a set of pixels of the reference frame to a corresponding set of pixels of the match frame.

Example Computer System(s)

Figure 44:
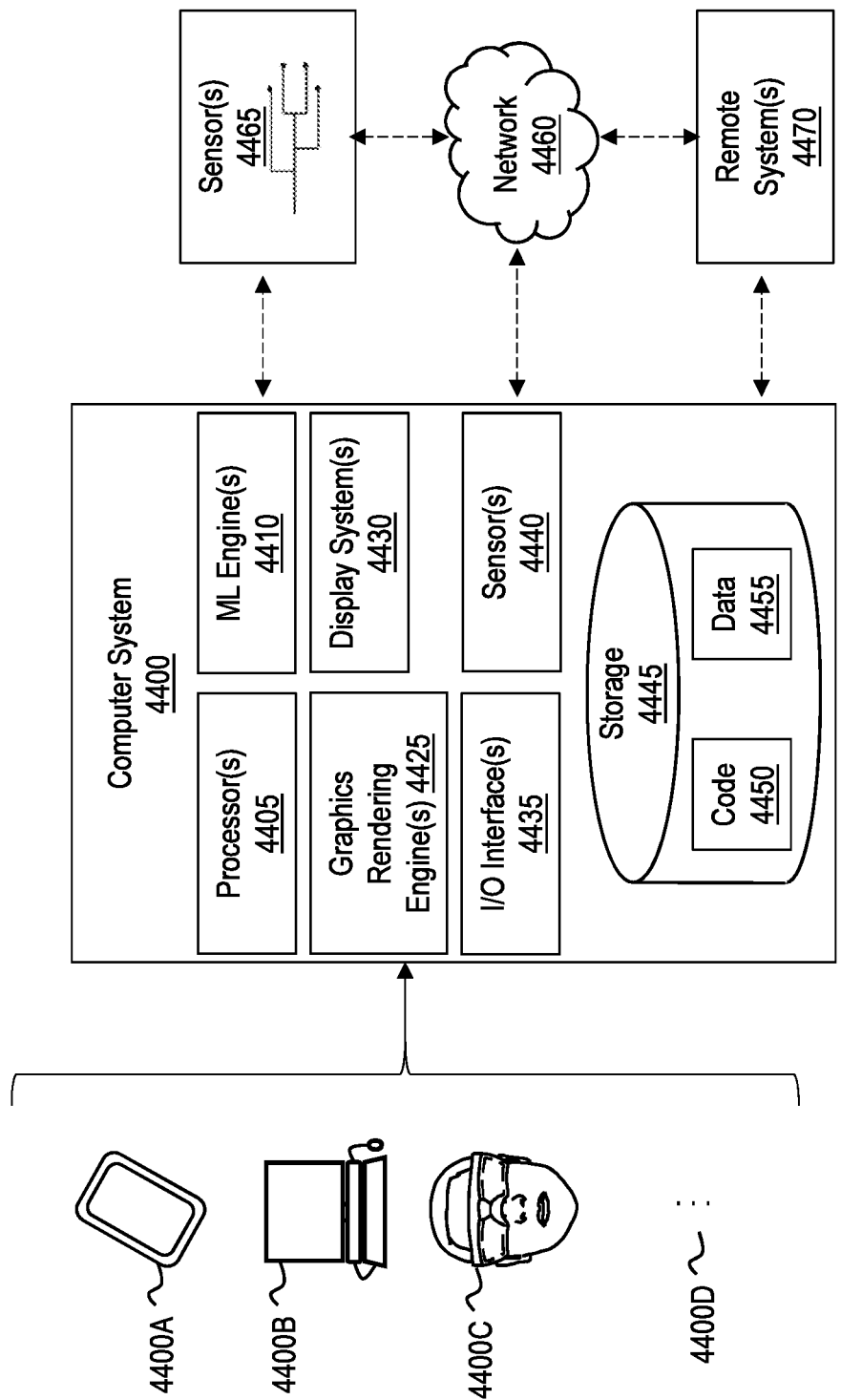
FIG. 44 illustrates an example computer system that may include and/or be used to perform disclosed embodiments.

Having just described the various features and functionalities of some of the disclosed embodiments, the focus will now be directed to FIG. 44 which illustrates an example computer system 4400 that may include and/or be used to facilitate the embodiments described herein, including the acts described in reference to the foregoing Figures. In particular, this computer system 4400 may be implemented as part of a mixed-reality HMD, such as any HMD referenced herein.

Computer system 4400 may take various different forms. For example, computer system 4400 may be embodied as a tablet, a desktop, a laptop, a mobile device, a cloud device, an HMD, or a standalone device, such as those described throughout this disclosure. Computer system 4400 may also be a distributed system that includes one or more connected computing components/devices that are in communication with computer system 4400. FIG. 44 specifically calls out how computer system 4400 may be embodied as a tablet 4400A, a laptop 4400B, or an HMD 4400C, but the ellipsis 4400D indicates that computer system 4400 may be embodied in other forms as well.

The computer system 4400 includes various different components. FIG. 44 shows that computer system 4400 includes one or more processors 4405 (aka a "hardware processing unit"), a machine learning (ML) engine 4410, graphics rendering engine(s) 4425, a display system 4430, input/output (I/O) interfaces 4435, one or more sensors 4440, and storage 4445.

Regarding the processor(s) 4405, it will be appreciated that the functionality described herein can be performed, at least in part, by one or more hardware logic components (e.g., the processor(s) 4405). For example, and without limitation, illustrative types of hardware logic components/processors that can be used include Field-Programmable Gate Arrays ("FPGA"), Program-Specific or Application-Specific Integrated Circuits ("ASIC"), Application-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 4400. The different components, modules, engines, and services described herein may be implemented as objects or processors that execute on computer system 4400 (e.g. as separate threads).

The ML engine 4410 may be implemented as a specific processing unit (e.g., a dedicated processing unit as described earlier) configured to perform one or more specialized operations for the computer system 4400. The ML engine 4410 (or perhaps even just the processor(s) 4405) can be configured to perform any of the disclosed method acts or other functionalities.

In some instances, the graphics rendering engine 4425 is configured, with the hardware processing unit 4405, to render one or more virtual objects within the scene. As a result, the virtual objects accurately move in response to a movement of the user and/or in response to user input as the user interacts within the virtual scene. The computer system 4400 may include a display system 4430 (e.g., laser diodes, light emitting diodes (LEDs), microelectromechanical systems (MEMS), mirrors, lens systems, diffractive optical elements (DOEs), display screens, and/or combinations thereof) for presenting virtual objects within the scene.

I/O interface(s) 4435 includes any type of input or output device. Such devices include, but are not limited to, touch screens, displays, a mouse, a keyboard, a controller, and so forth. Any type of input or output device should be included among I/O interface(s) 4435, without limitation.

During use, in some instances, a user of the computer system 4400 is able to perceive information (e.g., a mixed-reality environment) through a display screen that is included among the I/O interface(s) 4435 and that is visible to the user. The I/O interface(s) 4435 and sensors 4440/4465 may also include gesture detection devices, eye tracking systems, and/or other movement detecting components (e.g., head tracking cameras, depth detection systems, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

The computer system 4400 may also be connected (via a wired or wireless connection) to external sensors 4465 (e.g., one or more remote cameras, accelerometers, gyroscopes, acoustic sensors, magnetometers, etc.). It will be appreciated that the external sensors include sensor systems (e.g., a sensor system including a light emitter and camera), rather than solely individual sensor apparatuses.

Storage 4445 may be physical system memory, which may be volatile, non-volatile, or some combination of the two. The term "memory" may also be used herein to refer to non-volatile mass storage such as physical storage media. If computer system 4400 is distributed, the processing, memory, and/or storage capability may be distributed as well.

Storage 4445 is shown as including executable instructions (i.e. code 4450). The executable instructions (i.e. code 4450) represent instructions that are executable by the processor(s) 4405 of computer system 4400 to perform the disclosed operations, such as those described in the various methods. Storage 4445 is also shown as including data 4455. Data 4455 may include any type of data, including image data, depth/disparity maps and/or other depth data, pose data, tracking data, and so forth, without limitation.

The disclosed embodiments may comprise or utilize a special-purpose or general-purpose computer including computer hardware, such as, for example, one or more processors (such as processor(s) 4405) and system memory (such as storage 4445), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 4400 may also be connected (via a wired or wireless connection) to external sensors (e.g., one or more remote cameras) or devices via a network 4460. For example, computer system 4400 can communicate with any number devices or cloud services to obtain or process data. In some cases, network 4460 may itself be a cloud network. Furthermore, computer system 4400 may also be connected through one or more wired or wireless networks 4460 to remote/separate computer systems(s) 4470 that are configured to perform any of the processing described with regard to computer system 4400.

A "network," like network 4460, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 4400 will include one or more communication channels that are used to communicate with the network 4460. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for facilitating the identifying of correspondences between images experiencing motion blur, the system comprising:
   one or more processors; and
   one or more hardware storage devices storing computer-executable instructions that are executable by the one or more processors to configure the system to facilitate the identifying of correspondences between images experiencing motion blur and by at least configuring the system to perform the following:
      obtain a reference frame captured by a reference camera at a reference camera ti me point;
      obtain a match frame captured by a match camera at a match camera timepoint;
      identify a motion attribute that comprises: (1) a reference camera motion attribute associated with the reference camera at the reference camera timepoint, or (2) a match camera motion attribute associated with the match camera at the match camera ti me point;
      determine an image kernel using at least one of the following as inputs for determining the image kernel: the motion attribute, a camera exposure time, a camera field of view, or a camera angular resolution;
      generate a modified reference frame and a modified match frame based on the image kernel; and
      identify correspondences between the modified reference frame and the modified match frame.

2. The system of claim 1, wherein the image kernel is based on a magnitude of the motion attribute.

3. The system of claim 1, wherein the image kernel comprises a downsampling resolution.

4. The system of claim 3, wherein the reference camera motion attribute is based on inertial tracking data obtained by an inertial measurement unit (IMU) associated with the reference camera, and wherein the match camera motion attribute is based on inertial tracking data obtained by an IMU associated with the match camera.

5. The system of claim 1, wherein the motion attribute is based on image analysis of the reference frame or the match frame.

6. The system of claim 5, wherein the image analysis comprises image gradient analysis.

7. The system of claim 1, wherein the computer-executable instructions are further executable to configure the system to modify an image patch size for identifying correspondences between the modified reference frame and the modified match frame based on the image kernel.

8. The system of claim 1, wherein the image kernel is based on a directional component associated with the motion attribute.

9. The system of claim 1, wherein the computer-executable instructions are further executable to configure the system to generate an alignment matrix based on identified correspondences between the modified reference frame and the modified match frame.

10. The system of claim 9, wherein the computer-executable instructions are further executable to configure the system to generate a mapping that maps a set of pixels of the reference frame to a corresponding set of pixels of the match frame using the alignment matrix.

11. The system of claim 10, wherein the computer-executable instructions are further executable to configure the system to:
   generate a composite image at least by overlaying the set of pixels of the reference frame onto the match frame; and
   display the composite image on a display of the system.

12. A method for facilitating the identifying of correspondences between images experiencing motion blur, the method comprising:
   obtaining a reference frame captured by a reference camera at a reference camera timepoint;
   obtaining a match frame captured by a match camera at a match camera ti me point;
   identifying a motion attribute that comprises: (1) a reference camera motion attribute associated with the reference camera at the reference camera timepoint, or (2) a match camera motion attribute associated with the match camera at the match camera ti me point;
   determining a downsampling resolution using at least one of the following as inputs for determining the downsampling resolution: the motion attribute, a camera exposure time, a camera field of view, or a camera angular resolution;
   generating a downsampled reference frame and a downsampled match frame based on the downsampling resolution; and
   identifying correspondences between the downsampled reference frame and the downsampled match frame.

13. The method of claim 12, wherein the downsampling resolution is based on a magnitude of the motion attribute.

14. The method of claim 12, wherein the motion attribute is based on inertial tracking data.

15. The method of claim 14, wherein the reference camera motion attribute is based on inertial tracking data obtained by an inertial measurement unit (IMU) associated with the reference camera, and wherein the match camera motion attribute is based on inertial tracking data obtained by an IMU associated with the match camera.

16. The method of claim 12, wherein the motion attribute is based on image analysis of the reference frame or the match frame.

17. The method of claim 16, wherein the image analysis comprises image gradient analysis.

18. The method of claim 12, further comprising modifying an image patch size for identifying correspondences between the downsampled reference frame and the downsampled match frame based on the downsampling resolution.

19. The method of claim 12, further comprising:
generating an alignment matrix based on identified correspondences between the downsampled reference frame and the downsampled match frame;
generating a mapping that maps a set of pixels of the reference frame to a corresponding set of pixels of the match frame using the alignment matrix;
generating a composite image at least by overlaying the set of pixels of the reference frame onto the match frame; and
displaying the composite image on a display of a system.

20. One or more hardware storage devices storing computer-executable instructions that are executable by one or more processors of a computing system to configure the computing system to facilitate the identifying of correspondences between images experiencing motion blur and by at least configuring the system to perform the following:
obtain a reference frame captured by a reference camera at a reference camera time point;
obtain a match frame captured by a match camera at a match camera timepoint;
identify a motion attribute that comprises: (1) a reference camera motion attribute associated with the reference camera at the reference camera timepoint, or (2) a match camera motion attribute associated with the match camera at the match camera time point;
determine a resolution using at least one of the following as inputs for determining the downsampling resolution: the motion attribute, a camera exposure time, a camera field of view, or a camera angular resolution;
generate a downsampled reference frame and a downsampled match frame based on the downsampling resolution; and
identify correspondences between the downsampled reference frame and the downsampled match frame.

* * * * *